US012592096B1

(12) United States Patent
Dillon et al.

(10) Patent No.: US 12,592,096 B1
(45) Date of Patent: Mar. 31, 2026

(54) MODELING AND DETECTING SHOPPING EVENTS USING VISUAL IMAGES AND MACHINE LEARNING

(71) Applicant: Amazon Technologies, Inc., Seattle, WA (US)

(72) Inventors: Michael Dillon, Seattle, WA (US); Gerard Guy Medioni, Seattle, WA (US); Ali Rahimi, Berkeley, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1090 days.

(21) Appl. No.: 17/038,490

(22) Filed: Sep. 30, 2020

(51) Int. Cl.
*G06V 40/10* (2022.01)
*G06F 18/28* (2023.01)
*G06V 20/52* (2022.01)
*G06V 40/20* (2022.01)
*H04N 7/18* (2006.01)

(52) U.S. Cl.
CPC ............ *G06V 40/107* (2022.01); *G06F 18/28* (2023.01); *G06V 20/52* (2022.01); *G06V 40/28* (2022.01); *H04N 7/18* (2013.01)

(58) Field of Classification Search
CPC ...... G06V 40/107; G06V 20/52; G06V 40/28; G06F 18/28; H04N 7/18
See application file for complete search history.

(56) References Cited

U.S. PATENT DOCUMENTS 6,154,559 A 11/2000 Beardsley
7,050,624 B2 5/2006 Dialameh et al.
7,225,980 B2 6/2007 Ku et al.
7,949,568 B2 5/2011 Fano et al.
(Continued)

FOREIGN PATENT DOCUMENTS

CN 104778690 B 6/2017
EP 1574986 B1 7/2008
(Continued)

OTHER PUBLICATIONS

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.
(Continued)

*Primary Examiner* — Kenny A Cese
(74) *Attorney, Agent, or Firm* — Athorus, PLLC

(57) ABSTRACT

Cameras installed at a facility capture images over periods of time and detect features such as locations of hands, heads or other body parts within the images. Time series of data regarding such features are provided to machine learning systems to determine whether an event such as a taking or a return of the item is depicted within the images, or whether no such event is detected. The time series are provided to the machine learning system in an iterative manner, with time series associated with a set of baseline features provided to the machine learning system first. If an event is not detected and associated with an actor based on the baseline features, time series associated with supplemental features are successively provided to the machine learning system, along with the time series associated with the baseline features, until the event is detected and associated with an actor.

20 Claims, 33 Drawing Sheets

(56) References Cited

U.S. PATENT DOCUMENTS

| | | | |
|---|---|---|---|
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,336,456 B2 | 5/2016 | Delean | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | Andjelković et al. | |
| 9,911,290 B1* | 3/2018 | Zalewski | H04W 76/10 |
| 10,055,853 B1 | 8/2018 | Fisher et al. | |
| 10,133,933 B1 | 11/2018 | Fisher et al. | |
| 10,147,210 B1* | 12/2018 | Desai | H04N 7/183 |
| 10,192,415 B2 | 1/2019 | Heitz et al. | |
| 10,318,917 B1 | 6/2019 | Goldstein et al. | |
| 10,354,262 B1* | 7/2019 | Hershey | H04L 67/535 |
| 10,438,277 B1 | 10/2019 | Jiang et al. | |
| 10,474,992 B2 | 11/2019 | Fisher et al. | |
| 10,510,219 B1* | 12/2019 | Zalewski | G06Q 20/327 |
| 10,535,146 B1 | 1/2020 | Buibas et al. | |
| 10,635,844 B1 | 4/2020 | Roose et al. | |
| 10,699,421 B1 | 6/2020 | Cherevatsky et al. | |
| 10,839,203 B1 | 11/2020 | Guigues et al. | |
| 11,195,146 B2 | 12/2021 | Fisher et al. | |
| 11,232,294 B1 | 1/2022 | Banerjee et al. | |
| 11,270,260 B2 | 3/2022 | Fisher et al. | |
| 11,284,041 B1 | 3/2022 | Bergamo et al. | |
| 11,367,083 B1 | 6/2022 | Saurabh et al. | |
| 11,468,698 B1 | 10/2022 | Kim et al. | |
| 11,482,045 B1 | 10/2022 | Kim et al. | |
| 11,538,186 B2 | 12/2022 | Fisher et al. | |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0018516 A1 | 1/2006 | Masoud et al. | |
| 2006/0061583 A1 | 3/2006 | Spooner et al. | |
| 2006/0222206 A1 | 10/2006 | Garoutte | |
| 2007/0092133 A1 | 4/2007 | Luo | |
| 2007/0156625 A1 | 7/2007 | Visel | |
| 2007/0182818 A1 | 8/2007 | Buehler | |
| 2007/0242066 A1 | 10/2007 | Rosenthal | |
| 2007/0276776 A1 | 11/2007 | Sagher et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0166019 A1 | 7/2008 | Lee | |
| 2008/0193010 A1 | 8/2008 | Eaton et al. | |
| 2008/0195315 A1 | 8/2008 | Hu et al. | |
| 2009/0060352 A1 | 3/2009 | Distante et al. | |
| 2009/0083815 A1 | 3/2009 | McMaster et al. | |
| 2009/0121017 A1 | 5/2009 | Cato et al. | |
| 2009/0132371 A1 | 5/2009 | Strietzel et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0148103 A1 | 6/2012 | Hampel et al. | |
| 2012/0159290 A1 | 6/2012 | Pulsipher et al. | |
| 2012/0257789 A1 | 10/2012 | Lee et al. | |
| 2012/0284132 A1 | 11/2012 | Kim et al. | |
| 2012/0327220 A1 | 12/2012 | Ma | |
| 2013/0076898 A1 | 3/2013 | Philippe et al. | |
| 2013/0095961 A1 | 4/2013 | Marty et al. | |
| 2013/0156260 A1 | 6/2013 | Craig | |
| 2013/0253700 A1 | 9/2013 | Carson et al. | |
| 2013/0322767 A1 | 12/2013 | Chao et al. | |
| 2014/0139633 A1 | 5/2014 | Wang et al. | |
| 2014/0139655 A1 | 5/2014 | Mimar | |
| 2014/0259056 A1 | 9/2014 | Grusd | |
| 2014/0279294 A1 | 9/2014 | Field-Darragh et al. | |
| 2014/0282162 A1 | 9/2014 | Fein et al. | |
| 2014/0334675 A1 | 11/2014 | Chu et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1 | 1/2015 | Kumar et al. | |
| 2015/0039458 A1 | 2/2015 | Reid | |
| 2015/0073907 A1 | 3/2015 | Purves et al. | |
| 2015/0131851 A1 | 5/2015 | Bernal et al. | |
| 2015/0199824 A1 | 7/2015 | Kim et al. | |
| 2015/0206188 A1 | 7/2015 | Tanigawa et al. | |
| 2015/0262116 A1 | 9/2015 | Katircioglu et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0125245 A1 | 5/2016 | Saitwal et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0116473 A1 | 4/2017 | Sashida et al. | |
| 2017/0206669 A1 | 7/2017 | Saleemi et al. | |
| 2017/0262994 A1 | 9/2017 | Kudriashov et al. | |
| 2017/0278255 A1 | 9/2017 | Shingu et al. | |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2017/0353661 A1 | 12/2017 | Kawamura | |
| 2018/0025175 A1 | 1/2018 | Kato | |
| 2018/0070056 A1 | 3/2018 | DeAngelis et al. | |
| 2018/0084242 A1 | 3/2018 | Rublee et al. | |
| 2018/0164103 A1 | 6/2018 | Hill | |
| 2018/0165728 A1 | 6/2018 | McDonald et al. | |
| 2018/0218515 A1 | 8/2018 | Terekhov et al. | |
| 2018/0315329 A1 | 11/2018 | D'Amato et al. | |
| 2018/0343043 A1 | 11/2018 | Yoshikawa et al. | |
| 2019/0043003 A1* | 2/2019 | Fisher | G06N 3/04 |
| 2019/0073627 A1* | 3/2019 | Nakdimon | G06Q 10/087 |
| 2019/0102044 A1 | 4/2019 | Wang et al. | |
| 2019/0156274 A1 | 5/2019 | Fisher et al. | |
| 2019/0156277 A1 | 5/2019 | Fisher et al. | |
| 2019/0158801 A1 | 5/2019 | Matsubayashi | |
| 2019/0236531 A1 | 8/2019 | Adato et al. | |
| 2019/0315329 A1 | 10/2019 | Adamski et al. | |
| 2020/0005490 A1 | 1/2020 | Paik et al. | |
| 2020/0043086 A1 | 2/2020 | Sorensen | |
| 2020/0090484 A1 | 3/2020 | Chen et al. | |
| 2020/0279382 A1 | 9/2020 | Zhang et al. | |
| 2020/0320287 A1 | 10/2020 | Porikli et al. | |
| 2020/0380274 A1 | 12/2020 | Shin et al. | |
| 2021/0027485 A1* | 1/2021 | Zhang | G06T 7/11 |
| 2021/0124936 A1 | 4/2021 | Mirza et al. | |
| 2021/0125341 A1 | 4/2021 | Mirza et al. | |
| 2021/0182922 A1 | 6/2021 | Zheng et al. | |

FOREIGN PATENT DOCUMENTS

| | | | |
|---|---|---|---|
| JP | 2013196199 A | 9/2013 | |
| JP | 201489626 A | 5/2014 | |
| JP | 2018207336 A | 12/2018 | |
| JP | 2019018743 A | 2/2019 | |
| JP | 2019096996 A | 6/2019 | |

(56)                References Cited

FOREIGN PATENT DOCUMENTS

| KR | 20170006097 A | 1/2017 |
| WO | 0021021 A1 | 4/2000 |
| WO | 02059836 A2 | 8/2002 |
| WO | 2017151241 A2 | 9/2017 |

OTHER PUBLICATIONS

Harville, M., "Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-view_templates_of_height_and_occupancy_statistics/link/5e294888a6fdcc70a1437262/download, pp. 127-142.

Huang, K. S. et al. "Driver's View and Vehicle Surround Estimation Using Omnidirectional Video Stream," IEEE V2003 Intelligent Vehicles Symposium. Proceedings (Cal. No. 03TH8683), Jun. 9-11, 2003, http://cvrr.ucsd.edu/VOW2/papers/IV03DrView_Final_Header.pdf, pp. 444-449.

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download;isessionid=463D09F419FA5595DBF9DEF30D7EC663?doi=10.1.1.331.6672&rep=rep1&type=pdf, 5 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

Lee, K. and Kacorri, H., (2019, May), "Hands Holding Clues for Object Recognition in Teachable Machines", In Proceedings of the 2019 CHI Conference on Human Factors in Computing Systems (pp. 1-12).

Liu, C., et al. "Accelerating Vanishing Point-Based Line Sampling Scheme for Real-Time People Localization", IEEE Transactions on Circuits and Systems for Video Technology. vol 27. No. Mar. 3, 2017 (Year: 2017).

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Ciplak G, Telceken S., "Moving Object Tracking Within Surveillance Video Sequences Based on EDContours," 2015 9th International Conference on Electrical and Electronics Engineering (ELECO), Nov. 2, 20156 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 1, 20159 (pp. 575-578). IEEE.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

He, K., et al., "Identity Mappings in Deep Residual Networks," ECCV 2016 Camera-Ready, URL: https://arxiv.org/pdf/1603.05027.pdf, Jul. 25, 2016, 15 pages.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https:/arxiv.org/pdf/1612.08242.pdf, Dec. 25, 2016, 9 pages.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

* cited by examiner

ACTORS MOVE THROUGHOUT SCENE OVER WINDOW OF TIME

IMAGES CAPTURED OVER WINDOW OF TIME BY CAMERA A

IMAGES CAPTURED OVER WINDOW OF TIME BY CAMERA B

FEATURES OF ACTOR 1 DETERMINED FROM EACH IMAGE CAPTURED BY CAMERA A

FEATURES OF ACTOR 2 DETERMINED FROM EACH IMAGE CAPTURED BY CAMERA A

FEATURES OF ACTOR 1 DETERMINED FROM EACH IMAGE CAPTURED BY CAMERA B

FEATURES OF ACTOR 2 DETERMINED FROM EACH IMAGE CAPTURED BY CAMERA B

CAMERA A GENERATES TIME SERIES OF DATA REGARDING FEATURES
DETERMINED FOR EACH ACTOR BASED ON IMAGES CAPTURED OVER WINDOW OF TIME

CAMERA B GENERATES TIME SERIES OF DATA REGARDING FEATURES
DETERMINED FOR EACH ACTOR BASED ON IMAGES CAPTURED OVER WINDOW OF TIME

ACTOR EXECUTES TAKING EVENT

IMAGES CAPTURED DURING FINITE
WINDOW INCLUDING TAKING EVENT

TIME SERIES OF DATA REGARDING FEATURES OF ACTOR USED TO TRAIN MACHINE LEARNING SYSTEM TO DETECT TAKING EVENTS

ACTOR EXECUTES RETURN EVENT

IMAGES CAPTURED DURING FINITE WINDOW
INCLUDING RETURN EVENT

TIME SERIES OF DATA REGARDING FEATURES OF ACTOR USED TO TRAIN MACHINE LEARNING SYSTEM TO DETECT RETURN EVENTS

600

620

610

680

680

670

680

680

TIME $t_2$

TIME $t_3$

680

TIME $t_1$

TIME $t_4$

680

ACTOR EXECUTES NON-TAKE/RETURN EVENT

IMAGES CAPTURED DURING FINITE
WINDOW INCLUDING NON-TAKE/RETURN EVENT

CAMERA DETERMINES FEATURES OF ACTORS FROM IMAGES CAPTURED DURING NON-TAKING/RETURN EVENT

HAND LOCATIONS

HAND STATUSES

HAND PRODUCT DISTANCES

HEAD LOCATIONS

SHOULDER LOCATION

TIME SERIES OF DATA REGARDING FEATURES OF ACTOR USED TO TRAIN MACHINE LEARNING SYSTEM TO DETECT NON-TAKE/RETURN EVENTS

FIG. 7A

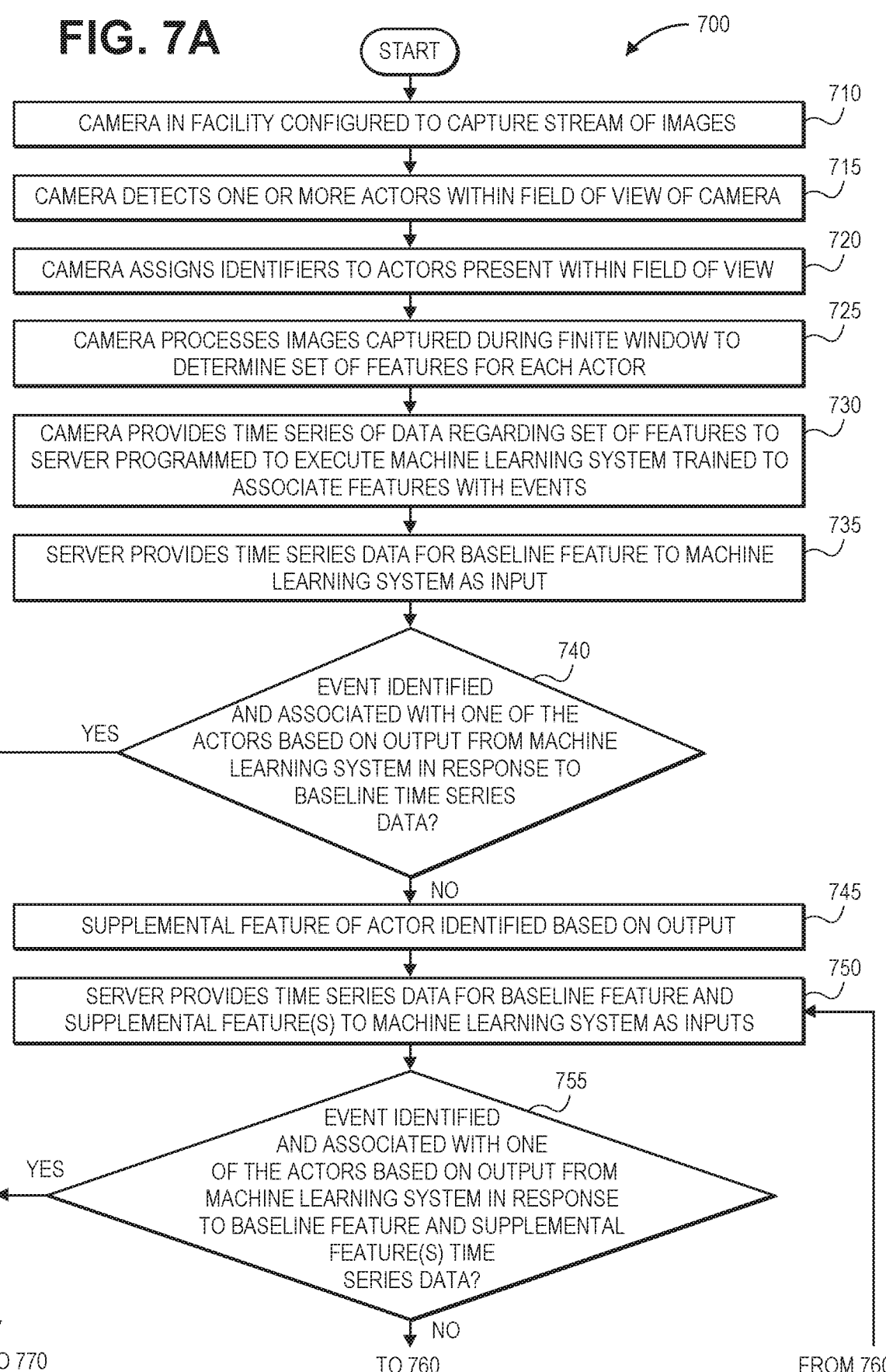

START
700

710
CAMERA IN FACILITY CONFIGURED TO CAPTURE STREAM OF IMAGES

715
CAMERA DETECTS ONE OR MORE ACTORS WITHIN FIELD OF VIEW OF CAMERA

720
CAMERA ASSIGNS IDENTIFIERS TO ACTORS PRESENT WITHIN FIELD OF VIEW

725
CAMERA PROCESSES IMAGES CAPTURED DURING FINITE WINDOW TO DETERMINE SET OF FEATURES FOR EACH ACTOR

730
CAMERA PROVIDES TIME SERIES OF DATA REGARDING SET OF FEATURES TO SERVER PROGRAMMED TO EXECUTE MACHINE LEARNING SYSTEM TRAINED TO ASSOCIATE FEATURES WITH EVENTS

735
SERVER PROVIDES TIME SERIES DATA FOR BASELINE FEATURE TO MACHINE LEARNING SYSTEM AS INPUT

740
EVENT IDENTIFIED AND ASSOCIATED WITH ONE OF THE ACTORS BASED ON OUTPUT FROM MACHINE LEARNING SYSTEM IN RESPONSE TO BASELINE TIME SERIES DATA?

YES

NO

745
SUPPLEMENTAL FEATURE OF ACTOR IDENTIFIED BASED ON OUTPUT

750
SERVER PROVIDES TIME SERIES DATA FOR BASELINE FEATURE AND SUPPLEMENTAL FEATURE(S) TO MACHINE LEARNING SYSTEM AS INPUTS

755
EVENT IDENTIFIED AND ASSOCIATED WITH ONE OF THE ACTORS BASED ON OUTPUT FROM MACHINE LEARNING SYSTEM IN RESPONSE TO BASELINE FEATURE AND SUPPLEMENTAL FEATURE(S) TIME SERIES DATA?

YES

NO

TO 770          TO 760          FROM 760

CAMERA CALCULATES FEATURES OF ACTOR FROM EACH IMAGE CAPTURED
DURING WINDOW

CAMERA GENERATES TIME SERIES DATA REGARDING
FEATURES OF ACTOR CALCULATED FROM EACH IMAGE

PROVIDE TIME SERIES DATA REGARDING BASELINE FEATURES
TO MACHINE LEARNING SYSTEM AS INPUTS

PROVIDE TIME SERIES DATA REGARDING BASELINE FEATURES AND ADDITIONAL SUPPLEMENTAL FEATURES IDENTIFIED BASED ON MACHINE LEARNING OUTPUTS TO MACHINE LEARNING SYSTEM AS INPUTS

MODELING AND DETECTING SHOPPING EVENTS USING VISUAL IMAGES AND MACHINE LEARNING

BACKGROUND

Today, imaging devices (such as cameras) are used for detecting and locating objects, such as actors, in a wide number of applications. For example, cameras are often used to monitor the arrivals or departures of goods or performances of services in materials handling facilities such as warehouses, fulfillment centers, retail establishments or other like facilities, or to monitor the travels of persons or objects in locations such as airports, stadiums or other dense environments, or on one or more sidewalks, roadways or highways. Cameras are also frequently installed and used in financial settings such as banks or casinos, where money changes hands in large amounts, at high rates of speed, or between large numbers of people.

In dynamic environments such as materials handling facilities, transportation centers, financial institutions or like structures, it is frequently difficult to detect and locate large numbers of objects or actors using cameras or other imaging devices. Many systems for detecting and locating objects or actors in three-dimensional (or "3D") space rely on large numbers of individual cameras to capture imaging data (e.g., visual images of an object, or depth images or other samples of depths or ranges to the object), and to provide the captured imaging data to servers or other centralized systems.

Modeling the movements of objects, such as commercial items or products, or human or non-human actors, based on imaging data captured from large numbers of digital cameras may be a computationally expensive process that tends to consume or occupy substantial amounts of available data storage, processing and transmission capacities, and may require comparatively lengthy processing times. Therefore, in environments where objects that are to be located are large in number or small in size, located in tight or crowded quarters or moving at high speeds, generating 3D models of such objects and locating such objects within 3D space based on imaging data received from multiple digital cameras is currently a complex and challenging task.

BRIEF DESCRIPTION OF THE DRAWINGS

FIGS. 1A through 1K are views of aspects of one system for detecting events using visual images and machine learning in accordance with implementations of the present disclosure.

FIGS. 7A and 7B are a flow chart of one process for detecting events using visual images and machine learning in accordance with implementations of the present disclosure.

DETAILED DESCRIPTION

Figure 1A:
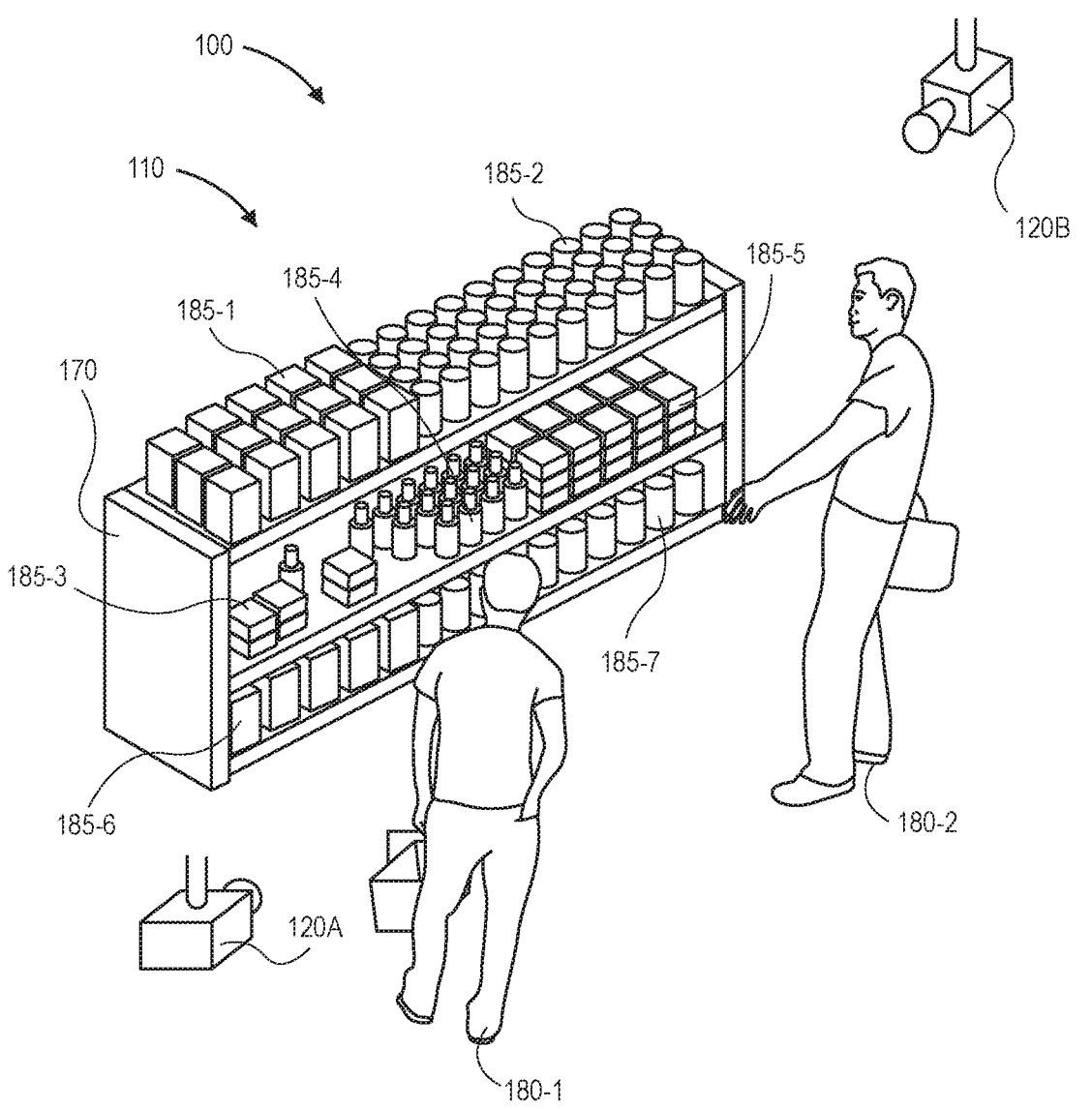

As is set forth in greater detail below, the present disclosure is directed to systems and methods for detecting events using visual images and machine learning. More specifically, one or more implementations of the present disclosure are directed to distributed systems having cameras or other imaging devices that are programmed or configured to capture images over periods of time, and to detect and locate objects, such as portions of human actors, that are depicted within the images. Each of the cameras or other imaging devices may operate one or more machine learning systems to detect and locate such objects within images, e.g., to determine one or more features of such objects, or to construct time series of values of data regarding the objects and their respective features, such as locations of discrete body parts (e.g., hands, heads, shoulders or other parts of arms, or others), either within images or in 3D space, as well as distances between such locations and locations of one or more items or products, or statuses of hands that are detected within the images, including whether and when such hands are empty or full (e.g., occupied by one or more items). The time series of values of data, including but not limited to trajectories of body parts, distances, or statuses of hands, may be used to train a machine learning system to determine whether an event involving an item has occurred, e.g., a taking of an item, a return of an item, or an event that is neither a taking nor a return of an item, based not on contents of individual images but on patterns of such contents, as embodied or represented in one or more of the time series constructed based on such images.

Moreover, machine learning systems may be trained to determine whether an event has occurred, to identify an actor responsible for the event, or to identify an item associated with the event, based on inputs of various sizes, including various sets of data regarding objects and their respective features. For example, in some implementations, a machine learning system may be trained to receive a single time series including data regarding an object or a feature of an object, e.g., a baseline feature, such as a trajectory of a body part, distances between locations of body parts and locations of items, or contents of hands over time, as an input, and to generate an output indicative of an event involving an item that has occurred, an identifier of an actor associated with the event, or an identifier of the item, which may be determined based on a location at which the event occurred, or by processing images of hands holding the item therein. If the machine learning system is unable to determine with a sufficiently high level of confidence that an event involving an item has occurred, to associate the event with a specific actor, or to determine a location of the event, then the machine learning system may identify one or more other time series of data that may be desired or required to improve a level a confidence in an output. The time series of data regarding the baseline feature, and one or more time series of data regarding other, supplemental features, may again be provided to the machine learning system as inputs, and whether an event involving an item has occurred, or an association of the event with an actor or a location, may be determined based on an output received from the machine learning system. Augmenting data regarding one or more baseline features with data regarding one or more supplemental features may continue until the event, the actor and/or the location are identified with a sufficiently high level of confidence, or for as long as data regarding the supplemental features remains available.

Information or data regarding features of actors that are determined or detected by various cameras (or other imaging devices) in a network may be transmitted, e.g., in time series including values of such data, to a server or another system that is programmed or configured to execute a machine learning system trained to determine whether an event has occurred, to identify an actor responsible for the event, or to identify any item associated with the event. The server or other system may provide various sets of data regarding the features that is included in the time series, or calculated based on the time series, as inputs to the machine learning system. Whether an actor has executed an event, and an item associated with the event, may be determined based on outputs received from the machine learning system, and indications of such events that identify the actors and items or locations may be stored in one or more data stores.

Figure 1B:
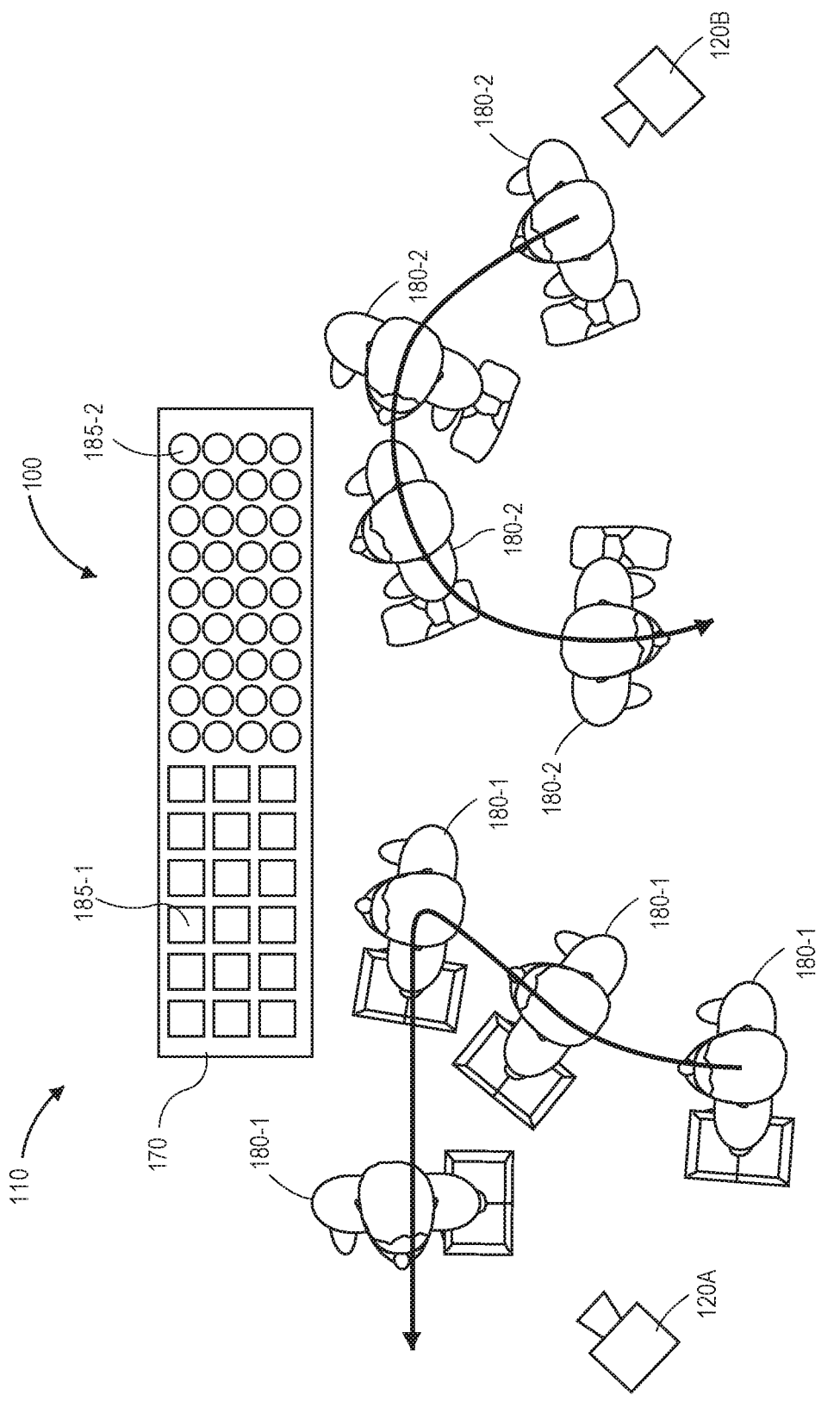

Referring to FIGS. 1A through 1K, views of aspects of one system for detecting events using visual images and machine learning in accordance with implementations of the present disclosure are shown. As is shown in FIGS. 1A and 1B, the system includes a scene 110 such as a materials handling facility, a fulfillment center, a warehouse, or any other like facility. The scene 110 includes a pair of cameras (or other imaging devices) 120A, 120B and a storage unit 170 (e.g., a set of inventory shelves) having a plurality of sets of items 185-1, 185-2, 185-3, 185-4, 185-5, 185-6, 185-7 on the storage unit 170.

The scene 110 may be any open or enclosed environment or space in which any number of actors (e.g., humans, other animals or machines), e.g., actors 180-1, 180-2, may execute one or more poses, gestures or other movements or actions within the fields of view of the cameras 120A, 120B. For example, as is shown in FIG. 1B, the actors 180-1, 180-2 are in motion within a vicinity of the shelving unit 170 over a window of time including times $t_1$, $t_2$, $t_3$, $t_4$, and each of the actors 180-1, 180-2 is partially or entirely within the fields of view of the imaging devices 120A, 120B.

The cameras 120A, 120B may include any number of lenses, processors, memory or storage components, photosensitive surfaces, filters, chips, electrodes, clocks, boards, timers, power sources, connectors or any other components. The cameras 120A, 120B have fields of view which overlap at least in part below the cameras 120A, 120B, and are aligned in different locations and at a non-parallel angle or orientation with respect to one another. Alternatively, in some implementations, the cameras 120A, 120B may be provided in common housing, and may have fields of view extending from surfaces provided at a dihedral angle of greater than one hundred eighty degrees, e.g., approximately two hundred twenty-five degrees. Each of the cameras 120A, 120B may be configured to capture color images, grayscale images, black-and-white images, or any other type or form of imaging data (e.g., depth images).

In some implementations, the cameras 120A, 120B may include one or more sensors that are configured to capture visual imaging data at relatively high levels of resolution, e.g., eight to nine megapixels per image, and at relatively high frame rates, e.g., fifteen or more frames per second (fps). Such sensors may include arrays of photodetectors or photosensitive components such as charge coupled devices ("CCD"), complementary metal-oxide sensors ("CMOS"), photodiodes, or the like. The sensors may capture light reflected from objects and assign one or more quantitative values (e.g., red, green, blue or other color values, or distances or ranges to such objects) to aspects of the reflected light. Alternatively, or additionally, in some implementations, the cameras 120A, 120B may be configured to capture any other imaging data, such as depth imaging data, or visual imaging data at any levels of resolution or frame rates.

The cameras 120A, 120B may be in communication with one or more external devices or systems, e.g., by one or more network connections (not shown). By aligning the cameras 120A, 120B with non-parallel axes of orientation, the cameras 120A, 120B are able to capture imaging data from a larger area than a system that includes just a single camera, thereby reducing hardware, installation and maintenance costs. Additionally, in some implementations, the cameras 120A, 120B may be self-powered, e.g., by one or more power sources internal to or onboard the cameras 120A, 120B, such as batteries or fuel cells. In some other implementations, however, the cameras 120A, 120B may receive alternating current (or AC) or direct current (or DC) power from one or more external power sources, e.g., by one or more conductors or other connectors. For example, the cameras 120A, 120B may receive power by a dedicated connection to such sources, e.g., according to a Power over Ethernet (or "PoE") standard or system that may also be utilized to transfer information or data to or from the cameras 120A, 120B.

In some implementations, the cameras 120A, 120B may be calibrated, such that mappings between coordinates of imaging data captured by the cameras 120A, 120B and directions relative to their respective image sensors are known. Additionally, the cameras 120A, 120B may be installed or otherwise operated independently or as components of an imaging device network (or camera network). For example, the cameras 120A, 120B may be in communication with one or more computer devices or systems (not shown in FIGS. 1A and 1B), e.g., over one or more computer networks. Such devices or systems may include one or more databases or other data stores having information regarding attributes that are, have been or might be stored on one or more of the shelves of the shelving unit 170, e.g., the sets of items 185-1, 185-2, 185-3, 185-4, 185-5, 185-6, 185-7. In some implementations, the attributes may include, but are not limited to, dimensions and/or masses of items, locations on the shelving unit 170 where the items are typically placed, or colors or textures of surface elements (e.g., packaging, wrapping, coverings or the like) of items, or any other attributes.

Figure 1C:
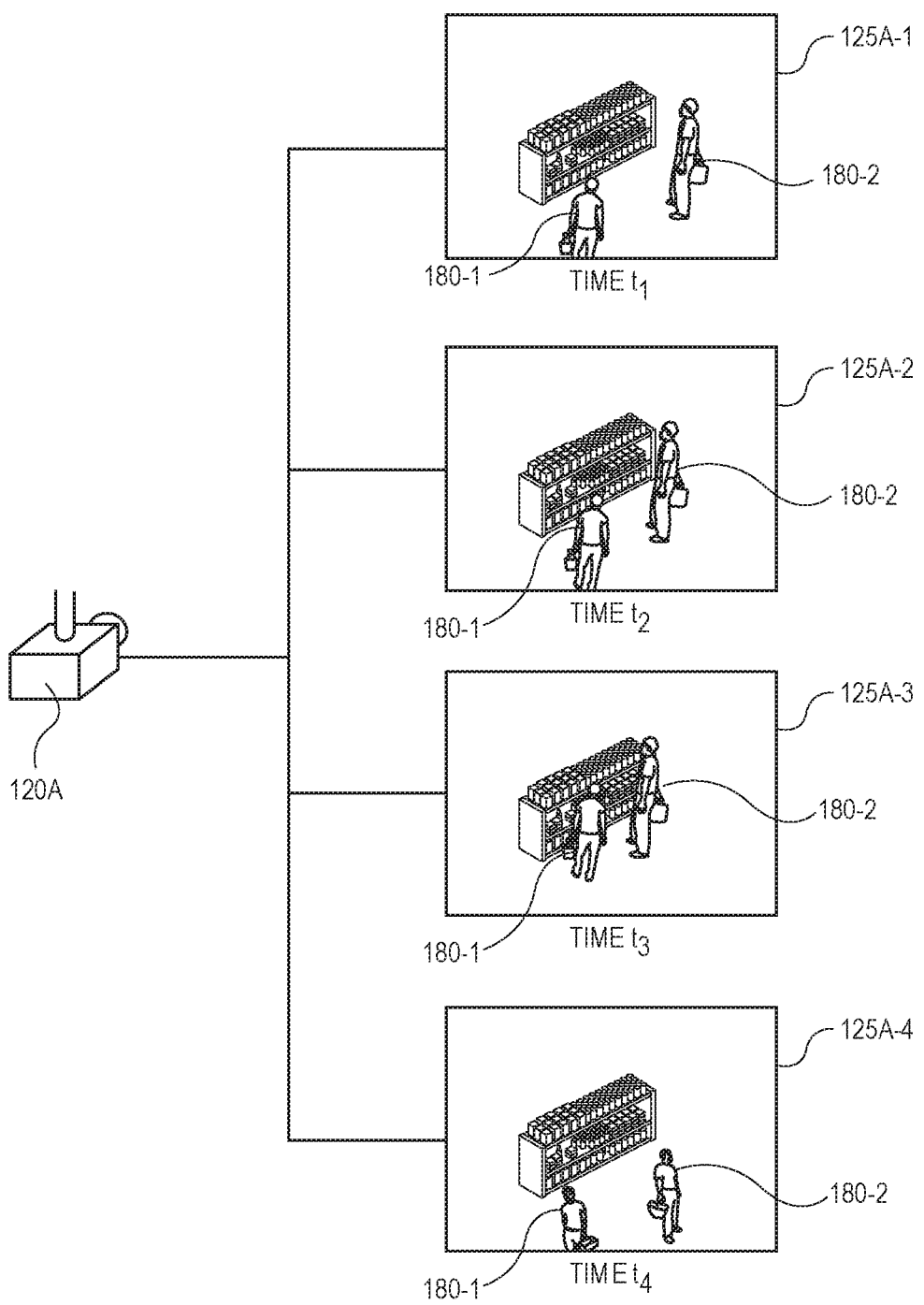
Figure 1D:
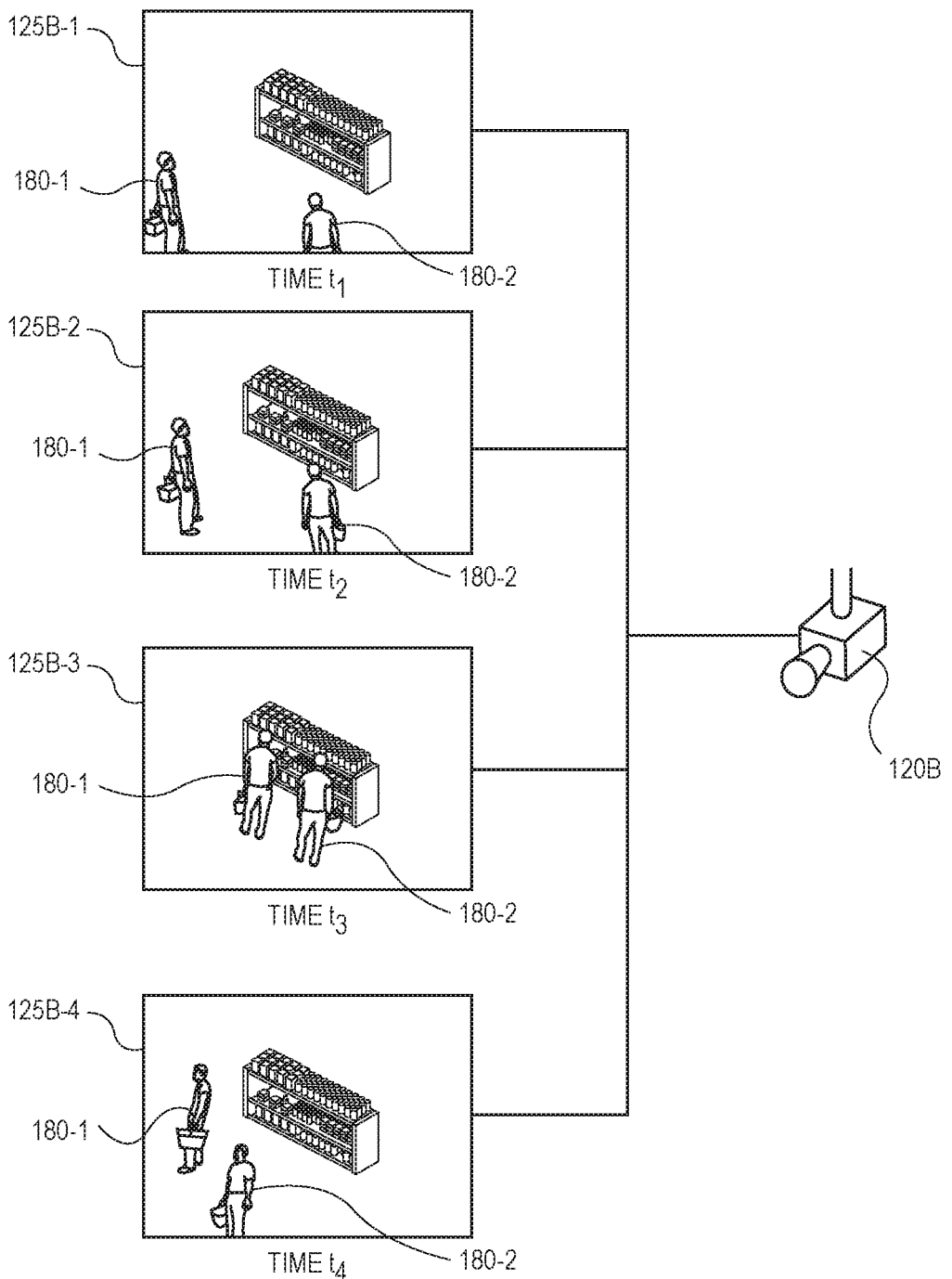

As is shown in FIG. 1C, the camera 120A captures a plurality of images 125A-1, 125A-2, 125A-3, 125A-4 at times $t_1$, $t_2$, $t_3$, $t_4$, respectively, during a window of time. Similarly, as is shown in FIG. 1D, the camera 120B captures a plurality of images 125B-1, 125B-2, 125B-3, 125B-4 at times $t_1$, $t_2$, $t_3$, $t_4$, respectively, during the window of time.

Figure 1E:
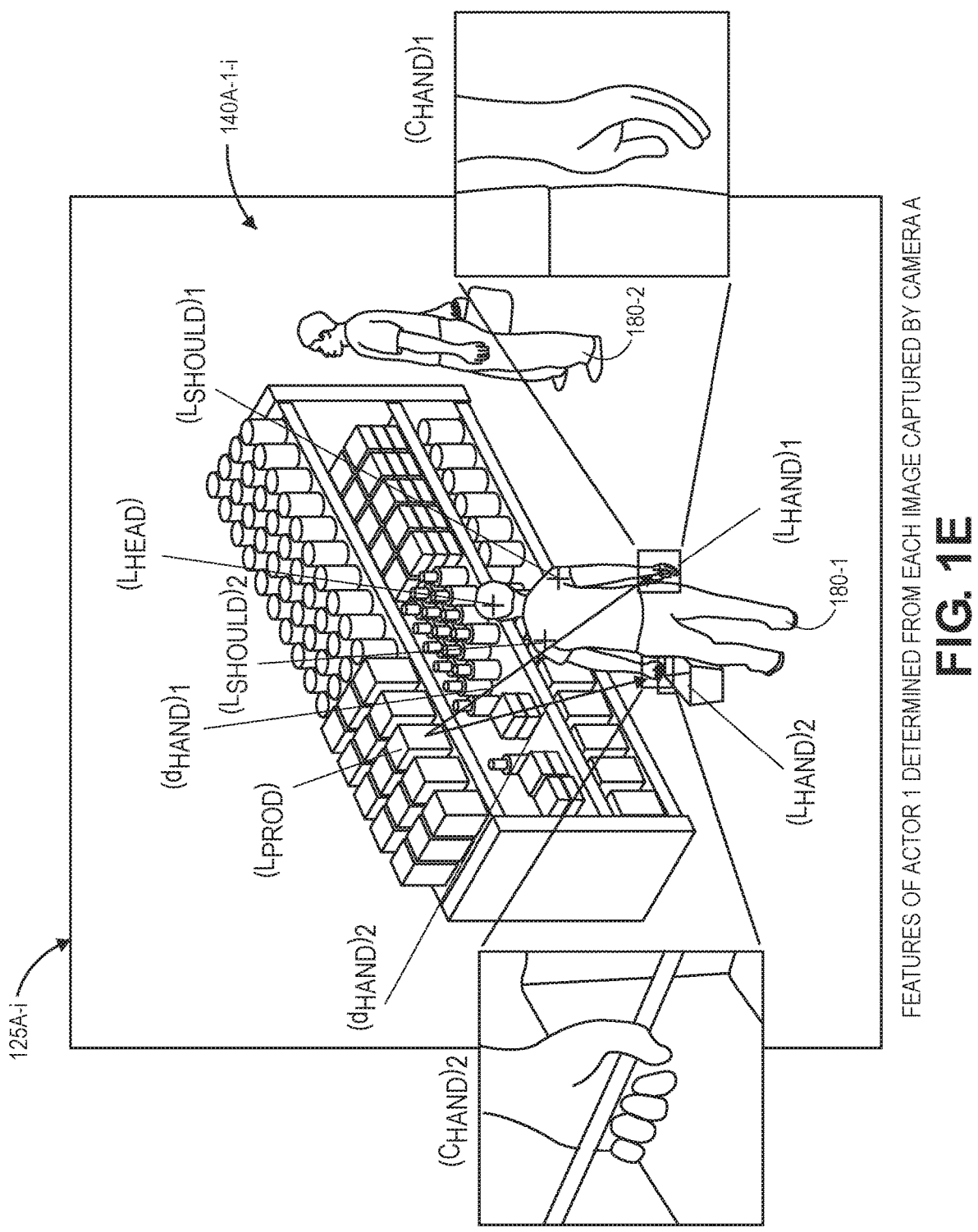

In accordance with implementations of the present disclosure, cameras may capture one or more images, and process such images, e.g., by machine learning, to determine various features regarding each of the actors depicted within the images, including but not limited to locations of hands, heads, shoulders (or other parts of arms) or other body parts of actors, to determine distances between such body parts and locations of items, or to determine whether any detected hands are empty, or whether such detected hands are full. As is shown in FIG. 1E, sets of features 140A-1-$i$ regarding the actor 180-1 are determined from a representative one of the images 125A-i captured by the camera 120A during the window of time. For example, the image 125A-1 may be provided to one or more machine learning systems (e.g., vision algorithms) to identify locations of one or more body parts of the actor 180-1 within the image 125A-1, a location ($L_{HEAD}$) of the actor 180-1, locations ($L_{HAND}$)$_1$, ($L_{HAND}$)$_2$ of hands of the actor 180-1, locations ($L_{SHOULD}$)$_1$, ($L_{SHOULD}$)$_2$ of shoulders of the actor 180-1, or locations of any other body parts. The machine learning systems may be trained to detect such body parts and to return outputs from which sets of coordinates or other identifiers of the locations ($L_{HEAD}$), ($L_{HAND}$)$_1$, ($L_{HAND}$)$_2$, ($L_{SHOULD}$)$_1$, ($L_{SHOULD}$)$_2$ of such body parts, or of any other body parts, may be determined.

Additionally, the image 125A-1 or the locations ($L_{HAND}$)$_1$, ($L_{HAND}$)$_2$ of the hands of the actor 180-1 may be further processed to calculate distances ($d_{HAND}$)$_1$, ($d_{HAND}$)$_2$ between the locations ($L_{HAND}$)$_1$, ($L_{HAND}$)$_2$ of each of the hands of the actor 180-1 and locations ($L_{PROD}$) of one or more of the sets of items 185-1, 185-2, 185-3, 185-4, 185-5, 185-6, 185-7, which may be determined from planogram data associated with the scene 110 or the storage unit 170, or from any other source. The image 125A-1 may also be processed to crop or otherwise isolate portions ($C_{HAND}$)$_1$, ($C_{HAND}$)$_2$ of the image 125A-i that depict the hands of the actor 180-1, and to determine whether either or both of such portions ($C_{HAND}$)$_1$, ($C_{HAND}$)$_2$ include any items therein. In some implementations, the sets of features 140A-1-$i$ may further include identities or labels of items determined to be within the hands of the actor 180-1, e.g., e.g., based on an analysis of one or both of such portions ($C_{HAND}$)$_1$, ($C_{HAND}$)$_2$.

Figure 1F:
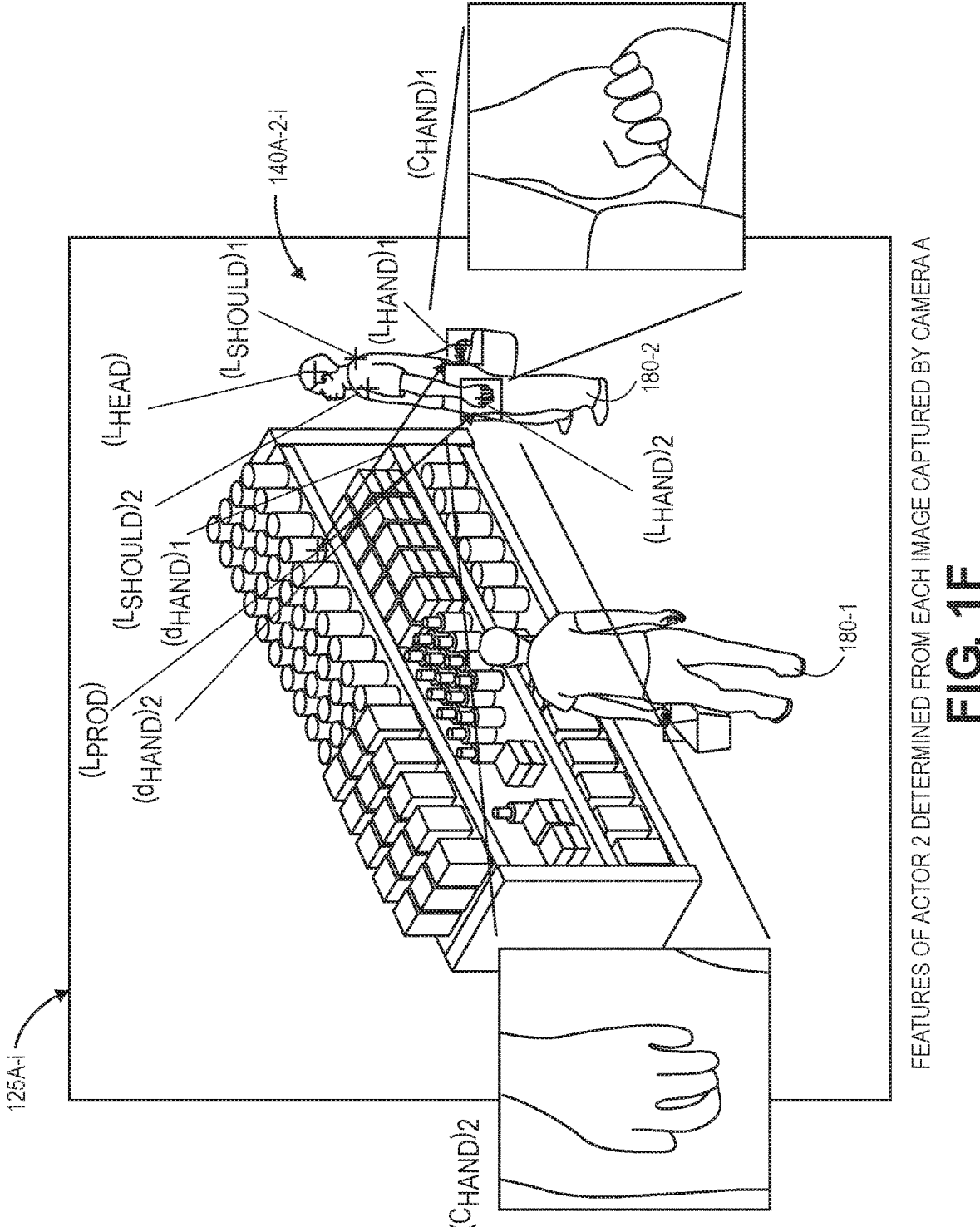

Similarly, as is shown in FIG. 1F, sets of features 140A-2-$i$ regarding the actor 180-2 are determined from the image 125A-i, e.g., by one or more machine learning systems, to identify locations of one or more body parts of the actor 180-2 within the image 125A-1, a location ($L_{HEAD}$) of the actor 180-2, locations ($L_{HAND}$)$_1$, ($L_{HAND}$)$_2$ of hands of the actor 180-2, or locations ($L_{SHOULD}$)$_1$, ($L_{SHOULD}$)$_2$ of shoulders of the actor 180-2. The image 125A-1 or the locations ($L_{HAND}$)$_1$, ($L_{HAND}$)$_2$ of the hands of the actor 180-2 may be further processed to calculate distances ($d_{HAND}$)$_1$, ($d_{HAND}$)$_2$ between the locations ($L_{HAND}$)$_1$, ($L_{HAND}$)$_2$ of each of the hands of the actor 180-2 and locations ($L_{PROD}$) of one or more of the sets of items 185-1, 185-2, 185-3, 185-4, 185-5, 185-6, 185-7, which may be determined from planogram data or from any other source, or to crop or isolate portions ($C_{HAND}$)$_1$, ($C_{HAND}$)$_2$ of the image 125A-i that depict the hands of the actor 180-2, and to determine whether either or both of such portions ($C_{HAND}$)$_1$, ($C_{HAND}$)$_2$ include any items therein, or to identify any such items.

Figure 1G:
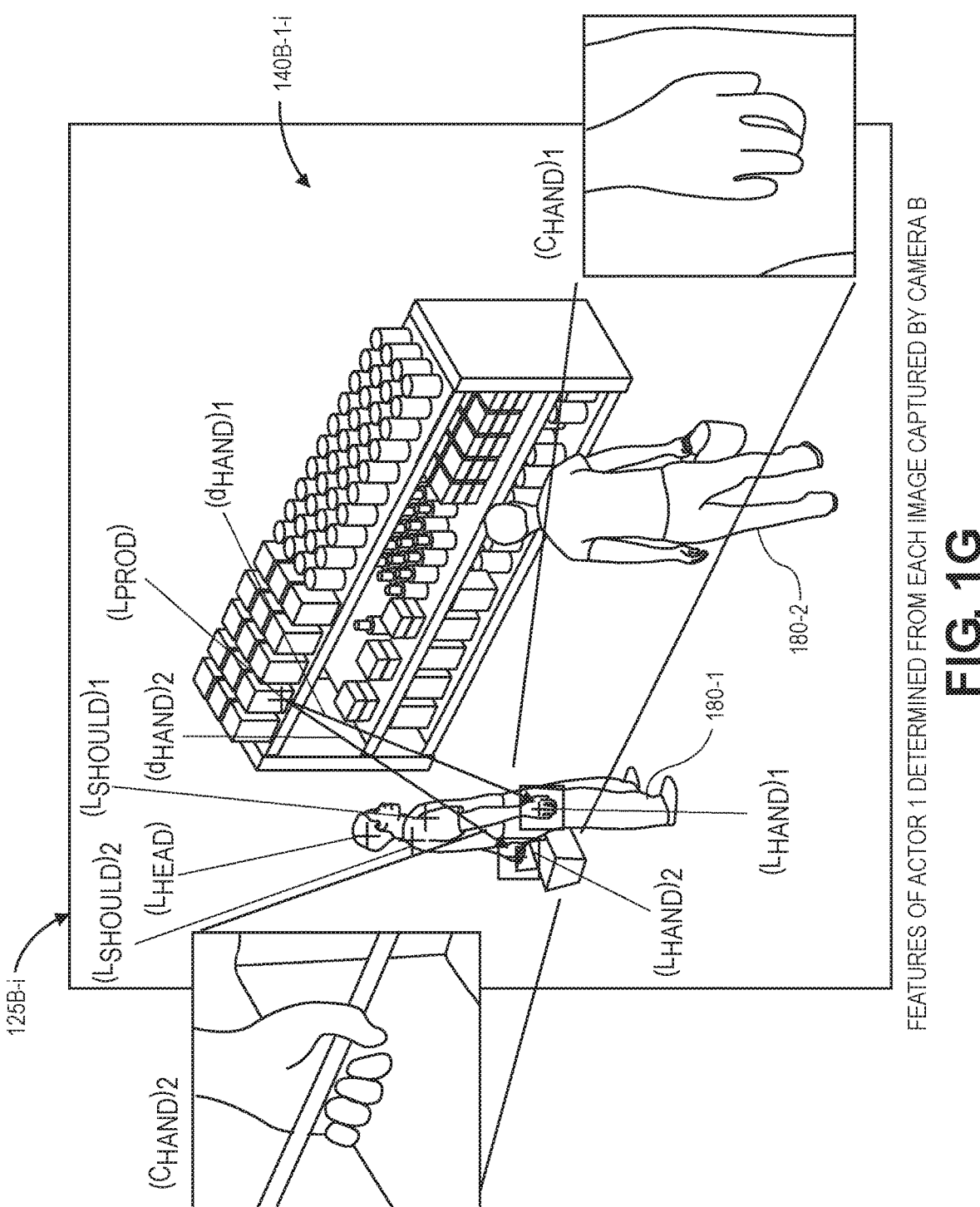
Figure 1H:
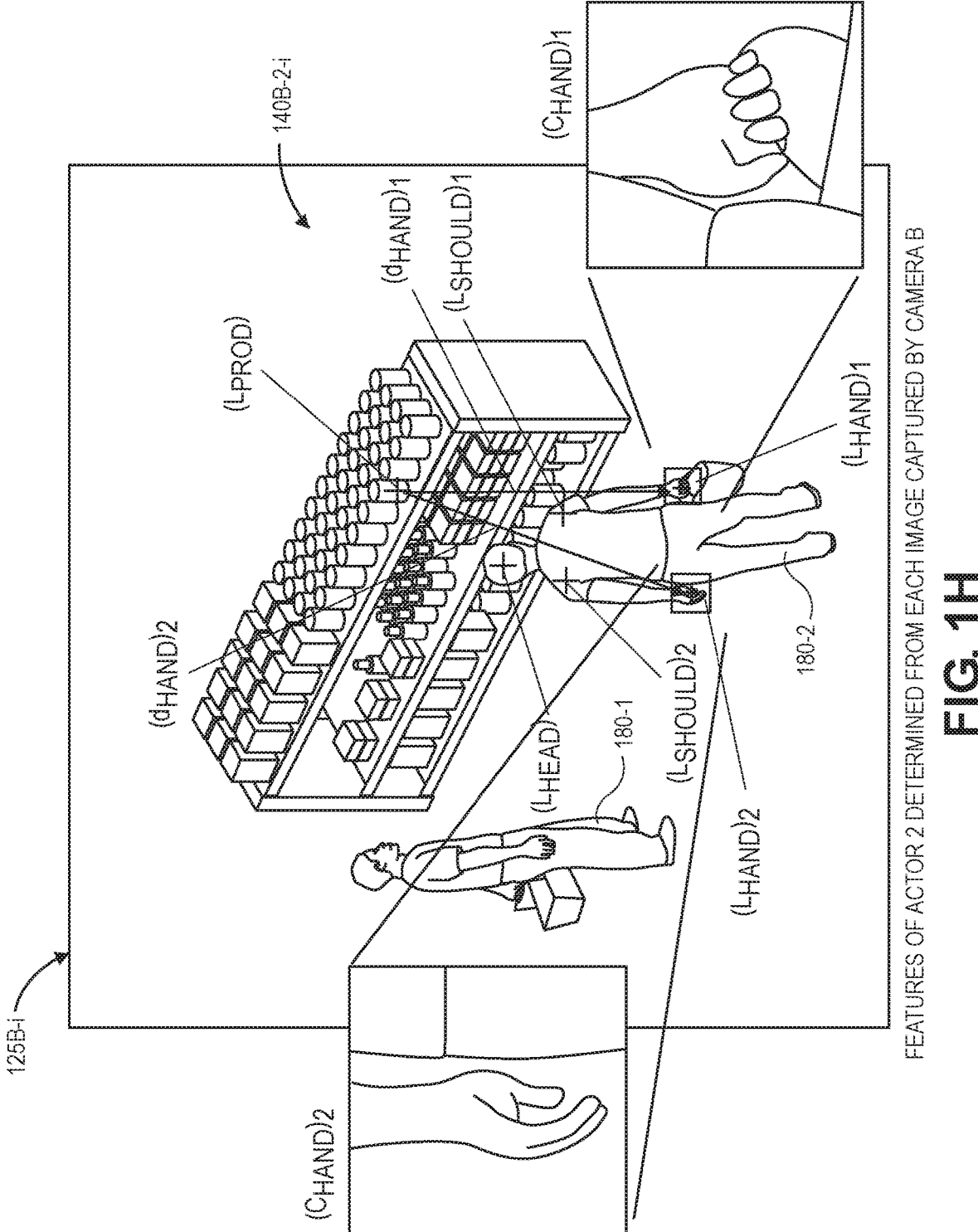
Figure 11:
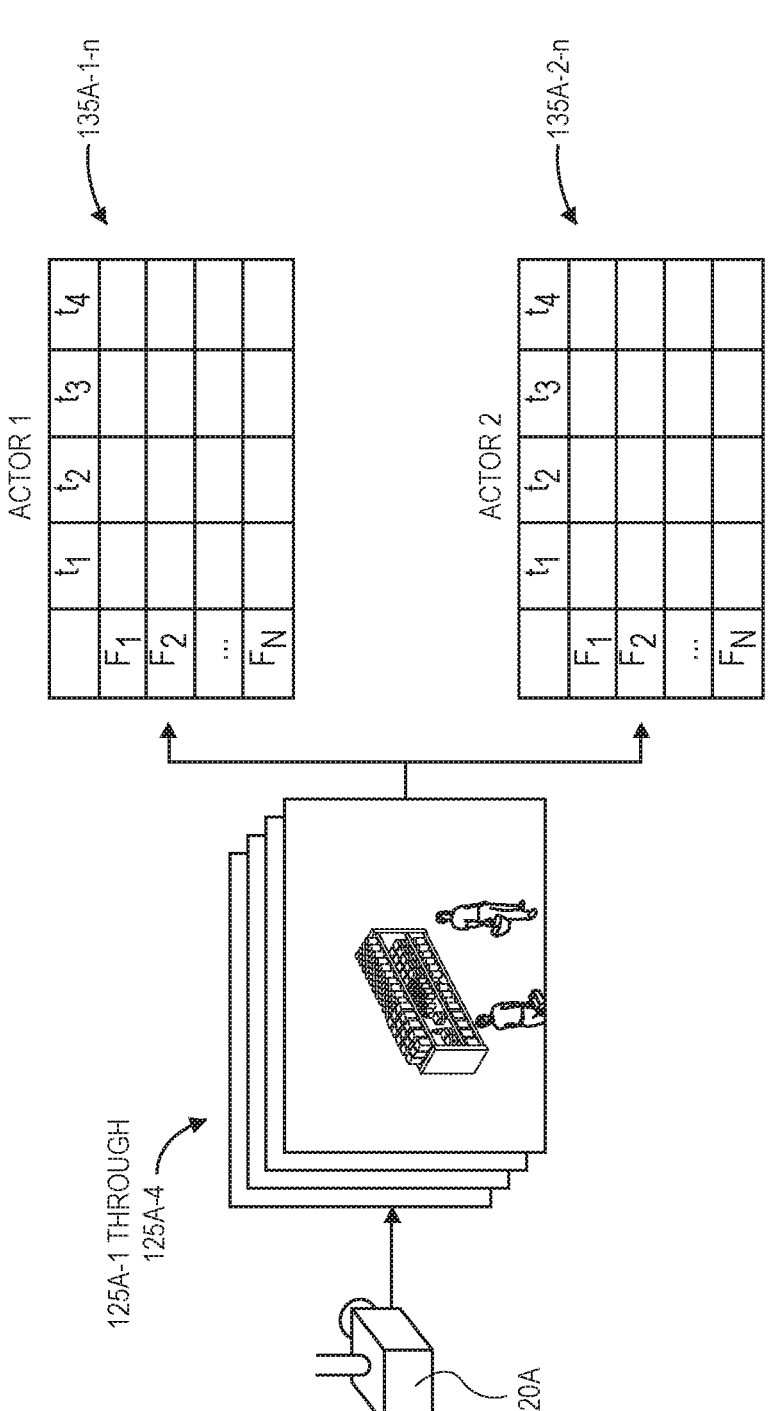

Likewise, as is shown in FIGS. 1G and 1H, sets of features 140B-1-$i$, 140B-2-$i$ regarding the actors 180-1, 180-2, respectively, may be determined from a representative one of the images 125B-i captured by the camera 120B during the window of time. The sets of features 140B-1-$i$, 140B-2-$i$ determined from the image 125B-i may include or correspond to the same sets of features 140A-1-$i$, 140A-2-$i$ determined from the image 125A-i, as shown in FIGS. 1E and 1F, including but not limited to locations of heads ($L_{HEAD}$), hands ($L_{HAND}$)$_1$, ($L_{HAND}$)$_2$, shoulders ($L_{SHOULD}$)$_1$, ($L_{SHOULD}$)$_2$ of the respective actors 180-1, 180-2. Additionally, distances ($d_{HAND}$)$_1$, ($d_{HAND}$)$_2$ between the locations of the hands ($L_{HAND}$)$_1$, ($L_{HAND}$)$_2$ and locations of items ($L_{PROD}$) may be calculated, and portions ($C_{HAND}$)$_1$, ($C_{HAND}$)$_2$ of the image 125B-i depicting hands may be cropped or isolated and analyzed to determine whether such portions depict any items within the respective hands, or to identify any such items.

Although the determination of features 140A-1-$i$, 140A-2-$i$ of the actors 180-1, 180-2 shown in FIGS. 1E and 1F are made with respect to the representative image 125A-i captured by the camera 120A, and the determination of features 140B-1-$i$, 140B-2-$i$ of the actors 180-1, 180-2 shown in FIGS. 1G and 1H are made with respect to the representative image 125B-i captured by the camera 120B, corresponding features may be determined in the same manner from each of the images 125A-1, 125A-2, 125A-3, 125A-4 captured by the camera 120A during a window of time, or from each of the images 125B-1, 125B-2, 125B-3, 125B-4 captured by the camera 120B. Moreover, windows of time over which images may be captured and processed may have any duration, and a number of images processed to determine features of actors depicted within such images may be selected or defined in any manner, e.g., a frame rate of a camera, with respect to the duration.

In accordance with implementations of the present disclosure, time series of data, e.g., values of data regarding features of actors or other attributes determined from images captured over a window of time, may be generated by cameras that captured the images and provided to a server or other computer device or system. As is shown in FIG. 1I, the camera 120A generates a time series 135A-1-$n$ of data regarding features $F_1$, $F_2$ . . . . $F_N$ of the actor 180-1 determined from the images 125A-1 through 125A-4 captured by the camera 120A during the window of time including the times $t_1$, $t_2$, $t_3$, $t_4$. The camera 120A also generates a time series 135A-2-$n$ of data regarding features $F_1$, $F_2$ . . . . $F_N$ of the actor 180-2 determined from the images 125A-1 through 125A-4 captured by the camera 120A during the window of time including the times $t_1$, $t_2$, $t_3$, $t_4$. The time series 135A-1-$n$ and the time series 135A-2-$n$ may be files, records, or sets of data in the form of a matrix or an array, e.g., a sparse matrix or a sparse array, that associates values of the features with the times $t_1$, $t_2$, $t_3$, $t_4$ at which the respective images 125A-1 through 125A-4 from which the features are determined were captured. The camera 120A may generate the time series of data regarding such features for each of the actors depicted within the images 125A-1 through 125A-4, viz., the actors 180-1, 180-2, and for any number of windows or durations of time. Moreover, where data is unavailable for a particular feature at a given time, e.g., where a specific body part or object was not detected within an image captured at that time, a value of data for the feature within the time series may be zero, or may be left blank or empty.

Figure 1J:
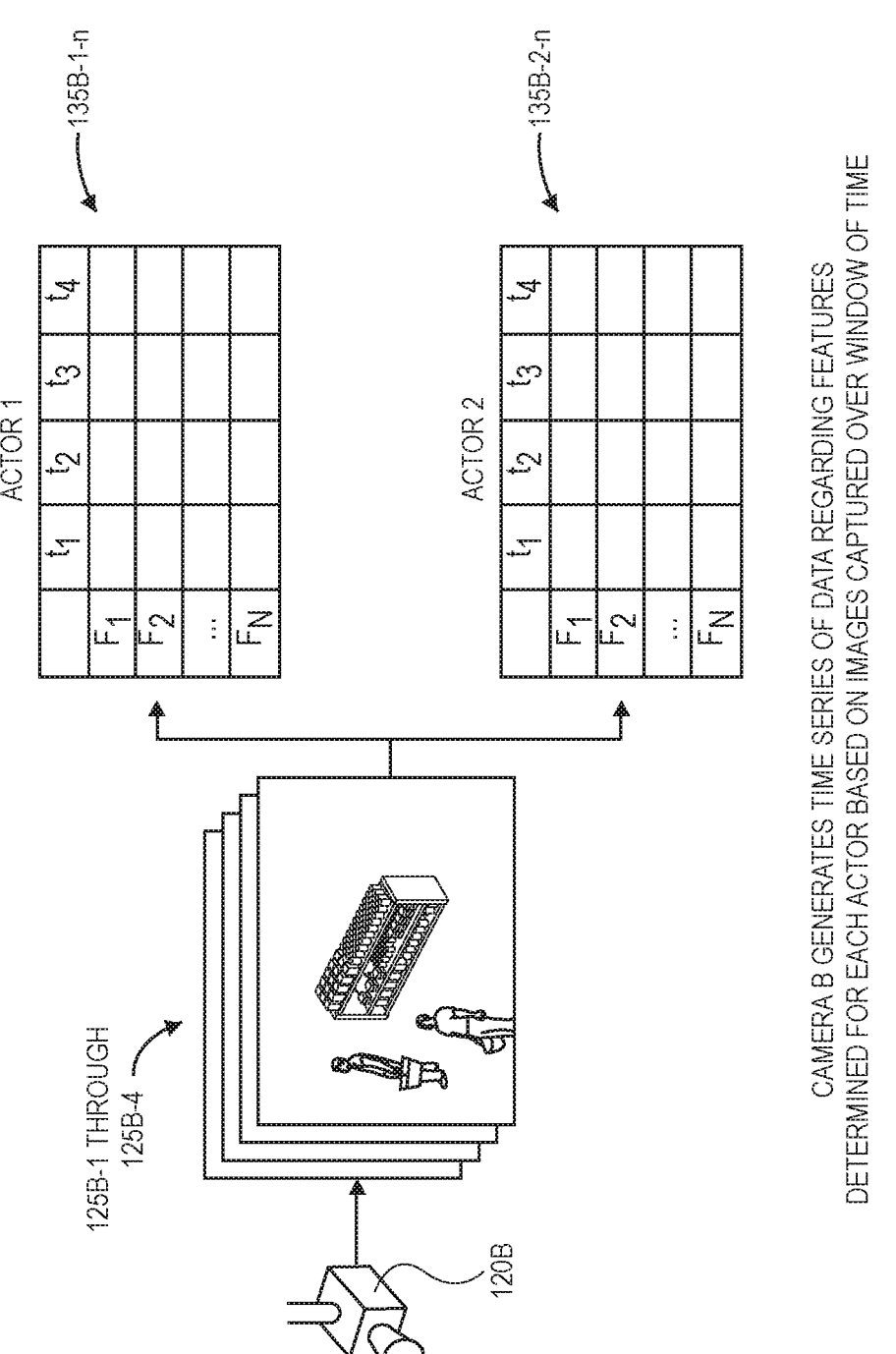

Similarly, as is shown in FIG. 1J, the camera 120B generates a time series 135B-1-$n$ of data regarding features $F_1$, $F_2$ . . . . $F_N$ of the actor 180-1 determined from the images 125B-1 through 125B-4 captured by the camera 120B during the window of time including the times $t_1$, $t_2$, $t_3$, $t_4$. The camera 120B also generates a time series 135B-2-$n$ of data regarding features $F_1$, $F_2$ . . . . $F_N$ of the actor 180-2 determined from the images 125B-1 through 125B-4 captured by the camera 120B during the window of time including the times $t_1$, $t_2$, $t_3$, $t_4$. Like the time series 135A-1-$n$ and the time series 135A-2-$n$, the time series 135B-1-$n$ and the time series 135B-2-$n$ may be files, record, or sets of values of data in the form of a matrix or an array, e.g., a sparse matrix or a sparse array, that associates values of the features with the times $t_1$, $t_2$, $t_3$, $t_4$ at which the respective images 125B-1 through 125B-4 from which the features are determined were captured.

Figure 1K:
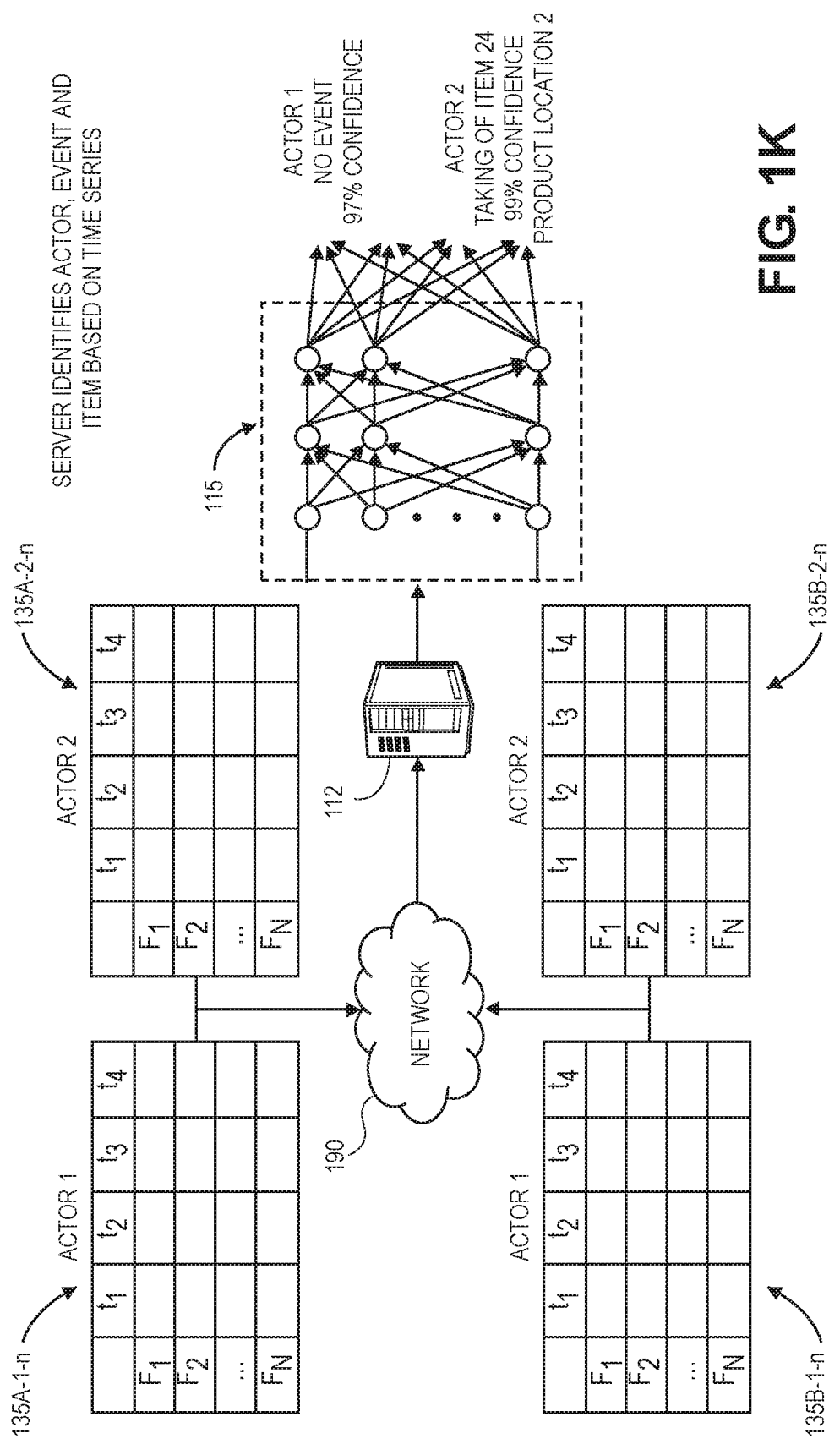

As is shown in FIG. 1K, the time series 135A-1-$n$, the time series 135A-2-$n$, the time series 135B-1-$n$ and the time series 135B-2-$n$ are transmitted by the cameras 120A, 120B to a server 112 over a network 190, which may include the Internet in whole or in part. The server 112 may be configured to operate a machine learning system 115 that is trained to associate such features with an event of a type or kind, e.g., a taking of an item, a return of an item, or an event that includes neither a taking nor a return of an item, as well as to identify an actor responsible for the event, and a location associated with the event. The machine learning system 115 may be an artificial neural network, such as a convolutional neural network, operating on the server 112, and may be constructed with a common, shared backbone and with one or more separate middle layers, task layers, decoding layers or others. Alternatively, or additionally, the machine learning system 115 may be a convolutional neural network having one or more layers dedicated to the performance of each of a plurality of tasks, e.g., in a common architecture.

As is also shown in FIG. 1K, the server 112 may determine, e.g., based on one or more outputs received from the machine learning system 115 in response to inputs of the time series 135A-1-$n$, 135B-1-$n$, that the actor 180-1 was not involved in an event, as well as a confidence level (or confidence score) in that determination. As is further shown in FIG. 1K, the server 112 may also determine, e.g., based on one or more outputs received from the machine learning system 115 in response to inputs of the time series 135A-2-$n$, 135B-2-$n$, that the actor 180-2 was involved in a taking of an item, and a location of the taking, or an identity of the item, as well as a confidence level (or confidence score) in that determination.

Accordingly, the systems and methods of the present disclosure are directed to detecting events based on visual images and machine learning. More specifically, images captured by a camera over a window or finite duration of time may be processed to detect one or more features of actors depicted within the images, such as locations of hands, heads, shoulders or other parts of arms, or other body parts of the actors, to calculate distances from locations of hands to locations of products, or to identify portions of the images depicting hands and to process such portions to determine whether the hands are empty or full, or to identify an item within one or more hands. The features may be calculated for each of the actors depicted within images captured over the window or finite duration of time. Time series of values of data representative of each of such features may be constructed for each of the actors and provided to a machine learning system that is trained to determine whether data regarding such features represents an event, e.g., a taking event, a return event, or an event that is neither a taking or a return, to determine which of the actors is associated with the event, or to identify an item associated with the event.

Machine learning systems may be trained to associate any number of features regarding an actor determined from images captured by a camera with an event, either independently or in one or more combinations. In some implementations, a time series of values of data regarding features calculated for an actor may be provided to a trained machine learning system in an iterative manner. For example, a time series of data regarding a baseline feature calculated for an actor, or a set of baseline features so calculated, based on images captured during a window or duration of time may be initially provided as inputs to a machine learning system that is trained to determine whether an actor has executed an event involving an item based on one or more of such features. If an event such as a taking event, a return event, or an event that is neither a taking nor a return is determined to have occurred, and an identity of an actor responsible for the event or an item involved in the event may be determined based on outputs received from the machine learning system in response to the data regarding the baseline feature or features, no further computations need be performed.

If an event may not be determined to have occurred based on outputs received in response to the data regarding the baseline feature or features, however, one or more supplemental features calculated for the actor may be identified based on the output. Time series of values of data regarding the baseline feature or features, and the one or more supplemental features, may then be provided as inputs to the machine learning system, with a goal of determining whether an event has occurred, or identifying an actor responsible for the event, or an item involved in the event, based on outputs received from the machine learning system. Data regarding additional supplemental features that are calculated from the images captured during the window or fixed duration of time may be provided with data regarding the baseline feature or features, and any other supplemental features, until the event, the actor and/or the location are identified with a sufficiently high level of confidence, or until data regarding the supplemental features is no longer available.

Accordingly, some implementations of the present disclosure may determine that an event has occurred, and identify an actor responsible for the event or an item involved in the event, more efficiently than existing techniques for detecting events using imaging data and machine learning. Rather than providing values of data derived independently from individual images captured at discrete times to a machine learning system, the systems and methods of the present disclosure may operate by constructing time series of values of data regarding features of actors derived from a set of images captured over a period of time (e.g., a window or finite duration), and providing such time series to a machine learning system that is trained to determine whether an event has occurred, to identify an actor responsible for the event, or to identify an item involved in the event. The features may be determined from the set of images using any algorithm, system, tool or technique, in any order and on any basis. Moreover, if the machine learning system is able to determine that an event has occurred, or identify the actor or the item associated with the event, based on a time series of values of data regarding one or more baseline features alone, data regarding any supplemental features need not be calculated or generated, and processing capacity, power or bandwidth of a server or other computer system that captured the images may be conserved accordingly.

For example, where a baseline feature comprises locations of hands of an actor on a scene determined from a plurality of images captured during a window or finite duration of time, a time series of values of data regarding such locations at times at which each of such images was captured may be provided to a machine learning system that is trained to determine whether an actor has executed an event during the window or finite duration based on such features as inputs. If whether an actor has executed an event may be determined based on outputs received in response to the data regarding such locations at such times, no other supplemental features regarding the actor need be determined from the plurality of images.

If, however, whether the actor has executed an event may not be determined based on the outputs received in response to the data regarding such locations at such times, supplemental features such as statuses of the hands of the actor, e.g., when the hands are empty or full during the window or finite duration, distances from the hands to one or more locations of items, or locations of other body parts such as heads or shoulders (or other parts of arms) may be determined from the images. A time series of values of data regarding the locations of the hands of the actor may be provided to the machine learning system as inputs along with a time series of values of data regarding one or more of the supplemental features, either independently or in combination with one another, until whether an event involving an item has occurred may be determined based on outputs received from the machine learning system. One or more of the features regarding the actor may be determined from the plurality of images only on demand, or as necessary, and need not be determined based on every image.

The use of features determined from a set of images captured during a window or finite duration to determine whether an event has occurred, or to identify an actor responsible for the event or an item involved in the event, rather than data derived from each of the images individually, may provide numerous advantages. For example, a time series of values of data constructed from one or more features derived from a set of images captured during a window or finite duration may be helpful in not only determining whether an event has occurred but also in classifying the event. For example, if a time series of values of data regarding locations of hands of an actor indicates that after extending a hand toward a storage unit, the actor has manipulated either of the hands in a manner consistent with bagging, the actor is more likely to have taken something from the storage unit, e.g., executed a taking event, than returned something to the storage unit. If a time series of values of data regarding locations of hands of an actor indicates that before extending a hand toward a storage unit, the actor has manipulated each of the hands to reach into a bag, a basket, a cart, a pocket or another vessel, the actor is more likely to have returned something to the storage unit, e.g., executed a return event, than taken something from the storage unit.

Thus, time series of values of data regarding various individual features of an actor may be converted or aggregated into a time series of values of data regarding discrete events or actions, which may be learned by a machine learning system. In some implementations, a discrete event may be represented as a single action, e.g., "taking an item" or "returning an item," or a series of actions (e.g., sub-events), such as "reaching for a shelf" and "placing an item into a bag" or "removing an item from a bag," based on the various features of the actor, or time series of values of data regarding such features. A machine learning system may be trained to detect not only the discrete event but also one or more of the actions based on such features. Moreover, a machine learning system may also be trained to determine a sequence or order of actions based on such features, and to associate a discrete event with actions that are executed by an actor in a given sequence or order. For example, a machine learning system may learn that "placing an item into a bag" typically follows a taking of an item, or that "pausing in front of a storage unit" typically precedes a taking of an item. Similarly, a machine learning system may learn that "removing an item from a bag" typically precedes a return of an item, or that an actor rarely pauses in front of a storage unit when returning an item.

Likewise, a machine learning system may further determine that combinations of actions (e.g., sub-events) associated with both a taking event and a return event may represent or be indicative of an event that is neither a taking nor a return. For example, where a machine learning system receives features indicative of two instances of an actor reaching for or otherwise inserting an arm into a shelf, separated by a brief duration, and no instances of an actor placing an item into a bag or removing an item from a bag, the machine learning system may be trained to determine that the actor has taken an item from the shelf and returned the item to the shelf, and that no taking event or return event has occurred.

In some implementations, one or more processors or processor units provided on cameras or other computer devices or systems may execute artificial neural networks (e.g., convolutional neural networks) that are trained to receive images captured by the cameras as inputs and to generate one or more outputs associated with tasks relating to the images. Such tasks may include detecting body parts (e.g., hands, heads, shoulders or others) within images, identifying portions of images depicting such body parts, analyzing such portions to determine whether any of such body parts includes an item or to identify the item, the calculation of distances between body parts and locations of items. The artificial neural networks may have any number of layers associated with the performance of such tasks, or others.

In some implementations, cameras or other computer devices or systems may be configured to operate machine learning systems that are trained to perform multiple tasks based on a single input. For example, in some implementations, a camera may execute an artificial neural network (e.g., a deep network) that performs body part detection, cropping or isolation, object recognition, or other tasks based on each visual images captured thereby. The artificial neural network may be constructed with a common, shared backbone and with one or more separate middle layers, task layers, decoding layers, or others. In some implementations, the artificial neural network may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network, such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or. JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the imaging data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which locating actors or other target objects is desired, including but not limited to locating humans and/or machines within a materials handling facility, or locating any other objects within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to locate body parts of human operators (e.g., customers, workers or other personnel) and/or component parts of machines (e.g., autonomous mobile robots) and to recognize interactions involving such humans or machines within a materials handling facility, including but not limited to interactions with one or more items (e.g., consumer goods) or other inanimate objects within the materials handling facility. Such systems and methods may also be utilized to locate objects within transportation centers, financial institutions or like structures in which diverse collections of people, objects or machines enter and exit from such environments at regular or irregular times or on predictable or unpredictable schedules. By relying on multiple imaging devices, motion of an object may be located even when the object is occluded in one or more of the fields of view of the imaging devices. Moreover, as used herein, the term "machine learning system" may include, but is not limited to, any type or form of machine learning algorithm, method, operations, system, technique or tool, in a physical or a virtual form, and need not be limited to discrete hardware systems provided for such purposes.

Figure 2A:
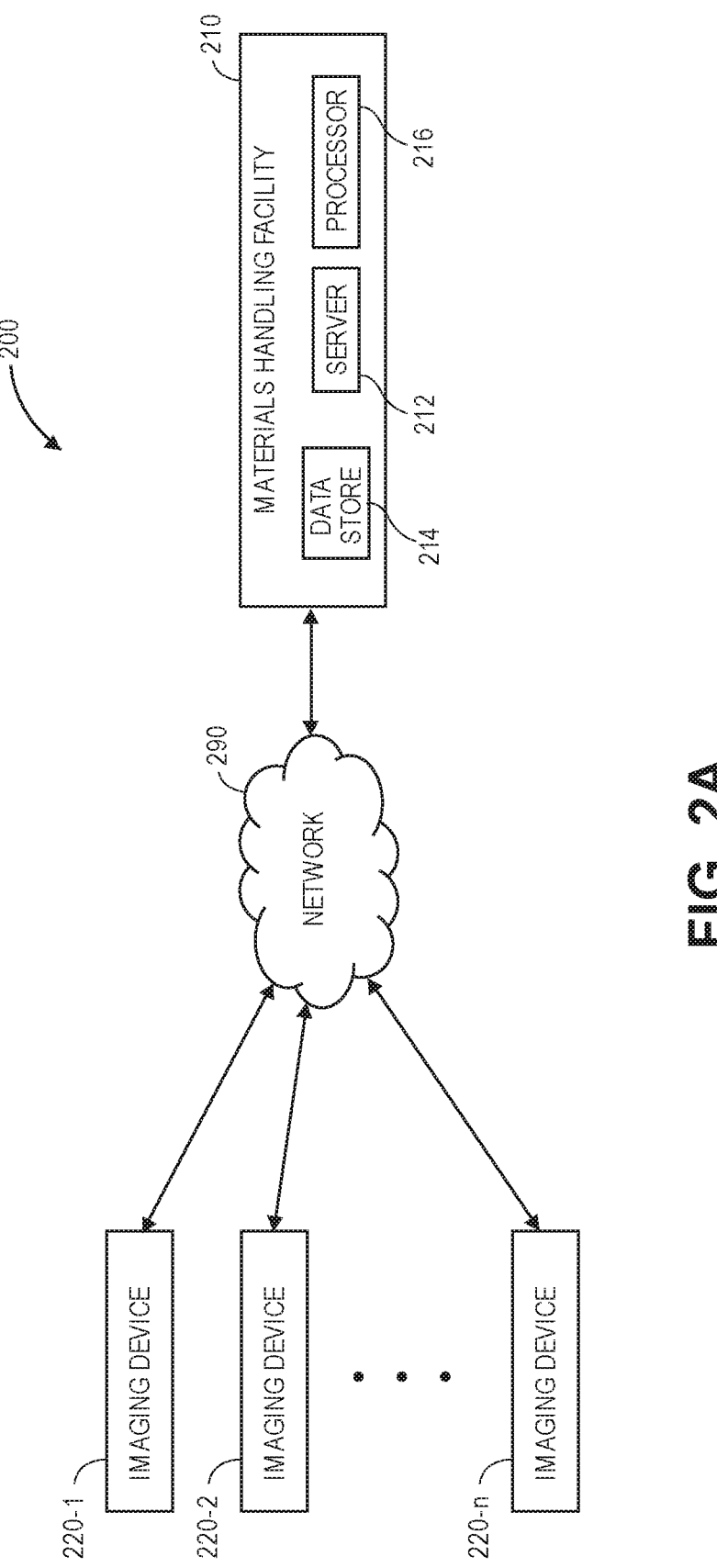
FIGS. 2A and 2B are block diagrams of components of one system for detecting events using visual images and machine learning in accordance with implementations of the present disclosure.
Figure 2B:
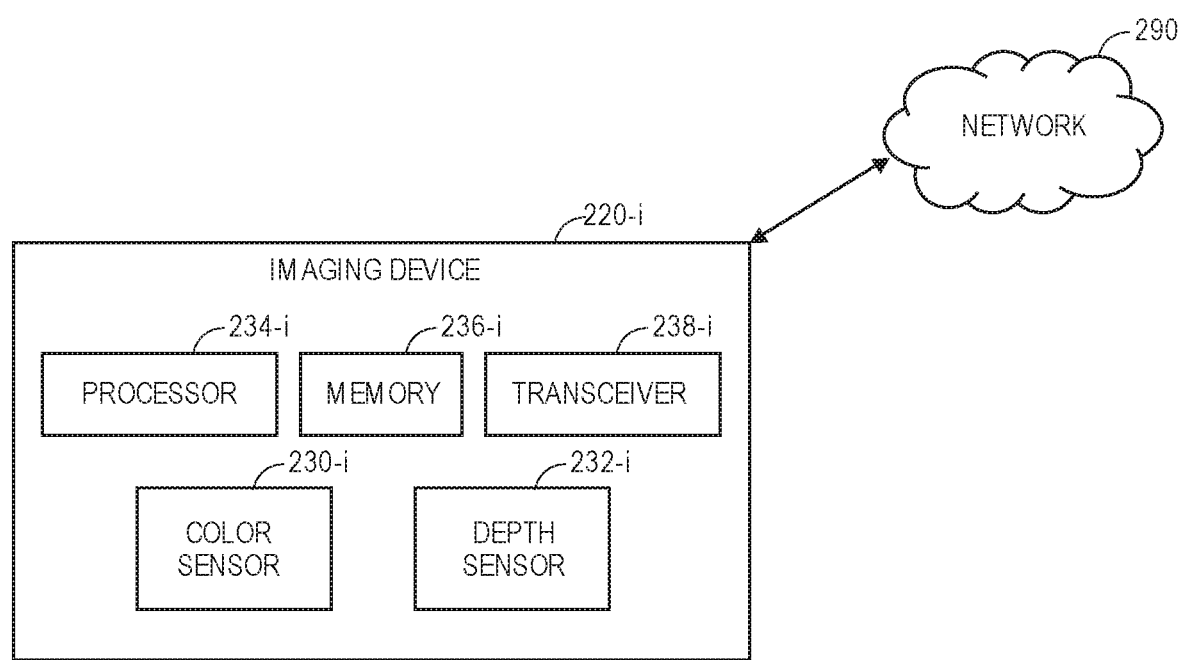

Referring to FIGS. 2A and 2B, a block diagram of components of one system 200 for detecting events using visual images and machine learning in accordance with implementations of the present disclosure is shown. The system 200 includes a materials handling facility 210 and a plurality of imaging devices 220-1, 220-2 . . . 220-n that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1K.

The materials handling facility 210 may be any facility that is adapted to receive, store, process and/or distribute items from a variety of sources to a variety of destinations, e.g., on behalf of or for an electronic marketplace, or on behalf of or for any other entity. The materials handling facility 210 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 210. Upon their arrival at the materials handling facility 210, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be stocked, managed or dispensed in terms of countable, individual units or multiples of units, such as packages, cartons, crates, pallets or other suitable aggregations. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as a user progressing through the materials handling facility 210 desires one or more of the items, inventory items that are listed in the request or order, or are desired by the user, may be taken, selected or "picked" from an inventory area at the materials handling facility 210. For example, in one implementation, a customer or other user may travel through the materials handling facility 210 with a list (e.g., a paper list, or a handheld mobile device displaying or including such a list) and may take, select or pick one or more of the inventory items from an inventory area at the materials handling facility 210. In other implementations, an employee of the materials handling facility 210 or another user may take, select or pick one or more inventory items, as may be directed by one or more written or electronic lists derived from orders or on any other basis. In some instances, an inventory item may be retrieved and delivered to a customer or another user who placed a request for the inventory item. In other instances, the inventory item may require repositioning from one location within an inventory area to another location. For example, in some instances, an inventory item may be taken, selected or picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 210 includes a networked computer infrastructure for performing various computer-related functions associated with the receipt, storage, processing and distribution of such items, including one or more physical computer servers 212, data stores (e.g., databases) 214 and/or processors 216, that may be provided in the same physical location as the materials handling facility 210, or in one or more alternate or virtual locations, e.g., in a "cloud"-based environment. In some implementations, the servers 212, the data stores 214 and/or the processors 216 or any number of other computing devices or resources may further execute any type of computer-based function or compute any type or form of calculation, including but not limited to any formulas, equations, algorithms or techniques for determining one or more probabilities or performing any number of statistical tests.

In some implementations, the servers 212, the data stores 214 and/or the processors 216 may be configured to execute one or more machine learning systems or techniques. For example, in some implementations, the servers 212 may be configured to execute an artificial neural network, such a convolutional neural network, to process imaging data received from one or more of the imaging devices 220-1, 220-2 . . . 220-n over the network 290.

Such computer devices or resources may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 210 may include one or more inventory areas having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 210 may further include one or more receiving stations featuring any apparatuses that may be required in order to receive shipments of items at the materials handling facility 210 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 210 may further include one or more distribution stations where items that have been retrieved from a designated inventory area may be evaluated, prepared and packed for delivery from the materials handling facility 210 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 210 may be transferred directly to a distribution station for further processing, or "cross-docked," without first being placed into storage in an intermediate inventory area. The materials handling facility 210 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 210 may operate one or more order processing and/or communication systems using computer devices or resources in communication with one or more of the servers 212, the data stores 214 and/or the processors 216, or through one or more other computing devices or resources that may be connected to the network 290, in order to transmit or receive information in the form of digital or analog data, or for any other purpose.

The imaging devices 220-1, 220-2 . . . 220-n (or other sensors) may be any form of optical recording devices that may be used to photograph or otherwise record imaging data of structures, facilities or items within the materials handling facility 210, or for any other purpose. The imaging devices 220-1, 220-2 . . . 220-n have diverse fields of view of the materials handling facility 210, or other scenes, that are configured to capture imaging data that may be processed to recognize and locate motion, locations and/or orientations of various actors within the materials handling facility 210. The imaging devices 220-1, 220-2 . . . 220-n may be mounted in any specific location or orientation within the materials handling facility 210, e.g., above, below or alongside one or more inventory areas or stations for receiving or distributing items. Alternatively, the imaging devices 220-1, 220-2 . . . 220-n may be provided in any open or enclosed environment or space in which any number of actors (e.g., humans, other animals or machines) may execute one or more poses, gestures or other actions within one or more of their fields of view.

Each of the imaging devices 220-1, 220-2 . . . 220-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative one of the imaging devices 220-1, 220-2 . . . 220-n, viz., an imaging device 220-i, includes one or more optical sensors, including color sensors (or grayscale sensors or black-and-white sensors) 230-i and/or depth sensors 232-i configured to capture visual imaging data (e.g., textures) or depth imaging data (e.g., ranges) to objects within one or more fields of view of the imaging device 220-i. The imaging device 220-i further includes one or more processors 234-i, one or more memory components 236-i and one or more transceivers 238-i, and any other components (not shown) that may be required in order to capture, analyze and/or store imaging data from within the materials handling facility 210 environment in which the imaging device 220-i is provided. For example, the imaging device 220-i may capture one or more still or moving images (e.g., streams of visual and/or depth images or image frames), along with any relevant audio signals or other information (e.g., position data), and may also connect to or otherwise communicate with the servers 212, or any other computer devices within the materials handling facility 210 (not shown), or with one or more external computer devices over the network 290, through the sending and receiving of digital data. In some implementations, the transceiver 238-i may be configured to enable the imaging device 220-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 212 or over the network 290 directly.

The processors 234-i may be configured to train and/or execute one or more machine learning systems, such as artificial neural networks, e.g., convolutional neural networks, to process imaging data captured by one or more of the color sensors 230-i or the depth sensors 232-i. For example, in some implementations, a machine learning system executed by the processors 234-*i* may be trained by providing information or data representing one or more features of actors to the machine learning system as training inputs, e.g., in a supervised manner, and a set of outputs received from the machine learning system may be compared to a set of training outputs, such as one or more identifiers or indications of an event, including whether an actor is responsible for the event, or an identifier of an item associated with the event. Alternatively, in some implementations, information or data representing one or more features of actors may be provided to the machine learning system as training inputs, e.g., in an unsupervised manner. The machine learning systems executed by the processors 234-*i* may include one or more artificial neural networks (e.g., convolutional neural networks) that are trained to map inputted information or data regarding features of actors, e.g., time series of values of data determined from captured images, to desired outputs by adjusting strengths of connections between one or more neurons, which are sometimes called synaptic weights, and may have any number of layers, e.g., an input layer, an output layer, and any number of intervening hidden layers. Alternatively, the machine learning systems executed by the processors 234-*i* may be any other type or form of algorithm, system or technique.

Moreover, in some implementations, machine learning systems executed by the processors 234-*i* may perform tasks in one or more core areas, including but not limited to body part detections, cropping, evaluation, distance determination, feature extraction, person linking and unlinking, or others. In some implementations, one such machine learning system may be a neural network backbone (e.g., a residual neural network backbone) that is configured to perform one or more tasks for detecting portions of actors, items or products, events or other features based on images captured by the imaging device 220-*i*. The processors 234-*i* may be configured to execute networks (e.g., multi-task networks) having shared backbones and one or more middle layers, task layers, decoding layers or others.

For example, in some implementations, the processors 234-*i* may operate an artificial neural network or other classifier that receives an image (e.g., a visual image, or an RGB image) as an input, and processes the image for one or more person detection functions (e.g., hand detection, head detection, cropping, analysis, distance measurement, or the like) for any number of actors depicted within the image. Based on such detections, visual descriptors of pixels depicting the actors, including but not limited to appearance features of such actors, e.g., sets of information or data identifying colors, textures, shapes or other aspects of features of such actors, may be determined. The processors 234-*i* may also define a trajectory or "tracklet," e.g., a record of the positions of an actor at various times beginning at an initial detection and following with subsequent detections. Trajectories or tracklets and visual descriptors generated by the processors 234-*i* may be used to link detections of actors in consecutively captured frames to one another, or to reidentify a previously detected actor if the actor is not detected for a brief period of time.

In some implementations, nodes corresponding to body parts detected by the imaging devices 220-1, 220-2 . . . 220-*n* may be represented in space by a set of Cartesian coordinates, or coordinates according to any other system, and an articulated model in the form of a record or vector may include one or more of such sets of coordinates. In some implementations, edges extending between a pair of nodes may be established by reference to each of the nodes of the pair, as well as a linear formula, a linear equation or other representation of points extending between the respective nodes of the pair, and an articulated model in the form of a record or a vector may identify edges by reference to their respective nodes, or include one or more of such formulas, equations or other representations for such edges. For example, detections of body parts may be matched across multiple views in two-dimensional images and converted to three-dimensional rays that begin at optical elements of the respective imaging devices and terminate at surfaces of objects at a given pixel, based on the intrinsic properties of such imaging devices and extrinsic properties of a scene, and merged into one, e.g., by triangulating the rays corresponding to such detections, thereby enabling a body part to be detected and re-detected in the multiple views even if the body part is temporarily occluded in one of the views. The trajectories may be models of smoothed three-dimensional tracks that best fit a plurality of two-dimensional observations of a body part within multiple images. In some implementations, trajectories may be defined by minimizing differences between ray projections extending from optical elements of imaging devices to pixels depicting specific body parts detected within images captured by such imaging devices and splines or other curves defined from such frames, e.g., according to a least squares problem. Any method or technique for defining a three-dimensional track or trajectory of a body part or an actor from two-dimensional observations of the body part or the actor in images may be utilized in accordance with the present disclosure.

Moreover, in some implementations, the processors 234-*i* may combine trajectories or tracklets when corresponding positions are sufficiently proximate to one another and one of the trajectories or tracklets has a sufficiently low level of confidence, or on any other basis.

The imaging devices 220-1, 220-2 . . . 220-*n* may be homogenous or heterogeneous in nature, in accordance with the present disclosure. For example, one or more of the imaging devices 220-1, 220-2 . . . 220-*n* may have both the color sensor 230-*i* and the depth sensor 232-*i*. Alternatively, one or more of the imaging devices 220-1, 220-2 . . . 220-*n* may have just a color sensor 230-*i* (or grayscale sensor or black-and-white sensor) or just a depth sensor 232-*i*. For example, in some implementations, one or more of the imaging devices 220-1, 220-2 . . . 220-*n* may be configured to capture depth imaging data, e.g., distances or ranges to objects within their respective fields of view. In some implementations, one or more of the imaging devices 220-1, 220-2 . . . 220-*n* may be configured to capture visual imaging data, e.g., visual images or images in color, grayscale or black-and-white.

For example, one or more of the imaging devices 220-1, 220-2 . . . 220-*n* may be an RGB color camera, a still camera, a motion capture/video camera or any other type or form of camera. In other implementations, one or more of the imaging devices 220-1, 220-2 . . . 220-*n* may be depth-sensing cameras, such as an RGBz or RGBD camera. In still other implementations, one or more of the imaging devices 220-1, 220-2 . . . 220-*n* may be a thermographic or infrared (IR) camera. Additionally, in some implementations, the imaging devices 220-1, 220-2 . . . 220-*n* may simply be camera modules that include a lens and an image sensor configured to convert an optical image obtained using the lens of the camera into a digital signal or digital representation of the image (generally referred to herein as imaging data). In one implementation, the image sensor may be an RGB sensor capable of supporting an image resolution of at least 860×480 at six frames per second that may likewise be configured to provide imaging data to other components (e.g., a graphics processing unit) for processing. In some implementations, the imaging devices 220-1, 220-2 . . . 220-n may be paired to provide stereo imagery and depth information, and may include a pair of camera modules. Additionally, imaging data may be stored in any variety of formats, including but not limited to YUYV, RGB, RAW, .bmp, jpeg, gif, or the like.

The imaging devices 220-1, 220-2 . . . 220-n may also include manual or automatic features for modifying their respective fields of view or orientations. For example, one or more of the imaging devices 220-1, 220-2 . . . 220-n may be configured in a fixed position, or with a fixed focal length (e.g., fixed-focus lenses) or angular orientation. Alternatively, one or more of the imaging devices 220-1, 220-2 . . . 220-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 220-1, 220-2 220-n, or changes in one or more of the angles defining the angular orientation.

For example, one or more of the imaging devices 220-1, 220-2 . . . 220-n may be hard-mounted to a support or mounting that maintains the device in a fixed configuration or angle with respect to one, two or three axes. Alternatively, however, one or more of the imaging devices 220-1, 220-2 . . . 220-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device. In some implementations, two or more of the imaging devices 220-1, 220-2 . . . 220-n may be provided within a common housing, e.g., a dual camera module housing.

Some of the imaging devices 220-1, 220-2 . . . 220-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of the imaging devices 220-1, 220-2 . . . 220-n, e.g., digital cameras, may be affected based on the lighting conditions and characteristics of the scenes in which the imaging devices 220-1, 220-2 . . . 220-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the system 200 of FIG. 2A includes boxes corresponding to three imaging devices 220-1, 220-2 . . . 220-n, those of ordinary skill in the pertinent arts will recognize that any number or type of imaging devices may be provided within the materials handling facility 210 in accordance with the present disclosure, including but not limited to digital cameras, depth sensors or range cameras, infrared cameras, radiographic cameras or other devices having one or more optical sensors. In some implementations, the system 200 (e.g., the materials handling facility 210) may include dozens or even hundreds of imaging devices of any type or form. Moreover, the system 200 (e.g., the materials handling facility 210) may also include any other type of sensing systems for detecting actors and recognizing their motion, locations and/or orientations within the materials handling facility 210. Such sensors may include, but are not limited to, one or more load or weight sensors provided on walking or traveling surfaces within the materials handling facility 210, one or more RFID components (e.g., antennas or tags) for transmitting and/or receiving RFID signals associated with actors, one or more LIDAR sensors or receivers for detecting actors, or any other systems or components by which information regarding actors and their motion, locations and/or orientations may be gathered. The type or form of sensors that may gather information or data regarding actors and their motion, locations and/or orientations at the materials handling facility 210 are not limited.

The materials handling facility 210 may also include any number of other sensors, components or other features for controlling or aiding in the operation of the materials handling facility 210, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The materials handling facility 210 may also include one or more human operators (not shown), such as one or more workers, who may be any designated personnel tasked with performing one or more tasks within the materials handling facility 210 in general, or within one or more inventory areas, receiving stations, distribution stations or other locations of the materials handling facility 210 in particular. Such workers may handle or transport items (e.g., any type or form of good, product, media or other tangible consumer article) within the materials handling facility 210, or operate one or more pieces of equipment therein (not shown). Such workers may also operate one or more specific computing devices or resources for registering the receipt, retrieval, transportation or storage of items within the materials handling facility 210, e.g., a general purpose device such as a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the servers 212, with one or more of the imaging devices 220-1, 220-2 . . . 220-n, or with one or more computer devices or resources, such as the servers 212, over the network 290, as well as a display (e.g., a touchscreen display) to facilitate the visible presentation to and interaction with a human operator.

The servers 212 or any other computer devices associated with the materials handling facility 210 or connected to the network 290 may execute one or more multi-camera tracking algorithms or techniques. For example, in some implementations, the imaging devices 220-1, 220-2 . . . 220-n may provide their respectively determined trajectories or tracklets of actors and visual descriptors of pixels of images (e.g., appearance features, motion properties and geometry) depicting the actors to the server 212. Additionally, the server 212 may map single-camera trajectories or tracklets to positions in 3D space based on their respective predicted 3D line segments and their corresponding appearance features, motion properties and geometry in 3D space for the respective trajectories or tracklets. The server 212 may then correlate or merge trajectories or tracklets received from multiple ones of the imaging devices 220-1, 220-2 . . . 220-n into multi-camera trajectories or tracklets, and assign identifiers to the respectively correlated or merged trajectories or tracklets.

The servers 212 may further associate any multi-camera trajectories or tracklets with identifiers of actors within the materials handling facility 210 in any manner. For example, a unique identifier may be assigned to each multi-camera trajectory or tracklet, e.g., and such multi-camera trajectories or tracklets may be tracked based on single-camera trajectories or tracklets, and visual descriptors, received from the respective imaging devices 220-1, 220-2 220-n.

In some implementations, the system 200 may further include one or more event generator systems comprising sensors that are provided in one or more select locations within the materials handling facility 210. Each of such sensors may be configured to detect information or data from which a location at which an event has occurred, or a time (or duration) of the event, e.g., an interval of time that includes the time of the event. In some implementations, an item associated with an event may be identified based on the location and/or the time (or duration) of the event based on planogram data, which may indicate the placement of one or more items in inventory areas or storage units within the materials handling facility 210.

For example, one or more of such sensors may be an imaging device configured to capture imaging data regarding an inventory area and/or storage unit, e.g., one or more of the imaging devices 220-1, 220-2 . . . 220-n, and whether an event has occurred, and a time of such an event, may be determined based on such imaging data. One or more of such sensors may include load or weight sensors provided in association with an inventory area or storage unit, and whether an event has occurred, and a time of such an event, may be determined based on load signals received from such load or weight sensors or, alternatively, changes in load signals indicating increases or decreases in loading applied to the inventory area or storage unit. An item associated with such an event may be determined based on one or more magnitudes of such changes. For example, when an actor is determined to have accessed an inventory area or shelving unit to retrieve an item therefrom at a specific location, and a number of items are located within a vicinity of the specific location, a change in the mass of all of the items present on the shelf may be determined, and one of the items within the vicinity of the specific location having a mass consistent with the determined change in the mass of all of the items present on the shelf may be presumed to have been retrieved by the actor.

Alternatively, one or more of such sensors may include RFID components (e.g., antennas or tags) for transmitting and/or receiving RFID signals associated with items or inventory areas and/or storage units, and whether an event has occurred, and a time of such an event, may be determined based on the receipt of such signals, or the loss of such signals. An item associated with such an event may be determined based on the respective RFID signals that are transmitted or received, or are no longer received. As another alternative, one or more of such sensors may include one or more LIDAR components for transmitting and/or receiving one or more light signals in association with inventory areas and/or storage units, and whether an event has occurred, and a time of such an event, may be determined based on the light signals that are transmitted or received.

The type or form of such sensors provided in association with an event generator system are not limited. Moreover, one of the sensors may be in communication with a central processor or server of an event generator system that may receive information or data from such sensors, and provide such information or data (e.g., digital and/or analog data) to one or more other computing devices or resources that may be connected to the network 290, or for any other purpose. Alternatively, one or more of such sensors may be outfitted with processors and/or transceivers for independently transmitting or receiving information or data (e.g., digital and/or analog data) to or from one or more other computing devices or resources that may be connected to the network 290, or for any other purpose.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link or any other aspect of the present disclosure.

Those of ordinary skill in the pertinent arts will understand that process steps described herein as being performed by a "materials handling facility," an "actor" (or "customer," or "user," or "worker," or "human operator") or like terms, may be automated steps performed by their respective computer devices or resources, or implemented within software modules (or computer programs) executed by one or more general purpose computers. Those of ordinary skill in the pertinent arts would also recognize that process steps described as being performed by a "materials handling facility," or an "actor" (or "customer," or "user," or "worker," or "human operator") may be typically performed by a human, but could, alternatively, be performed by an automated agent.

The materials handling facility 210 (or any actors associated therewith) and/or the imaging devices 220-1, 220-2 . . . 220-n may use any web-enabled or Internet applications or features, any other client-server applications or features, or other messaging techniques, to connect to the network 290 or to communicate with one another. For example, the servers 212 may be adapted to transmit or receive information or data in the form of synchronous or asynchronous messages to or from the imaging devices 220-1, 220-2 . . . 220-n, or any other computer device (e.g., any device having any number of other servers, data stores, processors or the like) in real time or in near-real time, or in one or more offline processes, via the network 290. Those of ordinary skill in the pertinent art would recognize that the materials handling facility 210 (or any actors associated therewith) or the imaging devices 220-1, 220-2 . . . 220-n may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a transitory and/or non-transitory computer-readable medium that is within or accessible by computers or computer components such as the servers 212, the data stores 214, the processor 216, the imaging devices 220-1, 220-2 . . . 220-n, the processor 234-i, or any other computers or control systems having sequences of instructions which, when executed by a processor (e.g., a central processing unit, or "CPU," or a graphics processing unit, or "GPU"), cause the processor to perform all or a portion of the functions, services and/or methods described herein. Such computer-executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources. In some implementations, each of such functions or tasks may be executed by processors associated with an imaging device, or two or more imaging devices, which may control one or more aspects of the capture, processing and/or storage of imaging data. In some other implementations, each of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors associated with one or more imaging devices, while other functions or tasks may be executed by processors located in one or more other physical, alternate or virtual locations.

Figure 3:
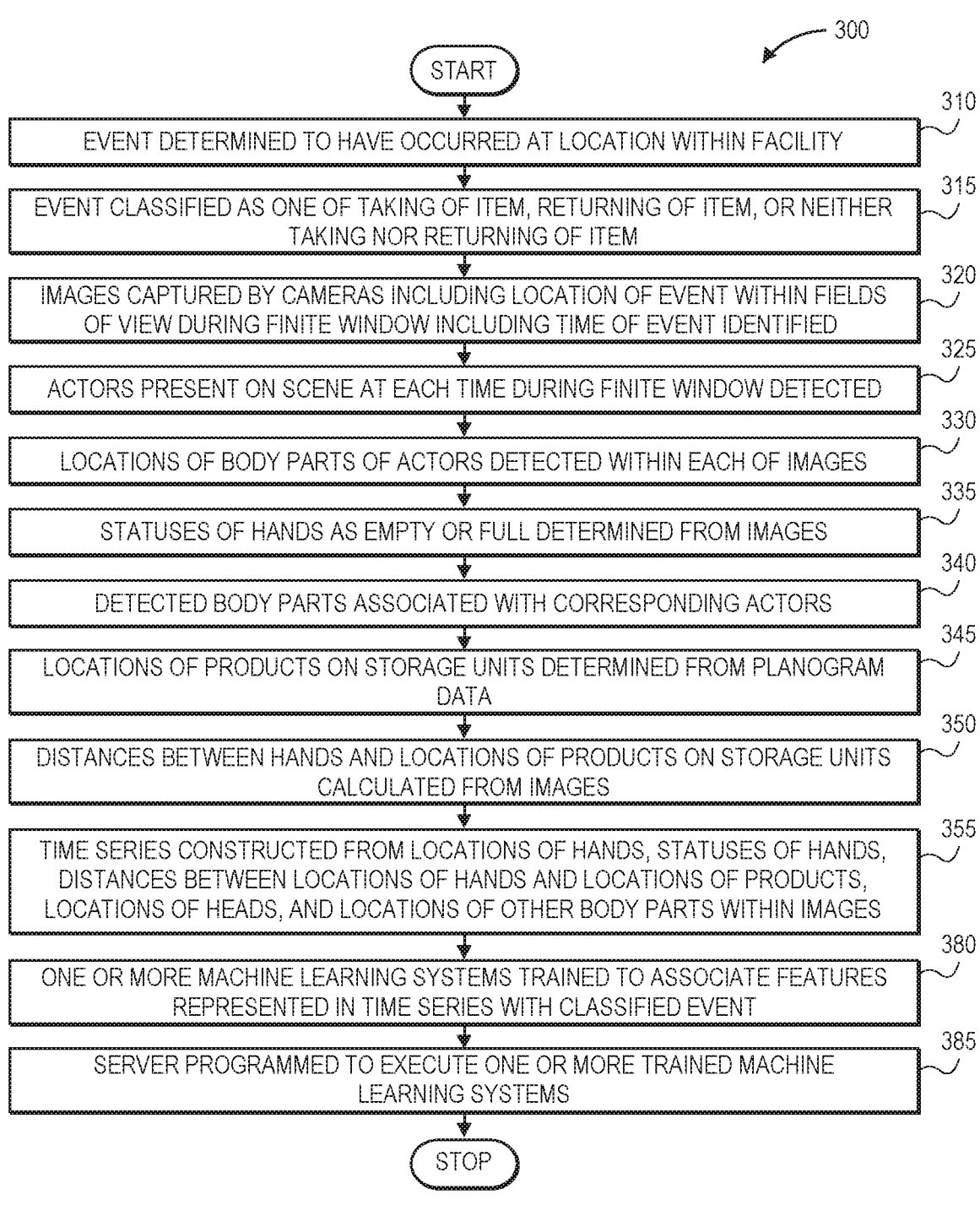
FIG. 3 is a flow chart of one process for detecting events using visual images and machine learning in accordance with implementations of the present disclosure.

Referring to FIG. 3, a flow chart 300 of one process for detecting events using visual images and machine learning in accordance with implementations of the present disclosure is shown. At box 310, an event is determined to have occurred at a location within a facility. For example, the event may have been determined to have occurred by a human operator, e.g., based upon a forensic review of information or data captured prior to, during or after the event, or in any other manner. Alternatively, the event may have been determined to have occurred based on data captured by one or more sensors, e.g., one or more load sensors that detected a change in mass or weight on one or more storage units or other systems at the facility, or a comparison of inventory levels at different times within the facility, as determined from imaging data, inventory data, or any other data. Alternatively, the event may be determined to have occurred based on a detected entry of a hand or other body part into a storage unit or other system, or a detected removal of the hand or other body part from the storage unit or other system, e.g., from images, LIDAR data, or any other information or data captured by one or more sensors associated with the storage unit. In some implementations, an event may be determined to have occurred based on one or more specific actions (e.g., sub-events) that are observed or determined to have occurred based on any information or data captured prior to, during or after the event, or in any other manner.

Moreover, the location may be specifically associated with one or more discrete items, generally associated with one or more types of items, or not associated with any particular items or types of items. The facility may be a materials handling facility, such as a warehouse, a distribution center, a cross-docking facility, an order fulfillment facility, a packaging facility, a shipping facility, a rental facility, a library, a retail store or establishment, a wholesale store, a museum, or any other type or form of facility.

At box 315, the event is classified as one of a taking of an item, a returning of an item, or neither a taking nor a returning of an item. The event may be classified in any manner, and based on any information or data that may be available or generated regarding the event. In some implementations, after an event is determined to have occurred, a human operator may manually determine that the event has occurred, and may visually or manually determine a kind or type of the event, e.g., a taking, a returning, or neither a taking nor a returning. Alternatively, the event may be identified automatically, e.g., based on one or more systems or records. For example, where the event is determined to have occurred based on a change in mass or weight on a storage unit or another system at the facility, a decrease in mass or weight may imply that an actor has taken an item from the storage unit or other system, while an increase in mass or weight may imply that an actor has returned an item to the storage unit or other system. Where no changes in mass or weight are identified, however, or where such a change is temporary in nature, e.g., implying that an actor has temporarily taken and then returned an item after a brief time, or temporarily returned and then taken the item after the brief time, then the event may be classified as neither a taking nor a returning of an item. Where the event is determined to have occurred based on a change in an inventory level, a decrease in the inventory level may imply that an item has taken an item from the storage unit or other system, while an increase in the inventory level may imply that the actor has returned an item to the storage unit or other system. Where no changes in inventory level are identified, however, or where changes in inventory are temporary in nature, the event may be classified as neither a taking nor a returning of an item. In some implementations, the event may be classified based on one or more specific actions (e.g., sub-events) that are observed or determined to have occurred based on any information or data that may be available or generated regarding the event, including but not limited to imaging data, human determinations or annotations, or others. In some implementations, the event may be classified based on a sequence in which the one or more specific actions (e.g., sub-events) are observed or determined to have occurred. In some implementations, each of such specific actions (e.g., sub-events) may be independently classified as such, e.g., as "reaching for a shelf," "placing an item into a bag" or "removing an item from a bag," or others.

At box 320, images that were captured by cameras holding the location of the facility within their respective fields of view during a window (or duration) of time that includes a time of the event are identified. For example, where the event is determined to have occurred at a specific time, or over a range of time, e.g., a range of time between a time at which a hand or an item therein entered a storage unit and a time at which the hand or the item departed the storage unit, cameras that held the location of the event within their respective fields of view at the time of the event may be identified. Where a plurality of cameras are calibrated, a location of the event may be determined with respect to locations and orientations of the sensors of such cameras. Subsequently, images captured by such cameras during a duration, a period, or a buffer of time prior to and after a time of the event (e.g., one minute) may be retrieved from one or more memory components or data stores, based on time stamps or other identifiers of the times at which such images were captured.

At box 325, actors that are present on the scene during the window are detected. The actors may be detected in any manner, such as, for example, by a locating service or other system having one or more processors and one or more sensors for detecting the presence or absence of one or more actors on the scene, and locating one or more poses, gestures or other actions executed by such actors on the scene. Processors of the locating system may be provided on the scene, or in one or more alternate or virtual locations, e.g., in a "cloud"-based environment. Alternatively, the actors may be identified upon entering the scene, e.g., by bearing or presenting a virtual credential or a physical credential, such as a sheet of paper, a mobile device having a display bearing a bar code (e.g., a one-dimensional or two-dimensional bar code, such as a QR bar code) or other symbol or marking, and the actor may scan the object or otherwise enable the bar code, symbol or marking to be read or interpreted at an entrance to the scene, or another location associated with the scene.

At box 330, locations of body parts of the actors, including but not limited to hands of such actors, are detected within the images captured by the cameras during the window. For example, locations of hands, heads, shoulders or other parts of arms, or other body parts may be detected automatically, such as by providing each of the images to a machine learning system or technique, such as a residual neural network or a deep network, that is trained to recognize hands, heads and shoulders, or any other body parts, e.g., wrists, forearms, torsos, waists, feet or others. Alternatively, body parts of the actors may also be identified in any other manner, such as by a manual annotation or labeling of the images by one or more human operators.

At box 335, statuses of hands detected at box 330 may be determined as either full, e.g., containing one or more items therein, or empty, e.g., not containing any items therein, based at least in part on the images. For example, in some implementations, where images captured by cameras holding a location of the event within their fields of view are identified at box 320, such images may be further processed to evaluate portions of such images including locations of hands of the actors, e.g., by cropping or otherwise processing the images to isolate or exclude all but portions of actors' hands and contents thereof, and determining based on the processed images whether any of the hands includes an item, or to identify one or more of such items. For example, each of the images may be provided to a classifier (e.g., a support vector machine) that is trained or otherwise configured to recognize hands, and the portions of such images that include one or more hands may be identified accordingly.

In some implementations, the statuses of each of the hands may be determined based on the same images captured at box 320 and from which body parts, including the hands, were detected at box 330. Alternatively, in some other implementations, statuses of hands detected at box 330 may be determined based on a subset of the images captured at box 320, or based on images other than those that were captured at box 320, including but not limited to images captured at higher levels of resolution than the images captured at box 320, or images captured from favorable fields of view or perspectives, such as from cameras that are determined to have palms of the hands within their respective fields of view.

At box 340, body parts that were detected within the images at box 330, including but not limited to hands, heads, shoulders or others, are associated with corresponding actors identified at box 325.

At box 345, locations of products on storage units are determined from planogram data, which may identify the locations of one or more storage units or other systems within the facility, or indicate the placement of one or more products on or in such storage units or other systems within the facility. Alternatively, the locations of the products on the storage units may be determined in any other manner, such as by processing the respective images to detect the one or more products therein.

At box 350, distances between locations of hands detected at box 330 and locations of the respective products on the storage units determined at box 345 are calculated from the images. For example, such distances may be calculated within image planes of such images, e.g., between pixels corresponding to two-dimensional locations of the hands detected at box 330 and pixels corresponding to the locations of the products determined at box 345. Alternatively, in some implementations, where locations of the products in three-dimensional space are known or may be determined, and locations of the hands may be determined in three-dimensional space, e.g., by triangulation, based on monocular cues, or in any other manner, the distances between products and hands may be calculated in three dimensions, e.g., in three-dimensional space.

Alternatively, or additionally, any number or type of features regarding one or more actors, other than locations of their respective hands, heads, shoulders or other body parts, statuses of their respective hands, or distances between locations of their respective hands and locations of products, may be determined based on the images identified at box 320. For example, as is discussed above, one feature regarding an actor may include, but need not be limited to, an identity of one or more items depicted within one or both of the hands of the actor.

At box 355, a time series is constructed from features such as locations of hands of each of the actors, statuses of such hands, distances between the locations of the hands and locations of products, locations of heads of the actors, and locations of any other body parts of the actors detected within the images identified at box 320 as having been captured over the window, at times at which such images were captured.

A time series may be constructed for each of the cameras including a location of the event within a field of view, and for each of the actors detected within images captured by such cameras. In some implementations, the time series may include a file (e.g., a spreadsheet), a record or a set of data associating values of each of the features determined from the one or more images captured during the window with times (e.g., time stamps) at which each of the images was captured during the window. Moreover, where multiple time series of values of data are constructed, values represented within two or more of the time series may equal one another or overlap.

For example, the time series may be a matrix or an array, e.g., a sparse matrix or a sparse array, having at least two dimensions, including a dimension (e.g., a row or a column) corresponding to time stamps of each of the images, and a dimension (e.g., a column or a row) corresponding to variables for each of any number of features, such as body part locations, distances from locations of such body parts to locations of products, statuses of hands (e.g., whether a hand is empty or full, or otherwise containing one or more items), or other features, at each of the times of such time stamps. A value of data regarding a feature at a time is included or stored in a cell of the time series defined by an intersection of the variable for that feature and the time stamp at that time. For example, where a feature is a location of a body part, e.g., a hand, a head, or a shoulder, or others, values of data regarding the feature may represent coordinates of locations of the body part depicted within images captured at specific times, and the values of the time series collectively represent a trajectory of the body part over the window of time. Where a feature is a distance between a body part, such as a hand, and a location of a storage unit or one or more items, values of data regarding the feature may represent differences between coordinates of locations of the body part and coordinates of locations of the storage unit or one or more of the items depicted within images captured at specific times, and the values of the time series collectively relative distances between the body part and the storage unit or the one or more items over the window of time. Where a feature is a status of a hand, values of data regarding the feature may indicate that the hand is empty or full, and the values collectively represent statuses of the hand over the window of time. Any other feature having values of data that may be determined, extracted or generated from images captured over a window of time may be represented in a time series of the values of data in a similar manner.

If data regarding a feature is not detected at a given time (e.g., where a body part or other detection is not available at that time, due to an obstruction or a departure of the body part from a field of view), a value in a cell defined by the intersection of the variable and the time stamp at that time is zero, or may be left blank or empty.

At box 380, one or more machine learning systems are trained to associate the various features represented within the time series constructed at box 355 with the event as classified at box 315. For example, in some implementations, a machine learning system may be trained to associate values of features such as locations of hands during a window of time including a time of an event, as represented in the time series, such as prior to, during or after the time of the event, with the event as classified at box 315, e.g., a taking of an item from the location within the facility, a returning of an item to the location within the facility, or some other event involving neither a taking nor a returning of an item. Subsequently, or in parallel, the machine learning system may be trained to associate values of features such as statuses of such hands e.g., times at which hands of actors were empty or full during the window, as well as locations of heads, locations of shoulders or other parts of arms, locations of other body parts, distances between the locations of the hands and locations of products, as represented in the time series, or any other features, with the event as classified at box 315. Alternatively, or additionally, the machine learning system may be trained to associate such features with an event, a set of actions (e.g., sub-events) that when executed in combination result in the event, or a sequence of such actions.

Any number of machine learning systems may be trained to associate values of features represented in the time series constructed at box 355 with the event as classified at box 315. For example, in some implementations, where values of n features derived from images captured over a window during which an event is determined to have occurred are represented within a time series of data, a single machine learning system may be trained to associate one or more of the n features with the event, or any combination of the n features. In some other implementations, multiple machine learning systems may be trained to associate any of the n features with the event, or to associate any number of combinations or subsets of the n features with the event.

Alternatively, or additionally, in some implementations, a machine learning system may be trained to associate combinations of two or more of the features represented in the time series constructed at box 355 with the event as classified at box 315. For example, a machine learning system may be trained to associate features derived from locations of the hands of each of the actors detected within each of the images captured over the window and features derived from statuses of hands of actors (e.g., whether such hands are empty or occupied by one or more items) over the window represented in the time series constructed at box 355 with the event as classified at box 315. In some implementations, however, the machine learning system may be trained to associate features derived from the locations of the hands of each of the actors detected within each of the images at box 330 over the window, features derived from the statuses of the hands of each of the actors, and any number of other features with the event as classified at box 315, based on the time series constructed at box 355.

After the one or more machine learning systems have been trained to associate one or more of the features represented within the time series of data constructed at box 355 with the event, the process advances to box 385, where a server or other central computer system is programmed to execute the one or more machine learning systems, and the process ends. The server may be any type or form of computer device or system that is in communication with one or more cameras, or that has access to one or more images captured by such cameras. In some implementations, a camera may be programmed to execute the one or more machine learning systems. For example, a processor unit or memory component provided aboard a camera may be programmed with one or more sets of instructions or code for executing the machine learning system on images captured by that camera, or received therefrom from one or more other cameras. The type, form or size of computer device or system, or a relationship between the computer device or system and one or more cameras, is not limited.

As is discussed above, one or more machine learning systems may be trained to receive data regarding features of an actor determined from a plurality of images captured during a window or finite duration of time as inputs, and to generate an output indicating whether an event has occurred or the actor is responsible for the event, and identifying an item associated with the event, or a location of the event based on the data. In some implementations, various time series of data regarding features of an actor depicted within a plurality of images may be individually or collectively labeled or annotated with an indication of whether the actor is responsible for an event, or an item or a location associated with the event, and used to train a machine learning system accordingly.

Referring to FIGS. 4A through 4D, views of aspects of one system for detecting events using visual images and machine learning in accordance with implementations of the present disclosure are shown. Except where otherwise noted, reference numerals preceded by the number "4" shown in FIGS. 4A through 4D indicate components or features that are similar to components or features having reference numerals preceded by the number "2" shown in FIG. 2A or 2B, or by the number "1" shown in FIGS. 1A through 1K.

Figure 4A:
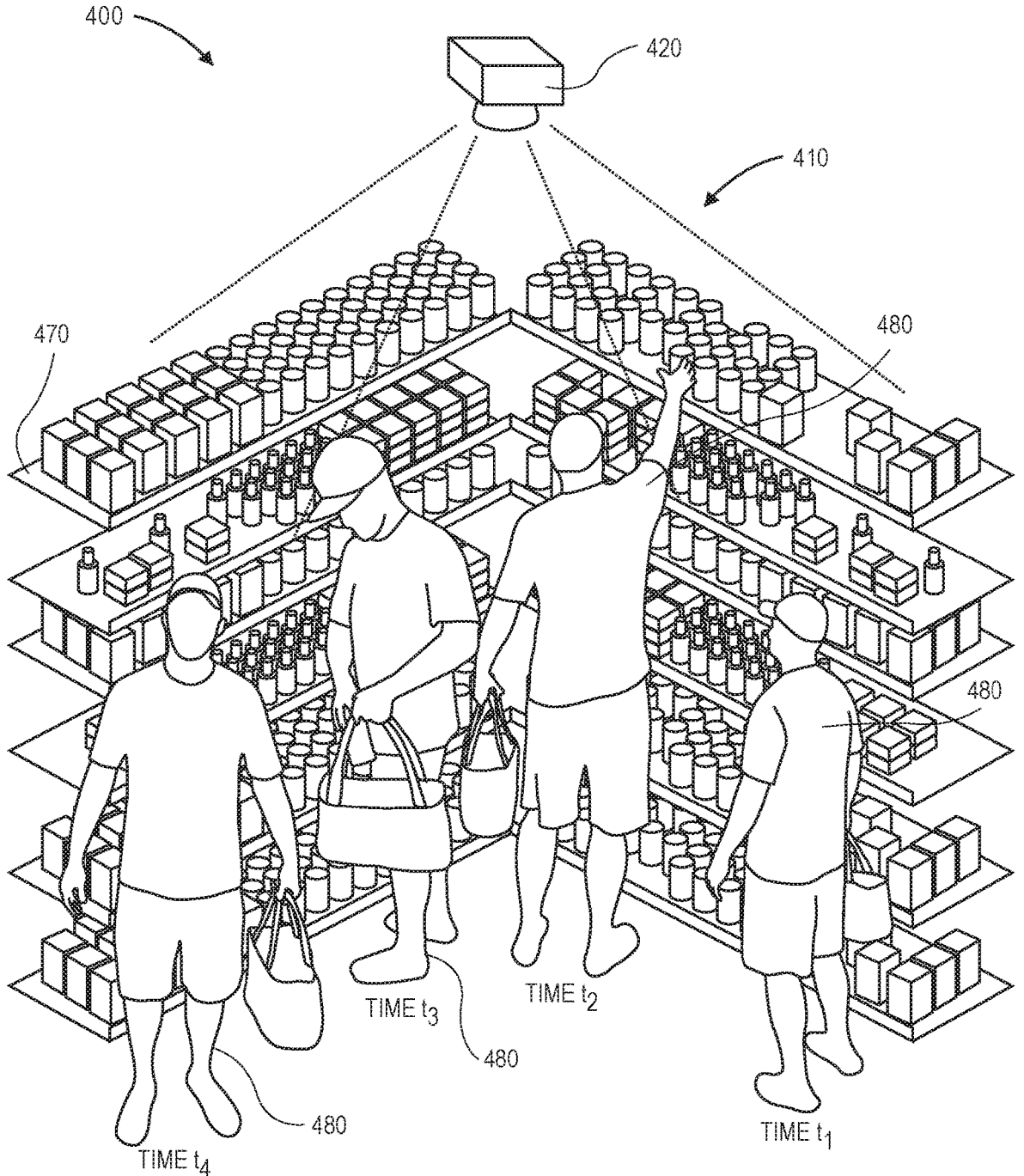
FIGS. 4A through 4D are views of aspects of one system for detecting events using visual images and machine learning in accordance with implementations of the present disclosure.

As is shown in FIG. 4A, a system 400 includes a camera 420 (e.g., an RGB camera, or an RGBD camera) mounted above a facility 410 (e.g., a materials handling facility) having one or more shelving units 470, which may include a plurality of sets of shelves having items of various types or kinds provided in specific locations thereon. The camera 420 is configured to capture imaging data (e.g., visual images) from a field of view that includes the shelving unit 470 as well as one or more floors or traveling surfaces within the facility 410.

As is also shown in FIG. 4A, an actor 480 performs one or more movements within the facility 410 while executing a taking event, e.g., a removal of one or more items from the storage unit 470, during a window or finite duration from time $t_1$ to time $t_4$. For example, as is shown in FIG. 4A, the actor 480 travels toward a portion of the storage unit 470 at time $t_1$, and extends a hand toward the storage unit 470 to retrieve one or more items at time $t_2$, before turning away from the storage unit 470 and placing the one or more items into a bag or other container at time $t_3$, and walking away from the storage unit 470 at time $t_4$.

Figure 4B:
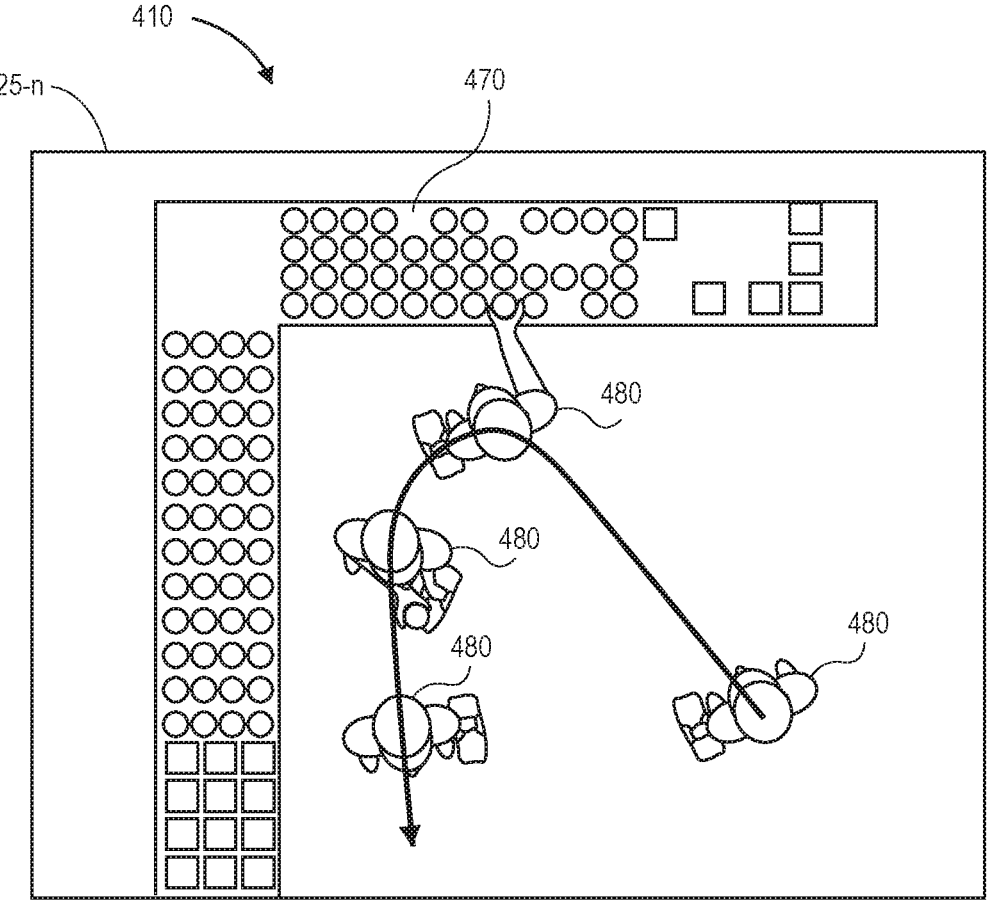

As is shown in FIG. 4B, a set of images 425-n captured during the window or finite duration from time $t_1$ to time $t_4$ depict locations of the actor 480 within the facility 410 at time $t_1$, at time $t_2$, at time $t_3$, and at time $t_4$. Each of the images 425-n may be time-stamped or otherwise labeled or annotated with a time at which such images 425-n was captured, e.g., time $t_1$, time $t_2$, time $t_3$, and time $t_4$.

Figure 4C:
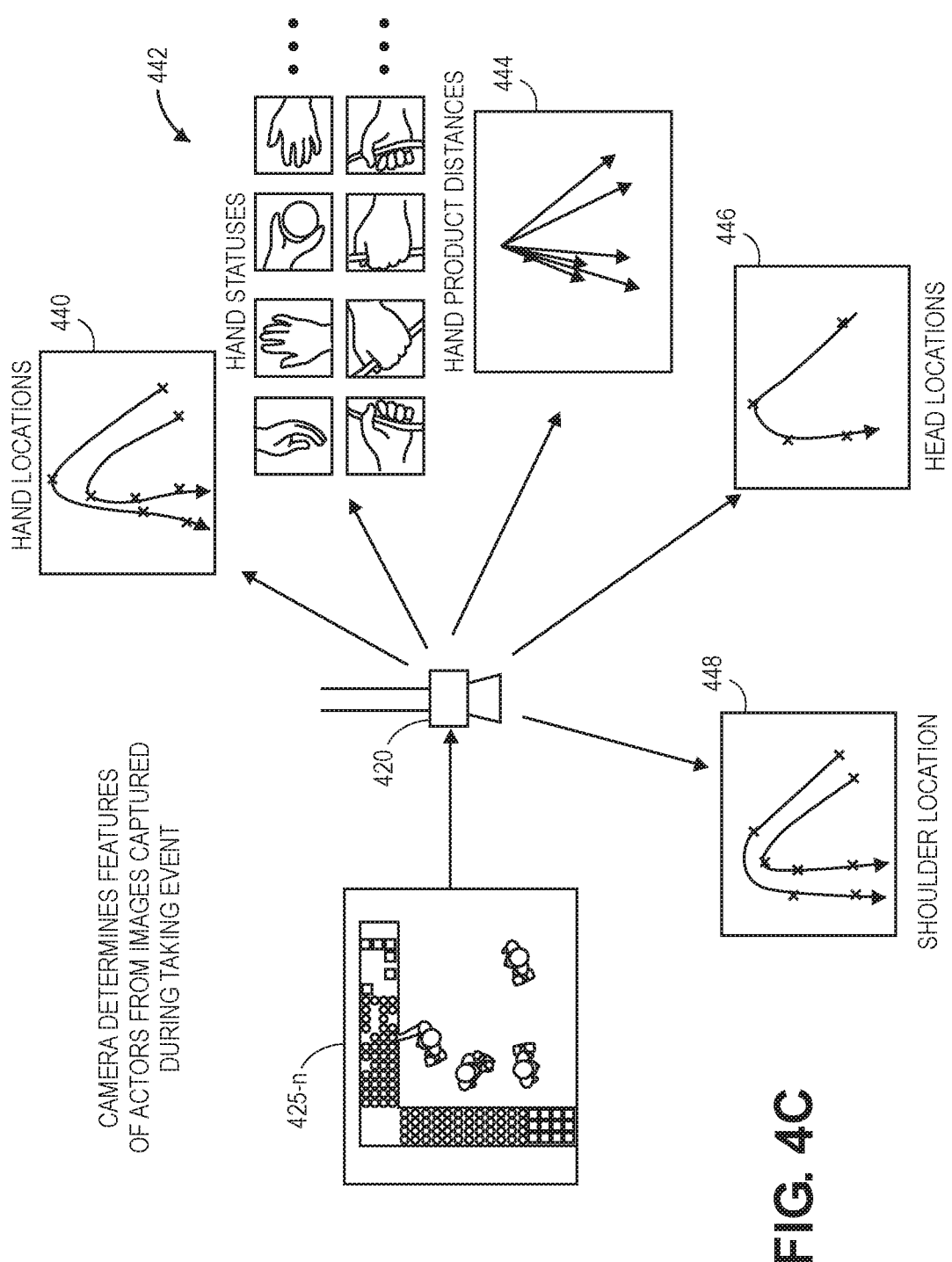

In accordance with implementations of the present disclosure, the camera 420 may process the set of images 425-n captured during the window or finite duration from time $t_1$ to time $t_4$, e.g., prior to, during and after the taking event, to determine one or more features 440, 442, 444, 446, 448 of the actor 480, and to further construct one or more time series of values of data regarding such features. For example, as is shown in FIG. 4C, the camera 420 may process the images 425-n to detect locations 440 of one or both hands of the actor 480 at time $t_1$, at time $t_2$, at time $t_3$, and at time $t_4$ during the window or finite duration from time $t_1$ to time $t_4$. The camera 420 may also process the images 425-n to determine statuses 442 of the hands of the actor 480 at time $t_1$ at time $t_2$, at time $t_3$, and at time $t_4$, e.g., by cropping or otherwise isolating portions of the images including such locations, and processing such portions to determine whether the hands are empty or full at various times during the window or finite duration, or to identify any items within the hands during the window or finite duration.

The camera 420 may also calculate distances 444 between the locations of one or both of the hands of the actor 480 at time $t_1$, at time $t_2$, at time $t_3$, and at time $t_4$, and locations of one or more items on the storage unit 470. The camera 420 may further process the images 425-n to detect locations 446 of a head of the actor 480, and locations 448 of one or both shoulders of the actor 480, at time $t_1$, at time $t_2$, at time $t_3$, and at time $t_4$.

Figure 4D:
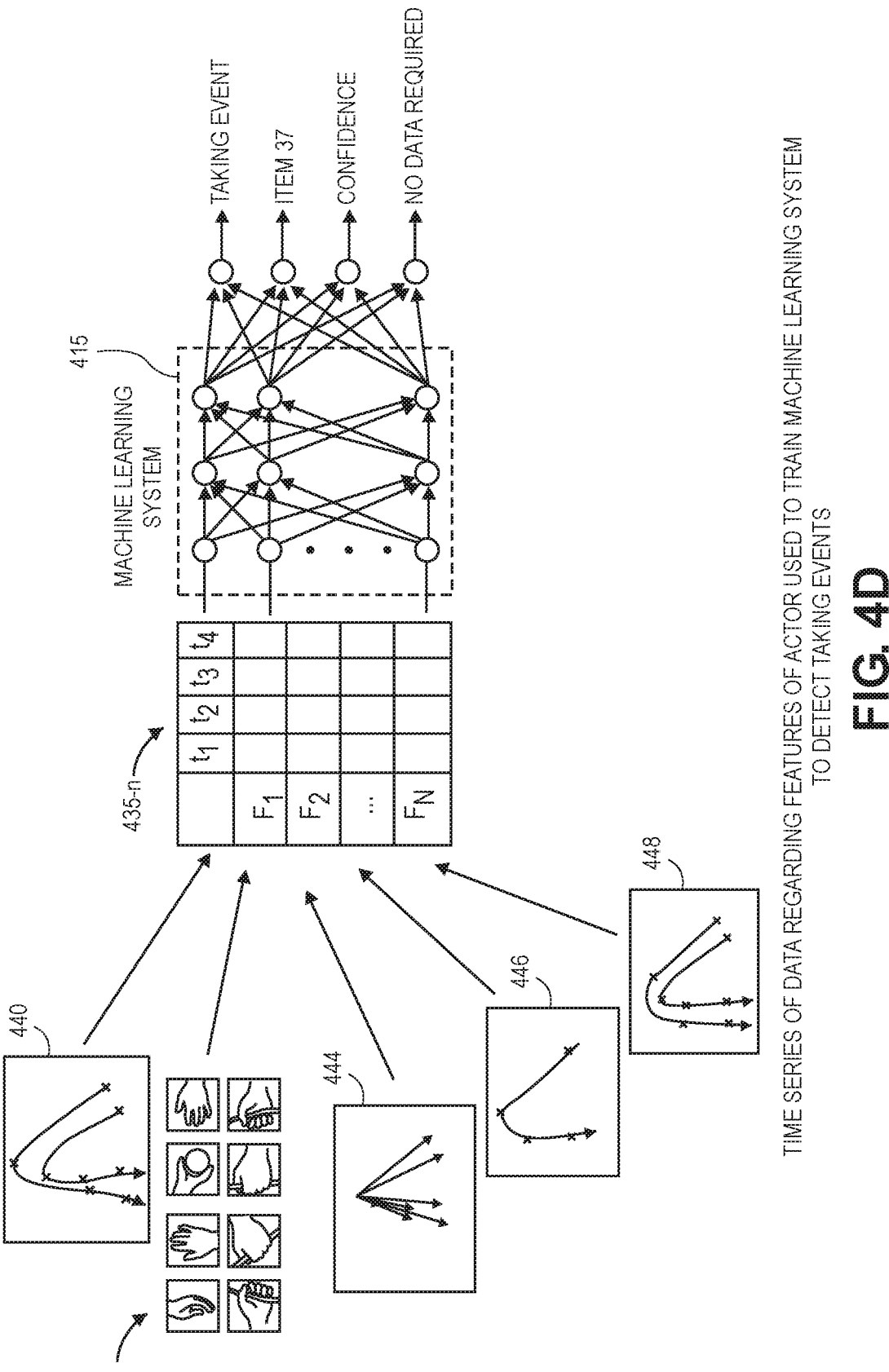

As is shown in FIG. 4D, the camera 420 generates a time series 435-n of values representing the locations 440 of the hands of the actor 480, the statuses 442 of the hands, the distances 444 between the locations of the hands and locations of products, the locations 446 of the head and the locations 448 of the shoulders, and uses the time series 435-n to train a machine learning system 415 to determine that a taking event has occurred. For example, the machine learning system 415 may be configured to generate one or more outputs, including an output indicating whether an event has occurred, an output identifying the event (e.g., as a taking of an item, rather than a return of an item, or an event involving neither a taking nor a return of an item), an output identifying an item involved in the event (e.g., based on a detection of the item in one or more images, or based on a location associated with the event), or an output indicating whether any additional data may be required in order to enhance a determination as to whether an event has occurred, or otherwise increase a level of confidence in such a determination.

Time series of values of data regarding the features 440, 442, 444, 446, 448 may be provided to the machine learning system 415 as inputs, either independently (e.g., data regarding one feature at a time) or in one or more combinations, and outputs received from the machine learning system 415 may be compared to a determination that the taking event has occurred, an identification of the actor 480 as being associated with the taking event, an identifier of an item involved in the taking event, or a determination that no additional data is required. In some implementations, an item involved in the taking event may be identified based on a location on the storage unit 470 corresponding to the taking event, e.g., using planogram data or other records identifying locations of items on the storage unit 470, or by processing one or more images captured prior to, during or after the taking event, which may include but need not be limited to portions of such images that depict hands. The training of the machine learning system 415 may occur for any number of iterations, or until the machine learning system 415 associates the data regarding one or more of the features 440, 442, 444, 446, 448 with a taking event, with the actor 480, or with the location of the taking event, to a sufficiently high level of confidence.

The machine learning system 415 may be trained with time series including data regarding any number of features, such as the features 440, 442, 444, 446, 448 shown in FIGS. 4C and 4D, that are determined from any number of sets of images captured prior to, during or after taking events, in a manner similar to that described above with respect to FIGS. 4A through 4D.

Similarly, a machine learning system may be trained to associate time series of data regarding features of actors with return events, e.g., events in which an actor places an item on a storage unit or other location, or otherwise relinquishes control over the item. Referring to FIGS. 5A through 5D, views of aspects of one system for detecting events using visual images and machine learning in accordance with implementations of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4D, by the number "2" shown in FIG. 2A or 2B, or by the number "1" shown in FIGS. 1A through 1K.

Figure 5A:
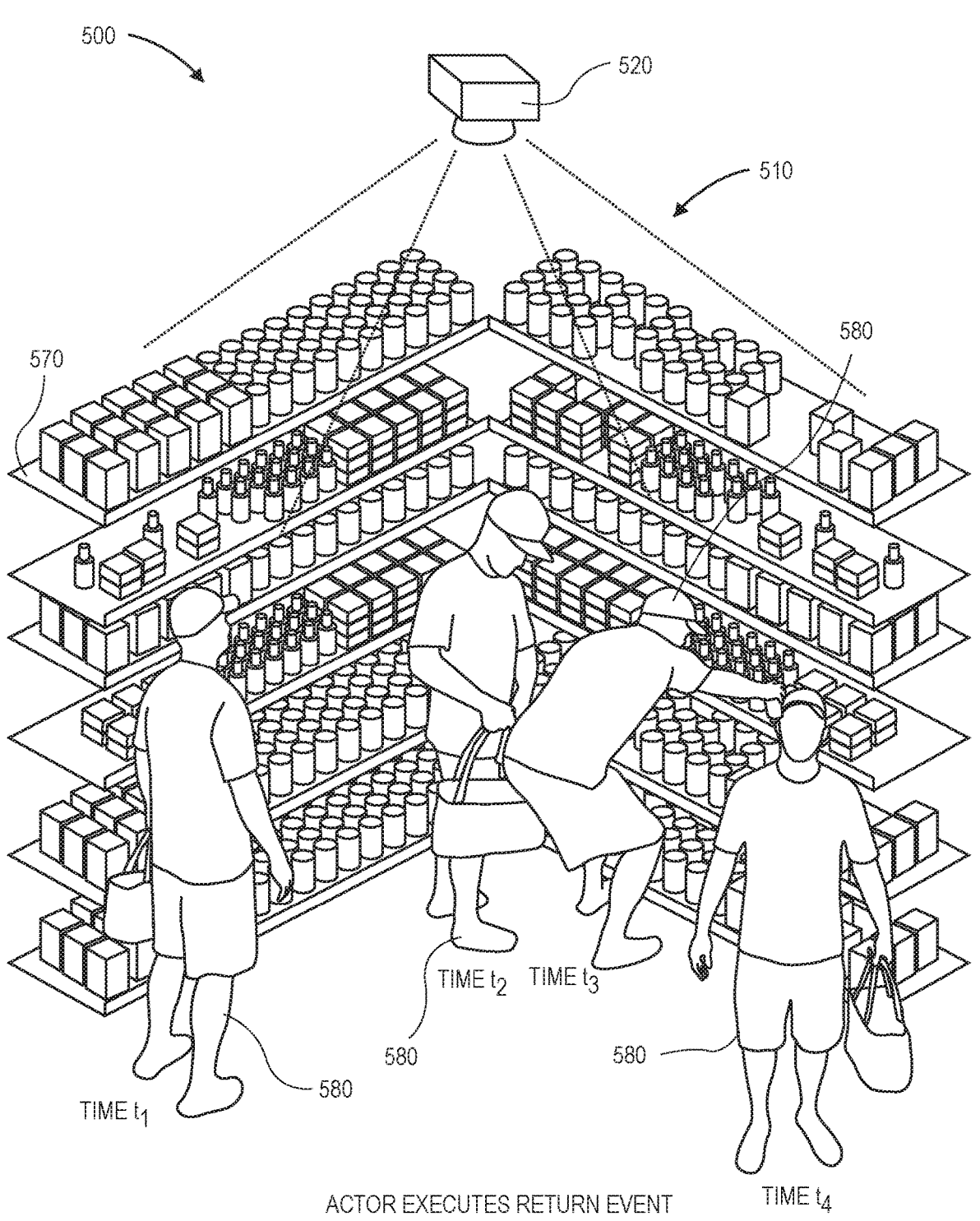
FIGS. 5A through 5D are views of aspects of one system for detecting events using visual images and machine learning in accordance with implementations of the present disclosure.

As is shown in FIG. 5A, a system 500 includes a camera 520 (e.g., an RGB camera, or an RGBD camera) mounted above a facility 510 (e.g., a materials handling facility) having one or more shelving units 570, which may include a plurality of sets of shelves having items of various types or kinds provided in specific locations thereon. The camera 520 is configured to capture imaging data (e.g., visual images) from a field of view that includes the shelving unit 570 as well as one or more floors or traveling surfaces within the facility 510.

Figure 5B:
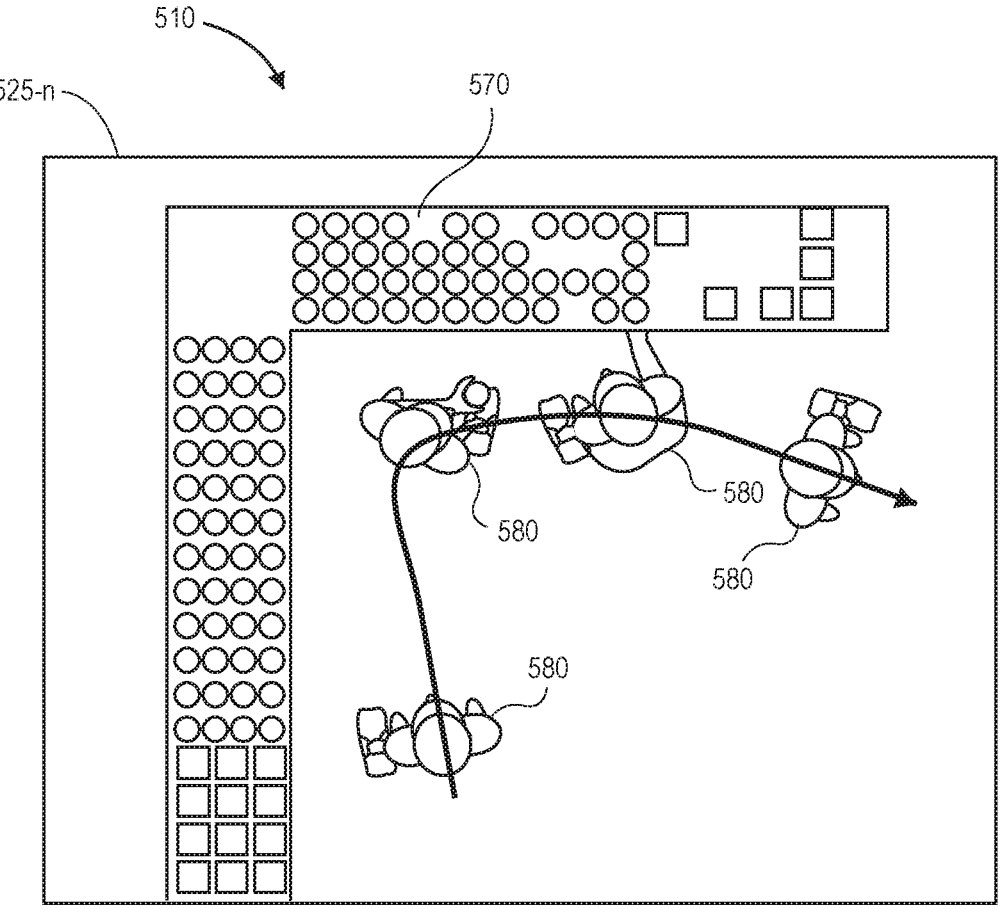

As is also shown in FIG. 5A, an actor 580 performs one or more movements within the facility 510 while executing a return event, e.g., a placement of one or more items on the storage unit 570, during a window or finite duration from time $t_1$ to time $t_4$. For example, as is shown in FIG. 5A, the actor 580 travels toward a portion of the storage unit 570 at time $t_1$, and extends a hand toward the storage unit 570 into a basket (or a bag, a cart, a pocket or another vessel) to retrieve one or more items at time $t_2$, before turning toward the storage unit 570 and placing the one or more items on a shelf of the storage unit 570 at time $t_3$, and walking away from the storage unit 570 at time $t_4$. As is shown in FIG. 5B, a set of images 525-$n$ captured during the window or finite duration from time $t_1$ to time $t_4$ depict locations of the actor 580 within the facility 510 at time $t_1$, at time $t_2$, at time $t_3$, and at time $t_4$. Each of the images 525-$n$ may be time-stamped or otherwise labeled or annotated with a time at which such images 525-$n$ was captured, e.g., time $t_1$, time $t_2$, time $t_3$, and time $t_4$.

Figure 5C:
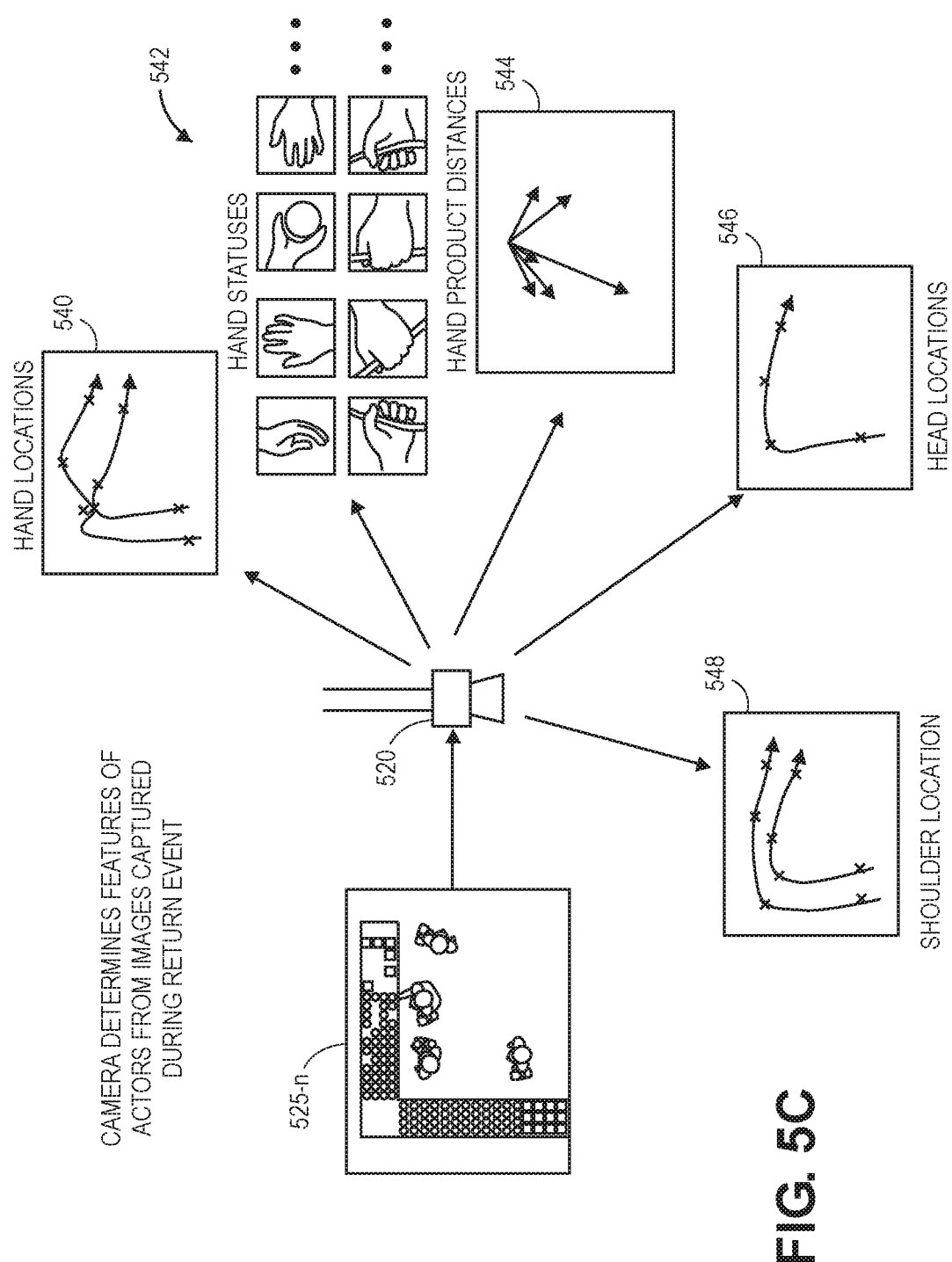

In accordance with implementations of the present disclosure, the camera 520 may process the set of images 525-$n$ captured during the window or finite duration from time $t_1$ to time $t_4$, e.g., prior to, during and after the return event, to determine one or more features 540, 542, 544, 546, 548 of the actor 580, and to further construct one or more time series of values of data regarding such features. For example, as is shown in FIG. 5C, the camera 520 may process the images 525-$n$ to detect locations 540 of one or both hands of the actor 580 at time $t_1$, at time $t_2$, at time $t_3$, and at time $t_4$ during the window or finite duration from time $t_1$ to time $t_4$. The camera 520 may also process the images 525-$n$ to determine statuses 542 of the hands of the actor 580 at time $t_1$, at time $t_2$, at time $t_3$, and at time $t_4$, e.g., by cropping or otherwise isolating portions of the images including such locations, and processing such portions to determine whether the hands are empty or full at various times during the window or finite duration.

The camera 520 may also calculate distances 544 between the locations of one or both of the hands of the actor 580 at time $t_1$, at time $t_2$, at time $t_3$, and at time $t_4$, and locations of one or more items on the storage unit 570. The camera 520 may further process the images 525-$n$ to detect locations 546 of a head of the actor 580, and locations 548 of one or both shoulders of the actor 580, at time $t_1$, at time $t_2$, at time $t_3$, and at time $t_4$.

Figure 5D:
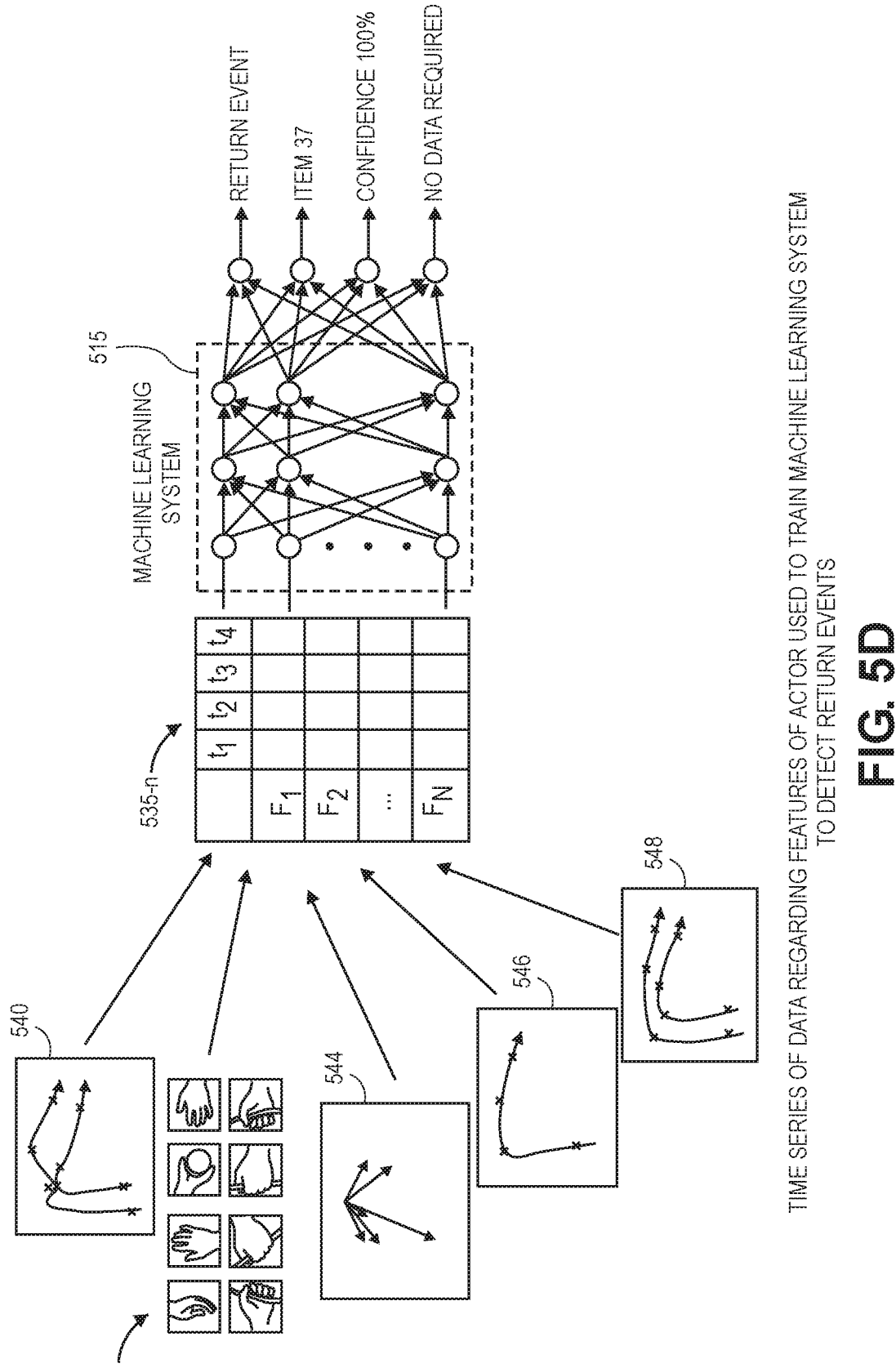

As is shown in FIG. 5D, the camera 520 generates a time series 535-$n$ of values representing the locations 540 of the hands of the actor 580, the statuses 542 of the hands, the distances 544 between the locations of the hands and locations of products, the locations 546 of the head and the locations 548 of the shoulders, and uses the time series 535-$n$ to train a machine learning system 515 to determine that a return event has occurred. For example, the machine learning system 515 may be configured to generate one or more outputs, including an output indicating whether an event has occurred, an output identifying the event (e.g., as a return of an item, rather than a taking of an item, or an event involving neither a taking nor a return of an item), an output identifying an item involved in the event (e.g., based on a detection of the item in one or more images, or based on a location associated with the event), or an output indicating whether any additional data may be required in order to enhance a determination as to whether an event has occurred, or otherwise increase a level of confidence in such a determination.

Time series of values of the data regarding the features 540, 542, 544, 546, 548 may be provided to the machine learning system 515 as inputs, either independently (e.g., data regarding one feature at a time) or in one or more combinations, and outputs received from the machine learning system 515 may be compared to a determination that the return event has occurred, an identification of the actor 580 as being associated with the return event, an identifier of an item involved in the return event, or a determination that no additional data is required. In some implementations, an item involved in the taking event may be identified based on a location on the storage unit 570 corresponding to the return event, e.g., using planogram data or other records identifying locations of items on the storage unit 570, or by processing one or more images captured prior to, during or after the return event, which may include but need not be limited to portions of such images that depict hands. The training of the machine learning system 515 may occur for any number of iterations, or until the machine learning system 515 associates the data regarding one or more of the features 540, 542, 544, 546, 548 with a return event, with the actor 580, or with the location of the return event, to a sufficiently high level of confidence.

The machine learning system 515 may be trained with time series including values of data regarding any number of features, such as the features 540, 542, 544, 546, 548 shown in FIGS. 5C and 5D, that are determined from any number of sets of images captured prior to, during or after return events, in a manner similar to that described above with respect to FIGS. 5A through 5D.

Moreover, a machine learning system may be trained to associate time series of values of data regarding features of actors with events that ultimately involve neither a taking of an item from a storage unit or other location, or a return or other placement of an item to a storage unit or other location. Referring to FIGS. 6A through 6D, views of aspects of one system for detecting events using visual images and machine learning in accordance with implementations of the present disclosure are shown. Except where otherwise noted, reference numerals preceded by the number "6" shown in FIGS. 6A through 6D indicate components or features that are similar to components or features having reference numerals preceded by the number "5" shown in FIGS. 5A through 5D, by the number "4" shown in FIGS. 4A through 4D, by the number "2" shown in FIG. 2A or 2B, or by the number "1" shown in FIGS. 1A through 1K.

Figure 6A:
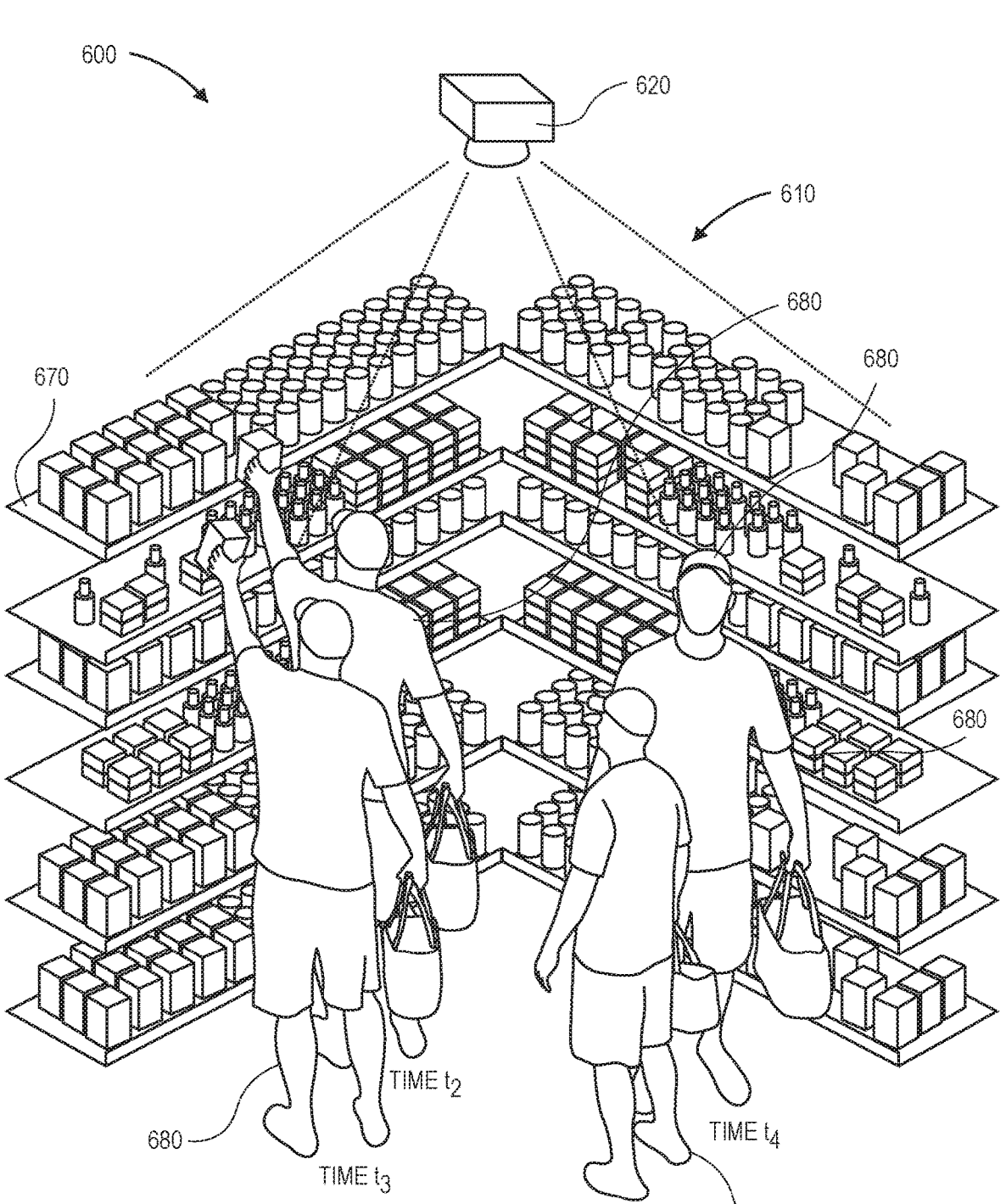
FIGS. 6A through 6D are views of aspects of one system for detecting events using visual images and machine learning in accordance with implementations of the present disclosure.

As is shown in FIG. 6A, a system 600 includes a camera 620 (e.g., an RGB camera, or an RGBD camera) mounted above a facility 610 (e.g., a materials handling facility) having one or more shelving units 670, which may include a plurality of sets of shelves having items of various types or kinds provided in specific locations thereon. The camera 620 is configured to capture imaging data (e.g., visual images) from a field of view that includes the shelving unit 670 as well as one or more floors or traveling surfaces within the facility 610.

Figure 6B:
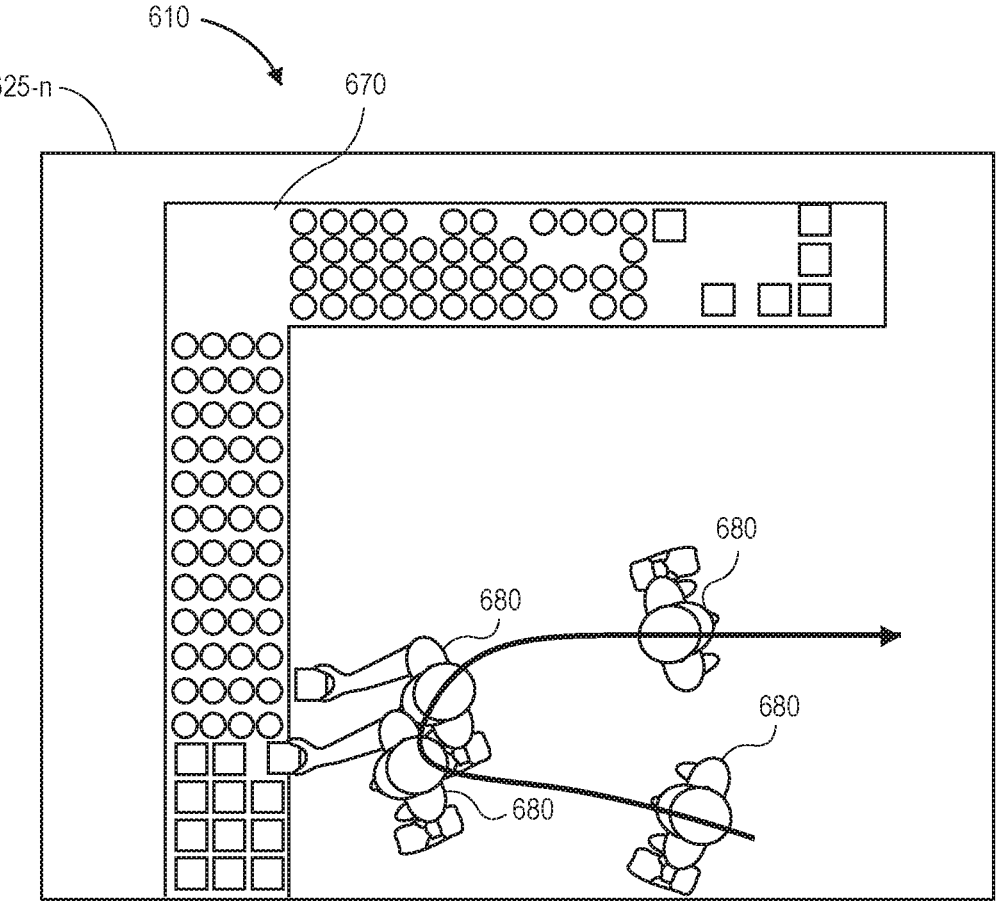

As is also shown in FIG. 6A, an actor 680 performs one or more movements within the facility 610 while executing an event that does not involve either a taking of an item from the storage unit 670, nor a return of an item to the storage unit 670, during a window or finite duration from time $t_1$ to time $t_4$. For example, as is shown in FIG. 6A, the actor 680 travels toward a portion of the storage unit 670 at time $t_1$, and extends a hand toward the storage unit 670 to retrieve one or more items from the storage unit 670 at time $t_2$, before placing the one or more items back on the storage unit 670 at time $t_3$, and walking away from the storage unit 670 at time $t_4$. As is shown in FIG. 6B, a set of images 625-$n$ captured during the window or finite duration from time $t_1$ to time $t_4$ depict locations of the actor 680 within the facility 610 at time $t_1$, at time $t_2$, at time $t_3$, and at time $t_4$. Each of the images 625-$n$ may be time-stamped or otherwise labeled or annotated with a time at which such images 625-$n$ were captured, e.g., time $t_1$, time $t_2$, time $t_3$, and time $t_4$.

Figure 6C:
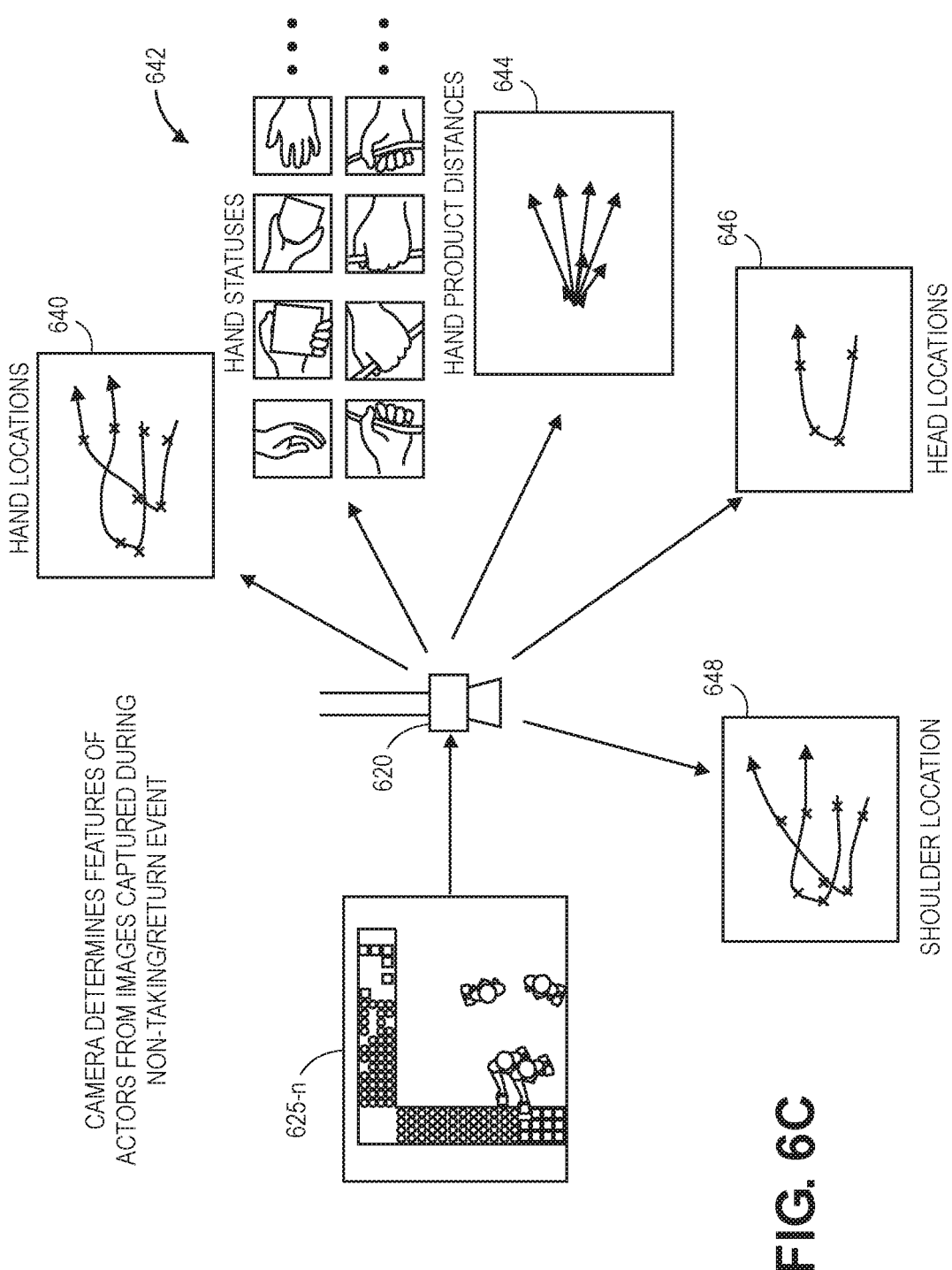

In accordance with implementations of the present disclosure, the camera 620 may process the set of images 625-$n$ captured during the window or finite duration from time $t_1$ to time $t_4$, e.g., prior to, during and after the event, to determine one or more features 640, 642, 644, 646, 648 of the actor 680, and to further construct one or more time series of values of data regarding such features. For example, as is shown in FIG. 6C, the camera 620 may process the images 625-$n$ to detect locations 640 of one or both hands of the actor 680 at time $t_1$, at time $t_2$, at time $t_3$, and at time $t_4$ during the window or finite duration from time $t_1$ to time $t_4$. The camera 620 may also process the images 625-$n$ to determine statuses 642 of the hands of the actor 680 at time $t_1$, at time $t_2$, at time $t_3$, and at time $t_4$, e.g., by cropping or otherwise isolating portions of the images including such locations, and processing such portions to determine whether the hands are empty or full at various times during the window or finite duration.

The camera 620 may also calculate distances 644 between the locations of one or both of the hands of the actor 680 at time $t_1$, at time $t_2$, at time $t_3$, and at time $t_4$, and locations of one or more items on the storage unit 670. The camera 620 may further process the images 625-$n$ to detect locations 646 of a head of the actor 680, and locations 648 of one or both shoulders of the actor 680, at time $t_1$, at time $t_2$, at time $t_3$, and at time $t_4$.

Figure 6D:
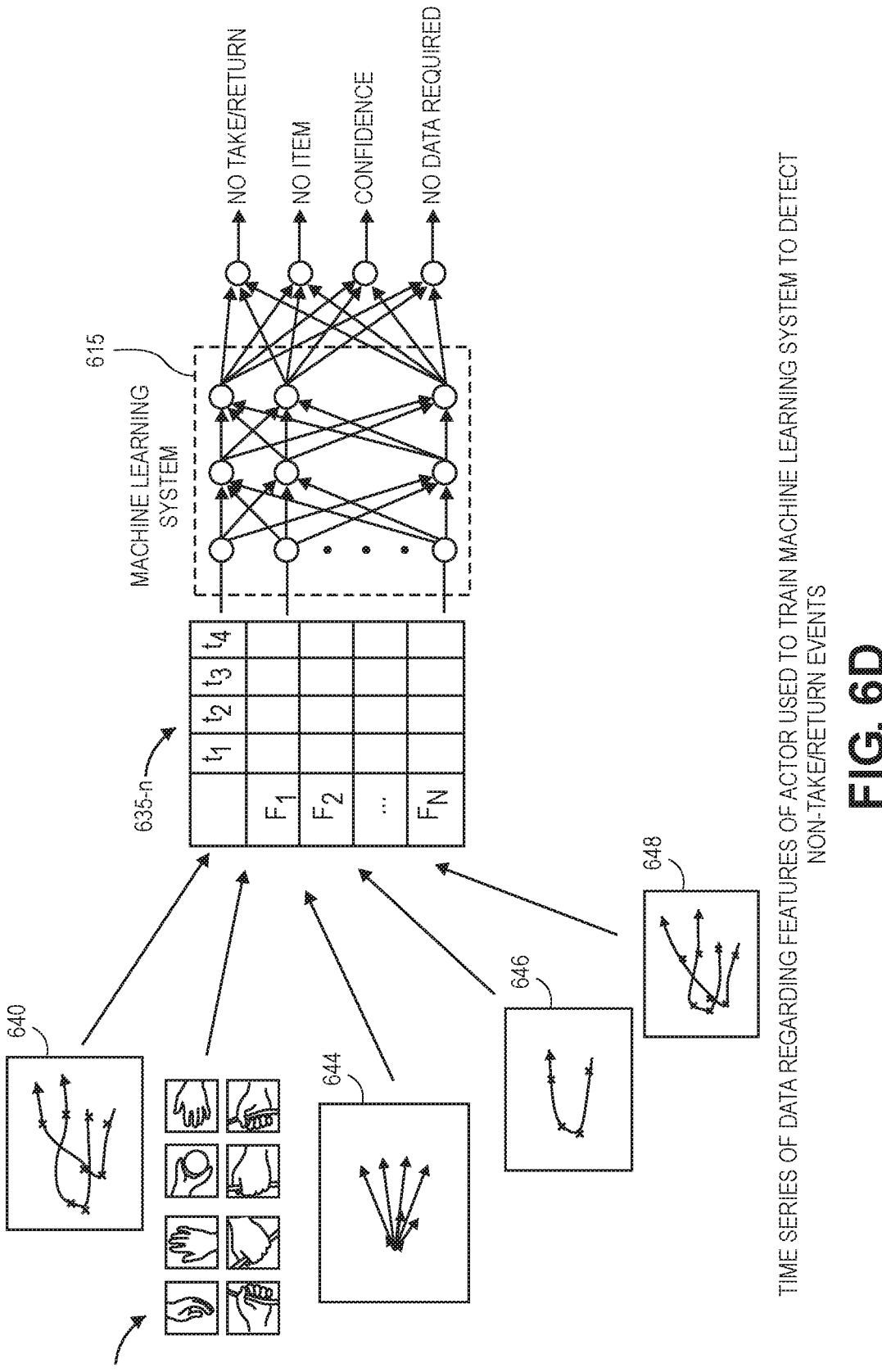

As is shown in FIG. 6D, the camera 620 generates a time series 635-$n$ of values of the locations 640 of the hands of the actor 680, the statuses 642 of the hands, the distances 644 between the locations of the hands and locations of products, the locations 646 of the head and the locations 648 of the shoulders, and uses the time series 635-$n$ to train a machine learning system 615 to determine that an event that is neither a taking event nor a return event has occurred. For example, the machine learning system 615 may be configured to generate one or more outputs, including an output indicating whether an event has occurred, an output identifying the event (e.g., as neither a taking nor a return of an item), an output identifying an item involved in the event (e.g., based on a detection of the item in one or more images, or based on a location associated with the event), or an output indicating whether any additional data may be required in order to enhance a determination as to whether an event has occurred, or otherwise increase a level of confidence in such a determination.

Time series of values of the data regarding the features 640, 642, 644, 646, 648 may be provided to the machine learning system 615 as inputs, either independently (e.g., data regarding one feature at a time) or in one or more combinations, and outputs received from the machine learning system 615 may be compared to a determination that the event has occurred, an identification of the actor 680 as being associated with the event, an identifier of an item involved in the event, a location on the storage unit 670 corresponding to the event, or a determination that no additional data is required. In some implementations, an item involved in the event may be identified based on a location on the storage unit 670 corresponding to the event, e.g., using planogram data or other records identifying locations of items on the storage unit 670, or by processing one or more images captured prior to, during or after the taking event, which may include but need not be limited to portions of such images that depict hands. The training of the machine learning system 615 may occur for any number of iterations, or until the machine learning system 615 associates the data regarding one or more of the features 640, 642, 644, 646, 648 with neither a taking event nor a return event, with the actor 680, or with the location of the event, to a sufficiently high level of confidence.

The machine learning system 615 may be trained with time series including data regarding any number of features, such as the features 640, 642, 644, 646, 648 shown in FIGS. 6C and 6D, that are determined from any number of sets of images captured prior to, during or after events that are neither taking events nor return events, in a manner similar to that described above with respect to FIGS. 6A through 6D.

Once a machine learning system has been trained to associate features of actors with events, the machine learning system may be used to detect a taking event, a return event, or an event other than a taking or a return of an item based on features of actors determined from images captured over windows or finite durations. If an event, or an actor responsible for the event, or an item associated with the event, may not be identified based on an output received in response to an input including a first time series representing data regarding one or more of such features (e.g., baseline features), the first time series may be augmented by a second time series representing data regarding one or more other features (e.g., supplemental features), which may be provided to the machine learning system as inputs. Whether the event, the actor or the item may be identified based on outputs received in response to inputs including the first time series and the second time series may be determined. The inputs may be augmented by time series representing data regarding any number of other features, to the extent that such data is available or may be calculated.

Figure 7B:
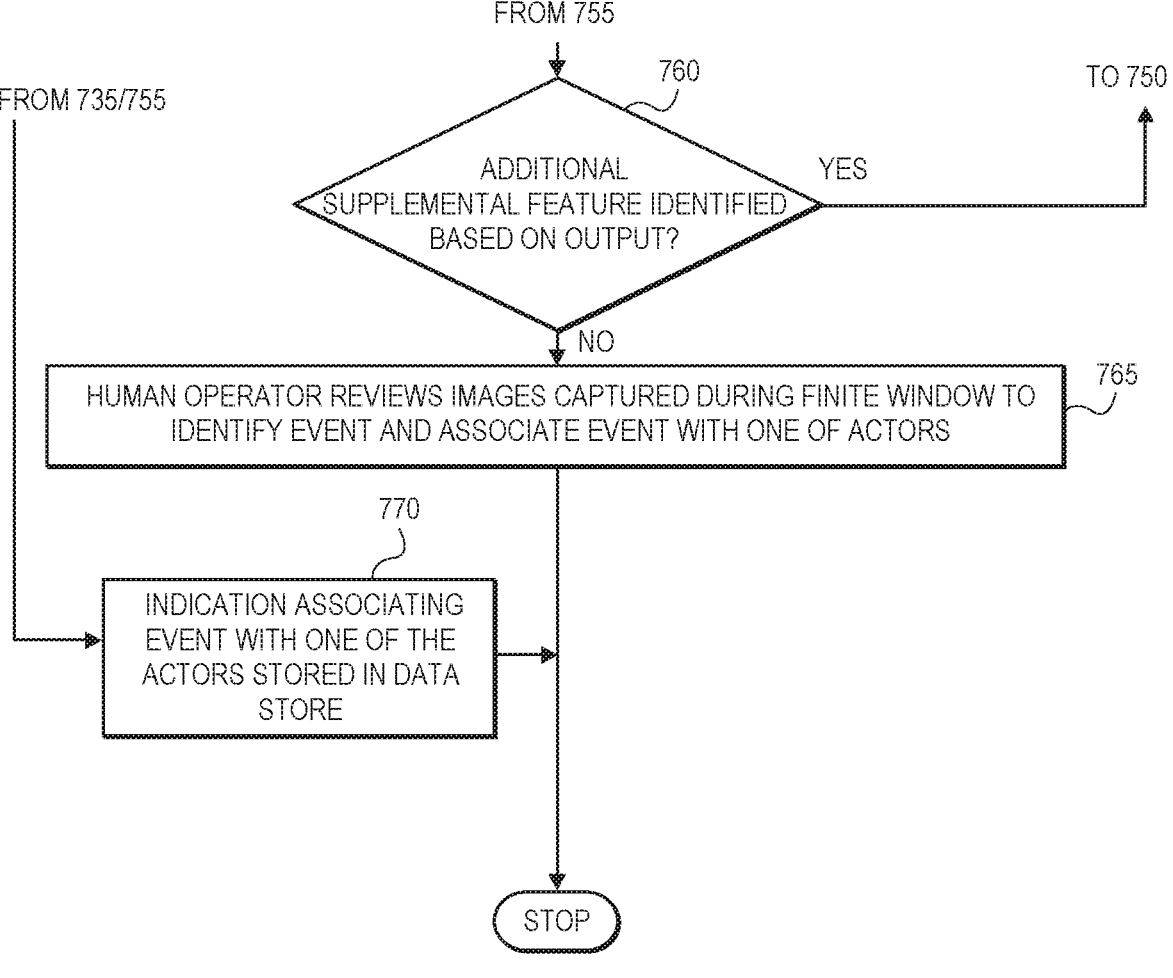

Referring to FIGS. 7A and 7B, a flow chart 700 of one process for detecting events using visual images and machine learning in accordance with implementations of the present disclosure is shown. At box 710, a camera within a facility is configured to capture one or more streams of images. For example, the camera may be mounted within a materials handling facility, such as a warehouse, a distribution center, a cross-docking facility, an order fulfillment facility, a packaging facility, a shipping facility, a rental facility, a library, a retail store or establishment, a wholesale store, a museum, or any type or form of facility. In some implementations, the camera may be mounted to one or more surfaces associated with a storage unit (e.g., a shelving unit, a temperature-controlled cooler or other container, a gondola rack), a wall, a ceiling or any other aspect of the facility.

At box 715, the camera detects one or more actors within the field of view of the camera. For example, the camera may detect any number of body parts or other aspects of an actor, e.g., by processing one or more images to detect body parts or other features. Alternatively, in some implementations, the camera may receive one or more sets of information or data indicating that actors are present within the facility, including but not limited to one or more identifiers of such actors.

At box 720, the camera assigns identifiers to the actors within the field of view of the camera. The identifiers may be arbitrary or generated by the camera or by an external system. Alternatively, in some implementations, the actors may be identified based on data captured using one or more scanners, readers or other devices configured to identify actors who enter or exit the facility, e.g., based on information or data provided by an application operating on a mobile device carried by such actors, or in any other manner, and the identifiers may be determined for the actors upon their identification and provided to the camera.

At box 725, the camera processes the images captured during a finite window of time to determine a set of features associated with each of the actors depicted within such images. The features may include locations of body parts depicted within such images over a range of times at which the images were captured (e.g., time stamps), distances between such body parts and locations associated with products at such times, statuses of hands of actors at such times, or any other features. The camera may determine the features in any manner, such as by providing the images to one or more algorithms, systems or techniques that are trained or configured to detect one or more body parts or other aspects of objects within such images, or to execute any functions regarding such images, such as a residual neural network or a deep network. The features may include, but need not be limited to, a set of locations of each of the hands of the actors detected on the scene at box 715 at times (e.g., time stamps) of each of the images captured during the finite window. The features may also include, but need not be limited to, indications as to whether such hands are full (e.g., containing one or more items) or empty at such times, as determined by cropping or isolating portions of such images that depict hands, or to exclude all but portions of the images depicting hands and contents thereof, and determining whether any of such hands includes an item. For example, cropped or isolated portions of the images may be provided to a classifier (e.g., a support vector machine) that is trained or otherwise configured to recognize hands, and statuses of one or more hands may be identified accordingly.

At box 730, the camera transmits a time series of data regarding the features determined for each of the actors at box 725 to a server programmed to execute a machine learning system that is trained to associate features of actors determined from images with events. The server may be a physical or virtual computer system in communication with a plurality of cameras that are mounted in association with a facility, or any other system.

For example, the machine learning system may be trained to associate features such as locations of hands over time, statuses of hands as empty or full over time, locations of any other body parts or distances between body parts and one or more objects or locations, or any other features depicted within imaging data with one or more events, specifically, a taking event, a returning event, or an event that is neither a taking event nor a returning event. Alternatively, those of ordinary skill in the pertinent arts will recognize that the time series of data may be provided to any computer device or system that is programmed or configured to execute the machine learning system, including but not limited to one or more processor units operating on the camera, or another camera.

At box 735, the server provides a portion of the data in the time series representing one or more baseline features (or primary features) of an actor to the machine learning system as an input. For example, where the time series is a sparse matrix or sparse array having rows or columns corresponding to features of an actor depicted within images, a subset of the time series, e.g., rows or columns including values corresponding to the baseline features, may be identified and provided to the machine learning system as inputs. Alternatively, the data representing the baseline features may be identified and provided as inputs to a machine learning system in any other manner. A set of baseline features may include any number of other features that may be detected based on one or more of the images captured during the finite window, including but not limited to distances between detected hands and locations of products, locations of heads, locations of shoulders or other parts of arms, or any other features.

At box 740, whether an event may be identified and associated with one of the actors based on an output received from the machine learning system in response to the baseline features data is determined. For example, the machine learning system may generate an output indicative of whether an event has occurred, e.g., a taking event, a returning event, or an event that is neither a taking nor a returning event, based on the baseline features as inputs, along with a confidence score (or confidence factor) in the output. The output may expressly indicate that a specific event has occurred or, alternatively, that a series of actions (or sub-events), e.g., "reaching for a shelf" and "placing an item into a bag" or "removing an item from a bag," have occurred based on the baseline features data in the time series. Alternatively, or additionally, the output may identify an item as associated with the event, e.g., based on an analysis of one or more images captured prior to, during or after the event, from which the item may be identified, or based on a location associated with the event, e.g., using planogram data that identifies locations of one or more storage units or other systems within the facility, or of one or more products at such locations.

If an event is identified with a sufficiently high level of confidence, then the process advances to box 770, where an indication associating the event with the one of the actors is stored in a data store associated with the server, viz., that the event was a taking event, a returning event, or neither a taking event nor a returning event involving the actor, and the process ends. The indication may further identify an item associated with the event, or a time of the event, or include any other information or data regarding the event. Alternatively, or additionally, the indication associating the event with the one of the actors may be stored in a memory component associated with the camera, or any other cameras.

If no event may be identified with a sufficiently high level of confidence based on the output received in response to the baseline features data, then the process advances to box 745, where one or more supplemental features (or secondary features) are identified based on the output. For example, the machine learning system may be configured to generate an output in the form of an identification of an event, e.g., as a taking event, a return event, or neither a taking nor a return, along with a confidence level or confidence score in such a determination. If the confidence level or confidence score falls below a predetermined threshold or limit, the output may also be used to identify one or more supplemental features for which data that, if provided as inputs along with the baseline features data, would enhance a probability or likelihood that an event may be identified as associated with the actor. For example, in some implementations, the machine learning system to which data for the baseline features was provided as inputs may be trained to identify one or more sets of other data, e.g., data for one or more supplemental features, that may be desired or required in order to increase a confidence level or a confidence score in an identification of an event. Such supplemental features may include, but need not be limited to, distances between hands of actors and locations of products within the facility at times (e.g., time stamps) at which each of the images was captured during the finite window, as well as locations of heads, shoulders or other body parts at each of such times.

At box 750, the server provides the data for the baseline feature and one or more supplemental features to a machine learning system as inputs. For example, a subset of the data of the time series that was provided by the camera to the server at box 730 that is larger than a subset of the data provided to the machine learning system at box 735, such that the subset includes data regarding not only the baseline features but also the supplemental features may be provided to the same machine learning system to which the baseline features were provided as inputs at box 735, or to another machine learning system.

In some embodiments, at least some data that may be provided as inputs to the machine learning system operating on the server may be generated by the server. For example, where the server includes one or more data stores programmed with planogram data or other information or data identifying locations of items on shelves or other aspects of a storage unit, and the data provided by the camera to the server at box 730 includes locations of hands or other body parts detected within images captured by the camera, the server may calculate distances between the locations of the items on the shelves or other aspects of the storage unit, and the locations of the hands or the one or more other body parts, at times at which the images were captured and store data associating the distances with such times along with the time series data received from the camera at box 730. The server may execute any calculations or functions based on the data in the time series received from the camera, or to derive further data, in accordance with implementations of the present disclosure.

At box 755, whether an event may be identified and associated with one of the actors based on an output received from the machine learning system in response to inputs of the data for the baseline features and supplemental features at box 750 is determined. For example, as is discussed above with regard to box 735 and box 740, the machine learning system may generate an output indicative of whether an event has occurred based on the data regarding the baseline features and the supplemental features as inputs, along with a confidence score (or confidence factor) in the output. The output may expressly indicate that a specific event has occurred or, alternatively, that a series of actions (or sub-events), e.g., "reaching for a shelf" and "placing an item into a bag" or "removing an item from a bag," have occurred based on the baseline features data values in the time series. Alternatively, or additionally, the output may identify an item as associated with the event, e.g., based on an analysis of one or more images captured prior to, during or after the event, from which the item may be identified, or based on a location associated with the event and planogram data. Additionally, as is also discussed above, in some implementations, the machine learning system to which the data regarding the baseline features and the supplemental features were provided as inputs at box 750 may be trained to identify one or more other sets of data, e.g., data values regarding other supplemental features in the time series, that may be desired or required in order to improve a level of confidence in an identification of an event.

If an event is identified with a sufficiently high level of confidence, then the process advances to box 770, where an indication associating the event with the one of the actors is stored in a data store associated with the server, viz., that the event was a taking event, a returning event, or neither a taking event nor a returning event involving the actor, and the process ends. The indication may further identify an item associated with the event, or a time of the event, or include any other information or data regarding the event. Alternatively, or additionally, the indication associating the event with the one of the actors may be stored in a memory component associated with the camera, or any other cameras.

If no event may be identified with a sufficiently high degree of confidence based on the output received in response to the baseline features, then the process advances to box 760, where whether one or more other supplemental features (or secondary features) may be identified based on the output is determined. If another supplemental feature may be identified, then the process returns to box 750, where the server provides time series data for the baseline feature and one or more supplemental features, including the other supplemental features identified at box 760, to the machine learning systems as inputs. For example, the time series data may be another subset of the data received from the camera at box 730, or other data, in that the subset may include data regarding not only the baseline features but also the supplemental features and may be provided to the same machine learning system to which the baseline features were provided as inputs at box 735, or to another machine learning system.

If no additional supplemental features may be identified based on the outputs, then the process advances to box 765, where a human operator reviews one or more of the images captured during the finite window in order to identify the event and to associate the event with one of the actors, and the process ends. For example, in the event that the machine learning systems are unable to identify the event or associate the event with one of the actors based on the time series data received from the camera at box 730, a human operator may review the images to determine whether an event occurred, or any other information or data, in order to identify which of the actors is associated with the event, to classify the event, or to identify one or more items associated with the event.

One or more of the process steps of the flow chart 700 may be repeated for every camera provided on a scene, and data may be generated by every camera for every actor detected, over any finite window of time. For example, the facility may include any number of cameras, each of which may detect items or actors within images captured thereby, over finite windows of any duration, e.g., one-minute intervals, and each of such cameras may generate time series of data and provide the time series to a server or other computer device or system.

Referring to FIGS. 8A through 8F, views of aspects of one system for detecting events using visual images and machine learning in accordance with implementations of the present disclosure are shown. Except where otherwise noted, reference numerals preceded by the number "8" shown in FIGS. 8A through 8F indicate components or features that are similar to components or features having reference numerals preceded by the number "6" shown in FIGS. 6A through 6D, by the number "5" shown in FIGS. 5A through 5D, by the number "4" shown in FIGS. 4A through 4D, by the number "2" shown in FIG. 2A or 2B, or by the number "1" shown in FIGS. 1A through 1K.

Figure 8A:
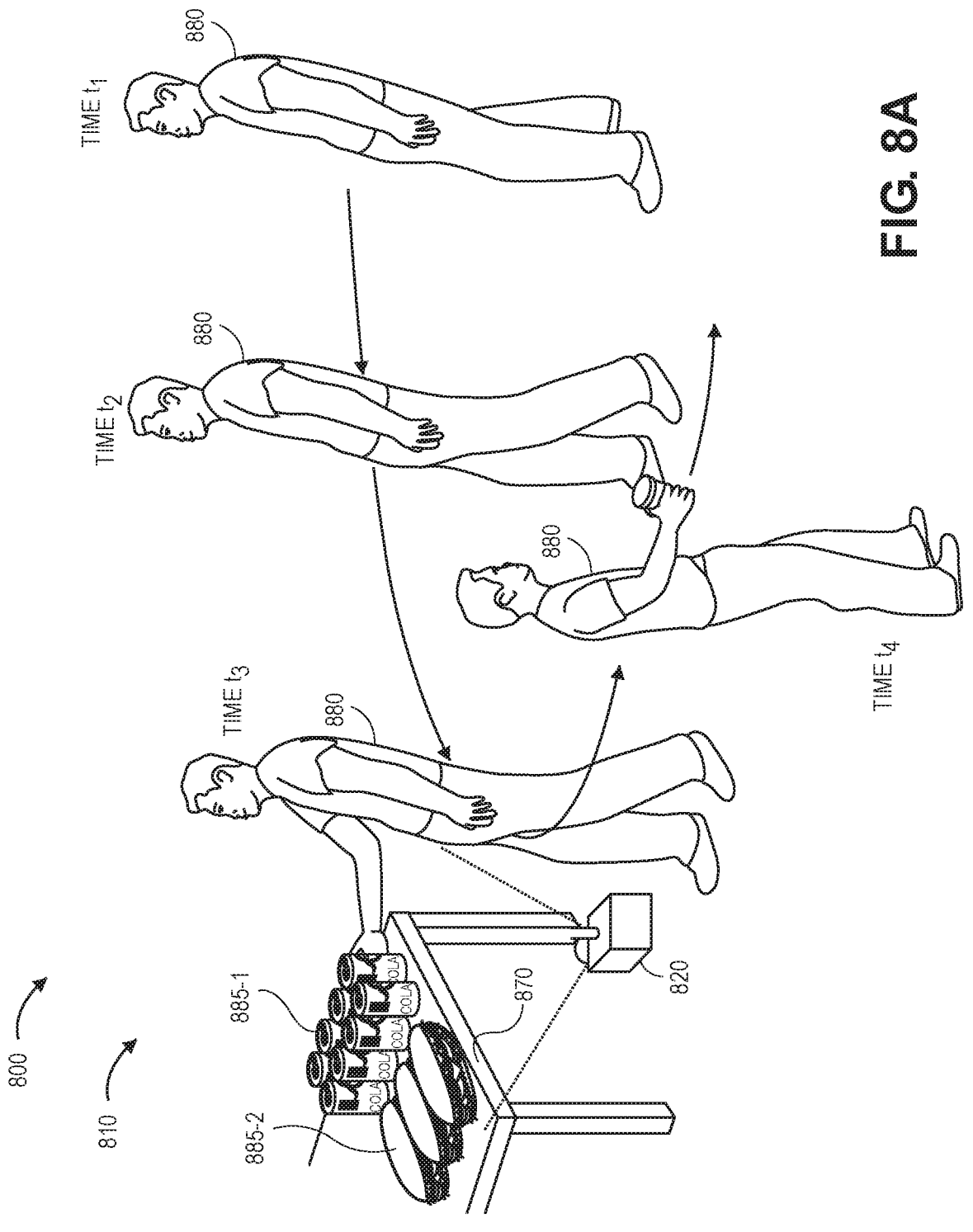
FIGS. 8A through 8F are views of aspects of one system for detecting events using visual images and machine learning in accordance with implementations of the present disclosure.

As is shown in FIG. 8A, a system 800 includes a materials handling facility 810 or other scene having a storage unit 870 (e.g., a shelf, a table or another system) that is located within a field of view of one or more cameras 820 (or other imaging devices). The storage unit 870 includes a set of beverages 885-1 and a set of sandwiches 885-2 provided thereon. In some implementations, the storage unit 870 may include any number of sets of items, in addition to the set of beverages 885-1 and the set of sandwiches 885-2. Moreover, in some implementations, the storage unit 870 may further include any number of items that complement either the set of beverages 885-1 and the set of sandwiches 885-2, as well as one or more systems or components for distributing items other than the set of beverages 885-1 and the set of sandwiches 885-2.

The camera 820 may be in communication with a network, e.g., by wired or wireless connections. Additionally, where two or more of the cameras 820 are provided at the facility 810, the cameras 820 may be calibrated, such that mappings between coordinates of images captured by the cameras 820 and directions relative to their respective image sensors are known.

As is also shown in FIG. 8A, an actor 880 located within the materials handling facility 810 approaches an area including the storage unit 870 before departing from the area over a window (or duration) of time including times $t_1$, $t_2$, $t_3$, $t_4$.

Figure 8B:
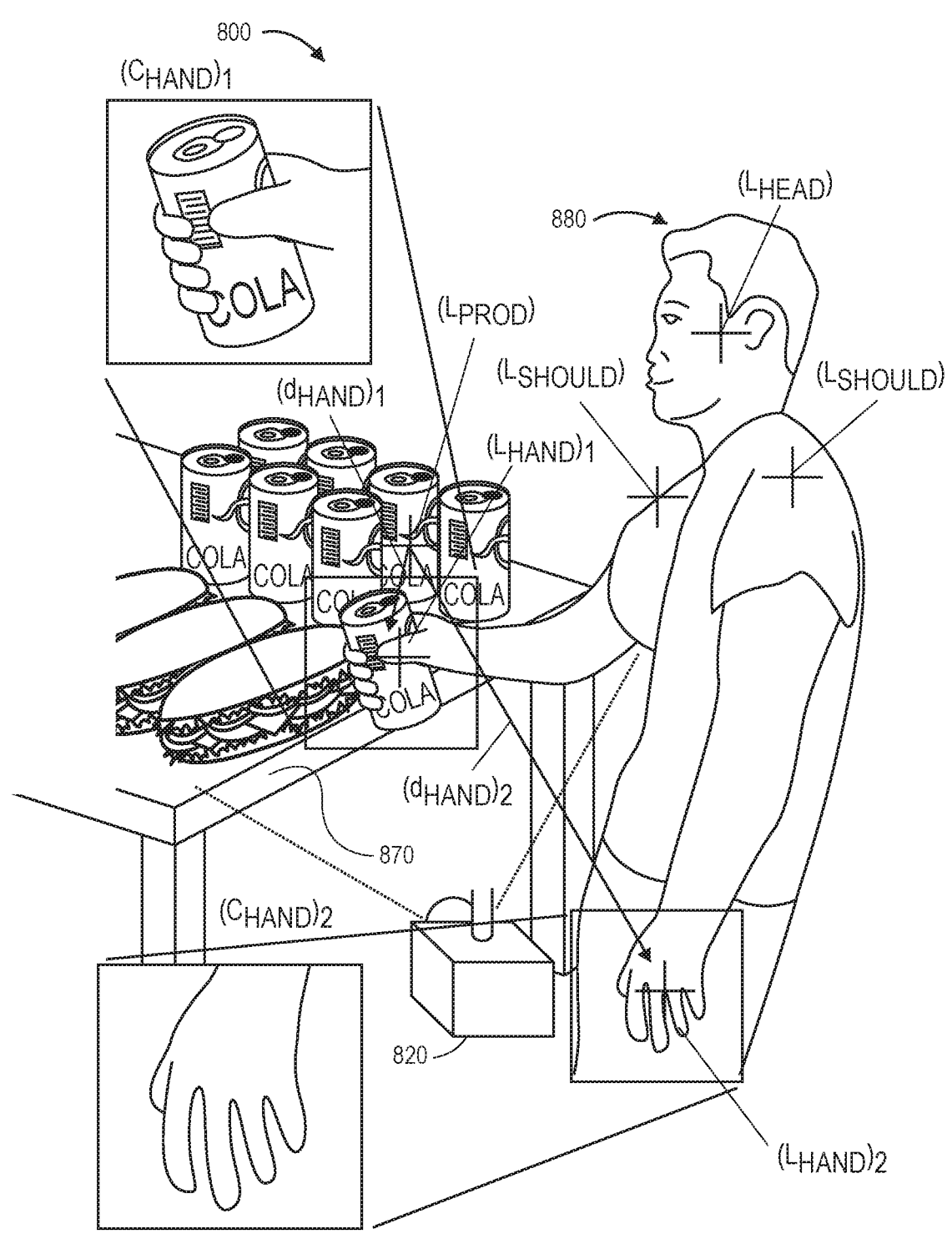

As is shown in FIG. 8B, for each of a set of images captured over the window or finite duration, the camera 820 may calculate one or more features for the actor 880. For example, as is shown in FIG. 8B, the camera 820 may execute one or more algorithms to detect features regarding the actor 880 within such images, including but not limited to a location ($L_{HEAD}$) of the actor 880, locations ($L_{HAND}$)$_1$, ($L_{HAND}$)$_2$ of one or both hands of the actor 880, or locations ($L_{SHOULD}$) of one or both shoulders of the actor 880. The camera 880 may also crop or otherwise isolate portions ($C_{HAND}$)$_1$, ($C_{HAND}$)$_2$ of such images that depict hands of the actor 880, and evaluate such portions ($C_{HAND}$)$_1$, ($C_{HAND}$)$_2$ to determine whether such hands contain an item, or do not contain any items, or to identify any items within such hands. The camera 880 may further calculate distances ($d_{HAND}$)$_1$, ($d_{HAND}$)$_2$ between locations of the hands of the actor 880 and locations ($L_{PROD}$) of one or both of the set of beverages 885-1 or the set of sandwiches 885-2.

The locations ($L_{PROD}$) may be determined in any manner, such as based on one or more sets of planogram data regarding the storage unit 870. Alternatively, images captured by the camera 820 may be processed to detect one or both of the set of beverages 885-1 or the set of sandwiches 885-2, and to determine such locations ($L_{PROD}$) from such images.

Figure 8C:
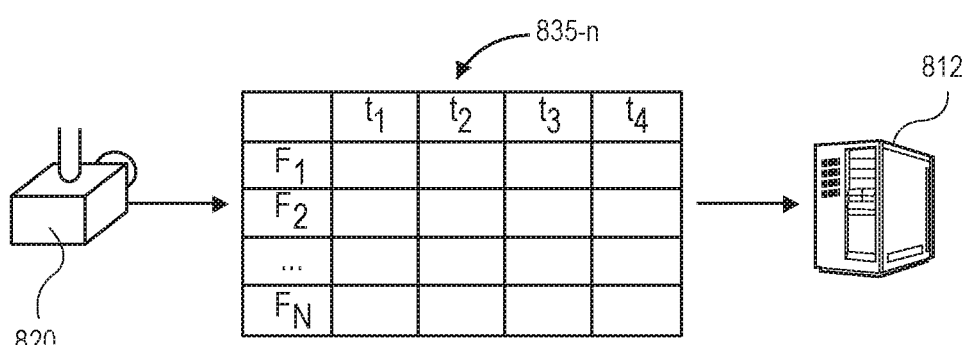

As is shown in FIG. 8C, once the camera 820 has determined the features of the actor 880 from a plurality of images captured during the window, e.g., the locations ($L_{HEAD}$), ($L_{HAND}$)$_1$, ($L_{HAND}$)$_2$, ($L_{SHOULD}$), as well as the distances ($d_{HAND}$)$_1$, ($d_{HAND}$)$_2$, or the statuses of the hands of the actor 880, as determined from the portions ($C_{HAND}$)$_1$, ($C_{HAND}$)$_2$, e.g., that the hands are empty or full, or that the hands contain one or more specific items therein, the camera 820 may construct a time series 835-n of values of the data regarding such features over the window. The time series 835-n may be provided to a server 812 or other computer device or system that is configured to operate a machine learning system that has been trained to detect events, to identify actors that are responsible for such events, or to identify items associated with such events, based on features represented in such time series. The machine learning system may be trained to detect events, identify actors or identify items based on any number of features represented in the time series 835-n, including data regarding a single feature, or combinations of data regarding two or more features. Whether an event has occurred, whether the actor is responsible for the event, or an item involved in the event may be determined based on outputs received from the machine learning system in response to the inputs, individually or in combination with one another.

In some implementations, a time series of values of data regarding one or more predetermined features regarding the actor, e.g., baseline features, may be identified and initially provided to the machine learning system as inputs. The data of the time series may represent values corresponding to such features at times at which the images from which the values were determined were captured (e.g., time stamps). If an event may be determined to have occurred, or not occurred, based on an output received from the machine learning system in response to the inputs, then no further computations need be performed. If the event may not be determined to have occurred, or not occurred, based on the output, however, then time series data regarding one or more additional features regarding the actor, e.g., supplemental features, may be identified and provided to the machine learning system as inputs.

Figure 8D:
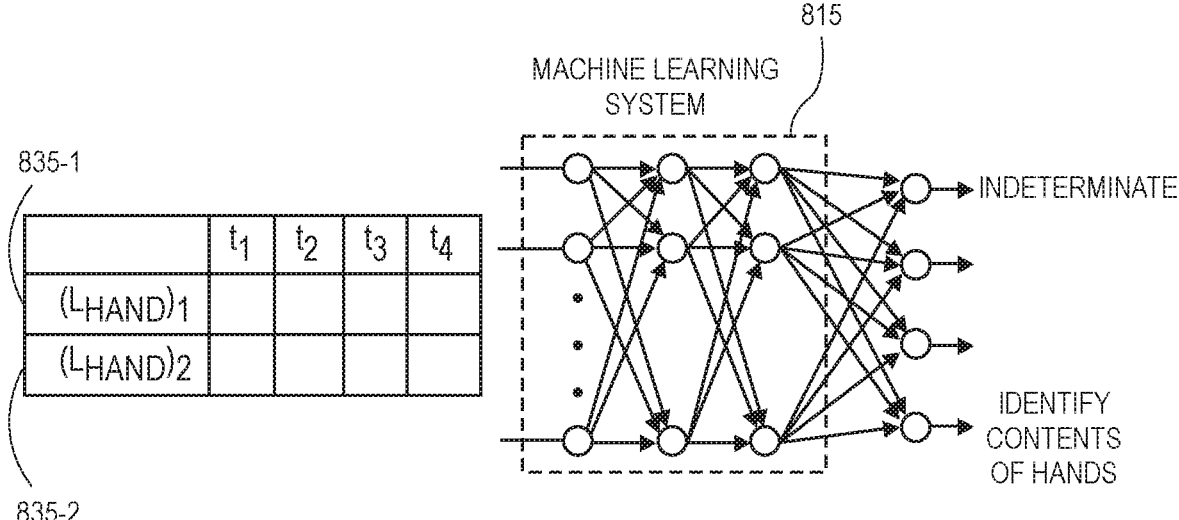

For example, as is shown in FIG. 8D, time series 835-1, 835-2 representing data regarding baseline features including the locations ($L_{HAND}$)$_1$, ($L_{HAND}$)$_2$ of the hands of the actor 880 over the window are provided as inputs to a machine learning system 815 operating on the camera 820.

The time series 835-1, 835-2 may indicate locations of one or both of the hands of the actor 880 detected within the set of images captured over the window, at times (e.g., time stamps) at which such images were captured. As is also shown in FIG. 8D, outputs received from the machine learning system 815 in response to the inputs of the time series 835-1, 835-2 are indeterminate as to whether the actor 880 is responsible for an event. However, the outputs identify one or more additional features, viz., contents or statuses of hands, that may enhance a determination as to whether the event has occurred, or whether the actor 880 is responsible for the event, or otherwise increase a level of confidence in such a determination.

Figure 8E:
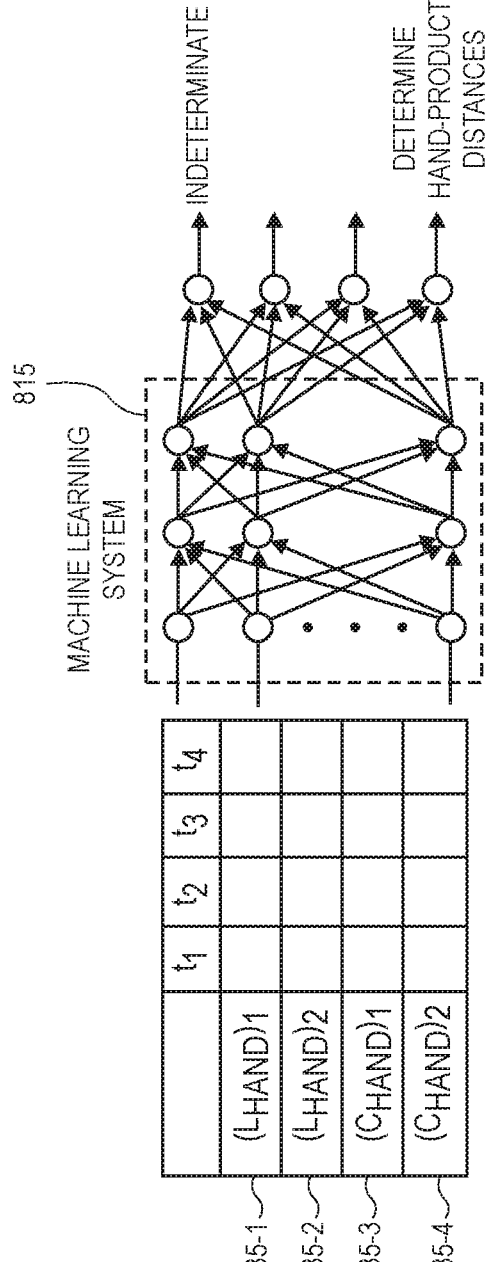

As is shown in FIG. 8E, the time series 835-1, 835-2 representing baseline features including the locations $(L_{HAND})_1$, $(L_{HAND})_2$ of the hands of the actor 880 and time series 835-3, 835-4 representing contents or statuses of the hands of the actor 880 over the window, as determined from cropped or otherwise isolated portions $(C_{HAND})_1$, $(C_{HAND})_2$ of images, are provided as inputs to the machine learning system 815 operating on the camera 820. The time series 835-3, 835-4 may indicate statuses of one or both of the hands of the actor 880 detected within the set of images captured over the window, such as empty or full, at times (e.g., time stamps) at which such images were captured. As is also shown in FIG. 8E, outputs received from the machine learning system 815 in response to the inputs of the time series 835-1, 835-2, 835-3, 835-4 are indeterminate as to whether the actor 880 is responsible for an event. However, the outputs identify one or more additional features, viz., distances between locations of hands of the actor 880 and locations of one or both the set of beverages 885-1 or the set of sandwiches 885-2, that may enhance a determination as to whether the event has occurred, or whether the actor 880 is responsible for the event, or otherwise increase a level of confidence in such a determination.

Figure 8F:
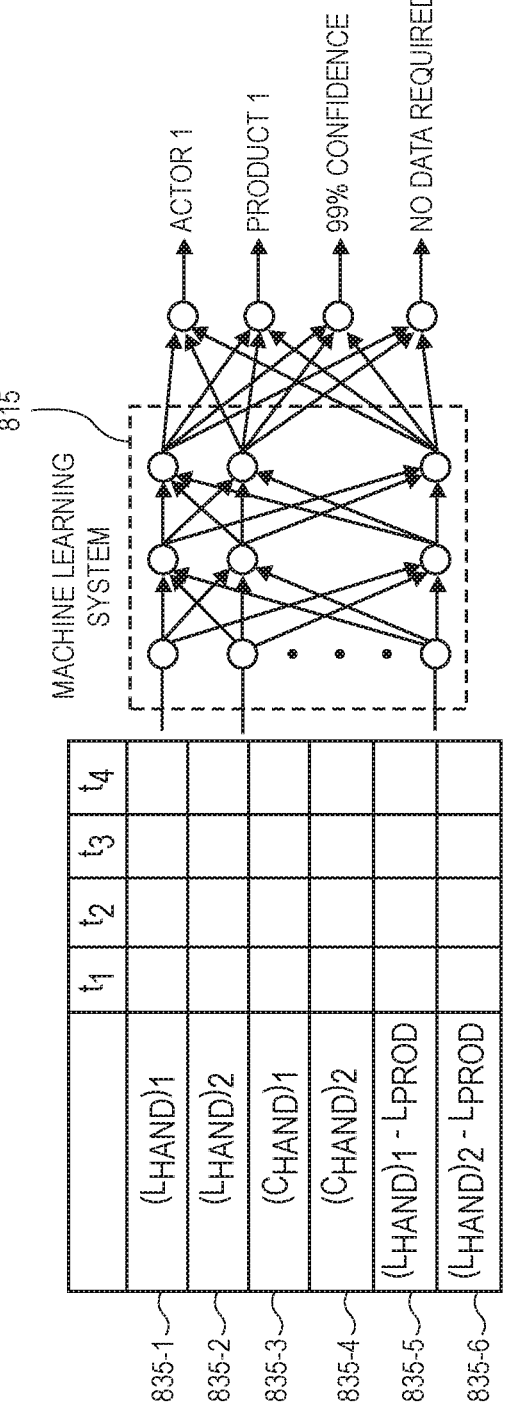

As is shown in FIG. 8F, the time series 835-1, 835-2 representing baseline features including the locations $(L_{HAND})_1$, $(L_{HAND})_2$ of the hands of the actor 880, the time series 835-3, 835-4 representing supplemental features including contents or statuses of the hands of the actor 880 over the window, and time series 835-5, 835-6 representing supplemental features including the distances $(d_{HAND})_1$, $(d_{HAND})_2$ between locations $(L_{HAND})_1$, $(L_{HAND})_2$ of the hands of the actor 880 and locations $(L_{PROD})$ of one or both of the set of beverages 885-1 or the set of sandwiches 885-2 are provided as inputs to the machine learning system 815 operating on the camera 820. The time series 835-5, 835-6 may indicate distances between one or both of the hands of the actor 880 detected within the set of images captured over the window and locations on the storage unit 870 where the set of beverages 885-1 or the set of sandwiches 885-2 are located, at which such images were captured. The time series 835-5, 835-6 may have been calculated and transmitted to the server 812 with the time series 835-$n$, or, alternatively, calculated by the server 812 based on the locations $(L_{HAND})_1$, $(L_{HAND})_2$ of the hands as determined by camera 820 and planogram data including the locations $(L_{PROD})$ of the products, which may be otherwise stored on or accessible to the server 812.

As is also shown in FIG. 8F, outputs received from the machine learning system 815 in response to the inputs of the time series 835-1, 835-2, 835-3, 835-4, 835-5, 835-6 indicate that the actor 880 retrieved one of the set of beverages 885-1. Additionally, the outputs received from the machine learning system 815 further indicate that the determination was made with a sufficiently high degree of confidence, and that no further data (e.g., additional supplemental features) need be provided in order to further enhance the determination that the actor 880 is responsible for retrieving the one of the set of beverages 885-1, or otherwise increase a level of confidence in the determination.

Although some of the implementations disclosed herein reference the detection and location of human actors or items, the detection of events, or the association with such events with one or more of such actors or items based on images captured using one or more cameras, the systems and methods of the present disclosure are not so limited. For example, the systems and methods disclosed herein utilize cameras or other imaging devices to locate any objects, including one or more body parts of non-human animals, as well as portions of any number of machines or robots, and are not limited to detecting and locating humans, or associating such humans with events. Furthermore, although some of the implementations disclosed herein reference detecting and locating actors and events in a commercial setting, e.g., within a materials handling facility such as a fulfillment center or a retail establishment, the systems and methods of the present disclosure are likewise not so limited. Rather, the systems and methods disclosed herein may be utilized to locate objects in 3D space within any type of commercial or non-commercial settings, or to detect events of any type or kind. Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

Moreover, any of the systems or methods disclosed herein may be utilized as a primary technique or means, or as an exclusive technique or means, for locating target objects such as actors on a scene, detecting events, or associating the events with actors based on imaging data captured using one or more cameras or other imaging devices. Alternatively, any of the systems and methods disclosed herein may be utilized as a secondary technique or means, or as an alternate or backup technique or means, for locating target objects such as actors, detecting events, or associating the events with actors. For example, those of ordinary skill in the pertinent arts will recognize that any of the systems and methods disclosed herein may be utilized in connection with, or in support of, any other technique or means for locating target objects such as actors on a scene, detecting events, or associating events with actors.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIG. 3 or FIGS. 7A and 7B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A method comprising:

capturing at least a first plurality of images by a first imaging device having a first field of view, wherein the first plurality of images are captured over a first period of time;

detecting, by the first imaging device, locations of at least a first body part of a first actor depicted within at least a subset of the first plurality of images;

detecting, by the first imaging device, locations of at least a second body part of a second actor depicted within the subset of the first plurality of images;

determining, by the first imaging device, first values of data corresponding to at least a first feature of the first actor based at least in part on at least one of the locations of at least the first body part of the first actor depicted within at least the subset of the first plurality of images;

determining, by the first imaging device, second values of data corresponding to at least a second feature of the second actor based at least in part on at least one of the locations of at least the second body part of the second actor depicted within at least the subset of the first plurality of images;

constructing, by the first imaging device, a first time series of data, wherein the first time series of data comprises the first values of data corresponding to the first feature and statuses of the first body part of the first actor at times at which each of the subset of the first plurality of images was captured;

constructing, by the first imaging device, a second time series of data, wherein the second time series of data comprises the second values of data corresponding to the second feature and statuses of the second body part of the second actor at the times at which each of the subset of the first plurality of images was captured;

providing at least a portion of the first time series of data as a first input to a first machine learning system, wherein the first machine learning system is trained to determine whether at least one actor is associated with at least one of a plurality of events based at least in part on a feature of the at least one actor;

receiving at least a first output from the first machine learning system in response to the first input;

providing at least a portion of the second time series of data as a second input to the first machine learning system;

receiving at least a second output from the first machine learning system in response to the second input; and determining, based at least in part on the first output and the second output, that the first actor is associated with a first event of the plurality of events, wherein the first event comprises one of:

placing at least one item on a storage unit within the first field of view; or removing at least one item from the storage unit.

2. The method of claim 1, wherein receiving at least the first output from the first machine learning system in response to the first input comprises:

receiving at least the first output and a third output from the first machine learning system in response to the first input, and wherein the method further comprises:

identifying the at least one item associated with the first event based at least in part on the third output.

3. The method of claim 2, wherein identifying the least one item associated with the first event based at least in part on the third output comprises:

identifying a location on the storage unit based at least in part on the third output; and identifying at least one of an item or a type of item provided on the location based at least in part on planogram data for the storage unit, wherein the planogram data identifies locations of items on the storage unit, wherein the at least one item comprises the item or one of the type of the item provided on the location.

4. The method of claim 1, further comprising:

prior to capturing at least the first plurality of images, training the first machine learning system, wherein training the first machine learning system comprises:

identifying at least a second plurality of images captured by one of the first imaging device or a second imaging device having a second field of view, wherein the second plurality of images are captured over a second period of time;

determining that a third actor depicted within at least some of the second plurality of images is associated with a second event that occurred within at least one of the first field of view or the second field of view during the second period of time, wherein the second event is one of the plurality of events;

detecting locations of at least a third body part of the third actor depicted within at least a subset of the second plurality of images;

determining third values of data corresponding to at least a third feature of the third actor based at least in part on at least one of the locations of at least the third body part of the third actor depicted within at least the subset of the second plurality of images;

constructing a third time series of data, wherein the third time series of data comprises the third values of data corresponding to the third feature and statuses of the third body part of the third actor at times at which each of at least the subset of the second plurality of images was captured;

providing at least a portion of the third time series of data as a third input to the first machine learning system; and receiving at least a third output from the first machine learning system in response to the third input, wherein the first machine learning system is trained based at least in part on the third input and the third output.

5. The method of claim 1, wherein the first feature is one of:

a trajectory of a hand of the first actor over the first period of time, wherein the first body part is the hand of the first actor;

a trajectory of a head of the first actor over the first period of time, wherein the first body part is the head of the first actor;

a trajectory of a shoulder of the first actor over the first period of time, wherein the first body part is the shoulder of the first actor; or distances between a location of the first body part and a location of at least one item over the first period of time.

6. The method of claim 1, wherein each of the first values of data is one of:

a location of a hand of the first actor depicted within one of the images of the subset of the first plurality of images at a time when the one of the images was captured;

a location of a head of the first actor depicted within one of the images of the subset of the first plurality of images at a time when the one of the images was captured;

a location of a shoulder of the first actor depicted within one of the images of the subset of the first plurality of images at a time when the one of the images was captured;

a location of at least one item on the storage unit; a location of one hand of the first actor depicted within one of the images of the subset of the first plurality of images at a time when the one of the images was captured; or an identifier of at least one item within the hand of the first actor depicted within one of the images of the subset of the first plurality of images at a time when the one of the images was captured.

7. The method of claim 1, wherein the first time series of data further comprises third values of data corresponding to a third feature of the first actor and the times at which each of the subset of the first plurality of images was captured, and wherein providing at least the portion of the first time series of data as the first input to the first machine learning system comprises:

providing the first third values of data corresponding to the first third feature and the times at which each of the subset of the first plurality of images was captured as a third input to the first machine learning system;

receiving at least a third output from the first machine learning system in response to the third input; and determining, based at least in part on the third output, that the first actor may not be associated with the at least one of the plurality of events based on the first third values of data.

8. The method of claim 7, wherein each of the first values of data is a location of one hand of the first actor depicted within one of the subset of the first plurality of images, wherein each of the third values of data is a status of the one hand of the first actor depicted within the at least some of the first plurality of images, and wherein the status is one of empty or full.

9. The method of claim 1, wherein the first time series of data further comprises third values of data corresponding to a third feature of the first actor and third fourth values corresponding to a third fourth feature of the first actor, and wherein the method further comprises:

prior to providing at least the portion of the first time series of data as the first input to the first machine learning system, providing the first values of data corresponding to the first feature and the times at which each of the subset of the first plurality of images was captured as a third input to the first machine learning system;

receiving at least a third output from the first machine learning system in response to the third input;

determining, based at least in part on the third output, that the first actor may not be associated with the at least one of the plurality of events based on the first values of data;

in response to determining that the first actor may not be associated with the at least one of the plurality of events based on the first values of data, providing the first values of data corresponding to the first feature, the third values of data corresponding to the third feature, and the times at which each of the subset of the first plurality of images was captured as a fourth input to the first machine learning system;

receiving at least a fourth output from the first machine learning system in response to the fourth input; and determining, based at least in part on the fourth output, that the first actor may not be associated with the at least one of the plurality of events based on the first values of data and the third values of data, wherein the first time series of data is provided as the first input to the first machine learning system in response to determining that the first actor may not be associated with the at least one of the plurality of events based on the first values of data and the third values of data.

10. The method of claim 1, wherein the first machine learning system operates on at least one of:

at least one computer system in communication with the first imaging device;

a first processor unit provided on the first imaging device, wherein the first imaging device is in communication with a second imaging device; or a second processor unit of the second imaging device.

11. The method of claim 1, wherein detecting the locations of at least the first body part depicted within at least the subset of the first plurality of images comprises:

providing each of the first plurality of images as inputs to an algorithm configured to detect at least the first body part within an image; and receiving outputs from the algorithm, wherein each of the outputs is received in response to one of the inputs, wherein each of the locations of at least the first body part is detected based at least in part on one of the outputs.

12. The method of claim 1, wherein the first body part is one of:

a hand of the first actor;

a head of the first actor; or a portion of an arm of the first actor.

13. The method of claim 1, wherein determining that the first actor is associated with the first event comprises at least one of:

determining that the first actor has extended at least the first body part toward the storage unit based at least in part on the first output; or determining that the first actor has extended at least the first body part into one of a bag, a basket, a cart or a pocket based at least in part on the first output.

14. A system comprising:

a camera having a field of view including at least a portion of at least one surface for accommodating one or more items, wherein the camera comprises a processor unit and an optical sensor; and a computer system in communication with the camera, wherein the computer system is configured to execute a machine learning system trained to determine whether at least one actor is associated with at least one of a plurality of events based at least in part on a feature of the at least one actor detected in at least one image, wherein the processor unit is programmed with one or more sets of instructions that, when executed by the processor unit, cause the camera to execute a first method comprising:

capturing a plurality of images over a period of time;

detecting locations of at least a first body part of a first actor depicted within at least a subset of the plurality of images;

detecting locations of at least a second body part of a second actor depicted within the subset of the plurality of images;

determining first values of data corresponding to at least a first feature of the first actor based at least in part on at least one of the locations of at least the first body part of the first actor depicted within at least the subset of the plurality of images;

determining second values of data corresponding to at least a second feature of the second actor based at least in part on at least one of the locations of at least the second body part of the second actor depicted within at least the subset of the first plurality of images;

constructing, by the first imaging device, a first time series of data, wherein the first time series of data comprises the first values of data corresponding to the first feature and statuses of the first body part of the first actor at times at which each of the subset of the plurality of images was captured;

constructing, by the first imaging device, a second time series of data, wherein the second time series of data comprises the second values of data corresponding to the second feature and statuses of the second body part of the second actor at the times at which each of the subset of the plurality of images was captured; and transmitting at least the first time series of data and the second time series of data to the computer system, wherein the computer system is programmed with one or more sets of instructions that, when executed by the processor unit, cause the computer system to execute a second method comprising:

providing at least a portion of the first time series of data as a first input to the machine learning system;

receiving at least a first output from the machine learning system in response to the first input;

providing at least a portion of the second time series of data as a second input to the machine learning system;

receiving at least a second output from the machine learning system in response to the second input; and determining, based at least in part on the first output and the second output, that the first actor is associated with one of the plurality of events, wherein the one of the plurality of events comprises one of:

placing at least one item on the at least one surface; or removing at least one item from the at least one surface.

15. The camera of claim 14, wherein the first feature is one of:

a trajectory of a hand of the first actor over the period of time, wherein the first body part is the hand of the first actor;

a trajectory of a head of the first actor over the period of time, wherein the first body part is the head of the first actor; or a trajectory of a shoulder of the first actor over the period of time, wherein the first body part is the shoulder of the first actor, and wherein the second feature is one of:

a trajectory of a hand of the second actor over the period of time, wherein the second body part is the hand of the second actor;

a trajectory of a head of the second actor over the period of time, wherein the second body part is the head of the second actor; or a trajectory of a shoulder of the second actor over the period of time, wherein the second body part is the shoulder of the second actor.

16. The system of claim 14, wherein each of the first values of data is a location of the first body part depicted within one of the subset of the plurality of images, wherein each one of the statuses of the first body part is one of empty or full, wherein each one of the second values of data is a location of the second body part depicted within one of the plurality of images, and wherein each one of the statuses of the second body part is one of empty or full.

17. The system of claim 14, wherein determining that the first actor is associated with the one of the plurality of events comprises at least one of:

determining that the first actor has extended at least the first body part toward the at least one surface based at least in part on the first output; or determining that the first actor has extended at least the first body part into one of a bag, a basket, a cart or a pocket based at least in part on the first output.

18. A camera having a field of view including at least a portion of at least one surface for accommodating one or more items, wherein the camera comprises a processor unit and an optical sensor, wherein the processor unit is configured to execute a machine learning system trained to determine whether at least one actor is associated with at least one of a plurality of events based at least in part on a feature of the at least one actor detected in at least one image, wherein the processor unit is programmed with one or more sets of instructions that, when executed by the processor unit, cause the camera to execute a method comprising:

capturing a plurality of images over a period of time;

detecting locations of at least a first body part of a first actor depicted within at least a subset of the plurality of images;

detecting locations of at least a second body part of a second actor depicted within the subset of the plurality of images;

determining first values of data corresponding to at least a first feature of the first actor based at least in part on at least one of the locations of at least the first body part of the first actor depicted within at least the subset of the plurality of images;

determining second values of data corresponding to at least a second feature of the second actor based at least in part on at least one of the locations of at least the second body part of the second actor depicted within at least the subset of the plurality of images;

constructing, by the first imaging device, a first time series of data, wherein the first time series of data comprises the first values of data corresponding to the first feature and statuses of the first body part of the first actor at times at which each of the subset of the plurality of images was captured;

constructing, by the first imaging device, a second time series of data, wherein the second time series of data comprises the second values of data corresponding to the second feature and statuses of the second body part of the second actor at the times at which each of the subset of the first plurality of images was captured;

providing at least a portion of the first time series of data as a first input to the machine learning system;

receiving at least a first output from the machine learning system in response to the first input;

providing at least a portion of the second time series of data as a second input to the machine learning system;

receiving at least a second output from the machine learning system in response to the second input; and determining, based at least in part on the first output and the second output, that the first actor is associated with one of the plurality of events, wherein the one of the plurality of events comprises one of:

placing at least one item on the at least one surface; or removing at least one item from the at least one surface.

19. The camera of claim 18, wherein the first feature is one of:

a trajectory of a hand of the first actor over the period of time, wherein the first body part is the hand of the first actor;

a trajectory of a head of the first actor over the period of time, wherein the first body part is the head of the first actor; or a trajectory of a shoulder of the first actor over the period of time, wherein the first body part is the shoulder of the first actor, and wherein the second feature is one of:

a trajectory of a hand of the second actor over the period of time, wherein the second body part is the hand of the second actor;

a trajectory of a head of the second actor over the period of time, wherein the second body part is the head of the second actor; or a trajectory of a shoulder of the second actor over the period of time, wherein the second body part is the shoulder of the second actor.

20. The camera of claim 18, wherein each of the first values of data is a location of the first body part depicted within one of the subset of the plurality of images, wherein each one of the statuses of the first body part is one of empty or full, wherein each one of the second values of data is a location of the second body part depicted within one of the plurality of images, and wherein each one of the statuses of the second body part is one of empty or full.

* * * * *